(12) United States Patent
Takahashi et al.

(10) Patent No.: US 7,946,615 B2
(45) Date of Patent: May 24, 2011

(54) ATTACHMENT STRUCTURE OF CURTAIN-SHAPED COVER MEMBER OF VEHICLE

(75) Inventors: Kunio Takahashi, Hiroshima (JP); Kazunori Kanda, Hiroshima (JP)

(73) Assignee: Mazda Motor Corporation (JP)

( * ) Notice: Subject to any disclaimer, the term of this patent is extended or adjusted under 35 U.S.C. 154(b) by 33 days.

(21) Appl. No.: 12/473,909

(22) Filed: May 28, 2009

(65) Prior Publication Data

US 2010/0066065 A1  Mar. 18, 2010

(30) Foreign Application Priority Data

Sep. 12, 2008 (JP) ................... 2008-234580
Sep. 29, 2008 (JP) ................... 2008-249986
Sep. 29, 2008 (JP) ................... 2008-249987
Sep. 30, 2008 (JP) ................... 2008-252177

(51) Int. Cl.
*B60R 21/16* (2006.01)
(52) U.S. Cl. .................... 280/730.2; 280/749
(58) Field of Classification Search ........... 280/730.2, 280/728.2, 749
See application file for complete search history.

(56) References Cited

U.S. PATENT DOCUMENTS

| | | | |
|---|---|---|---|
| 5,605,370 A | | 2/1997 | Ruiz |
| 5,660,414 A | * | 8/1997 | Karlow et al. ........... 280/749 |
| 5,707,075 A | * | 1/1998 | Kraft et al. ............ 280/730.2 |
| 7,390,017 B2 | * | 6/2008 | Inoue et al. ............ 280/730.2 |
| 7,806,432 B2 | * | 10/2010 | Nelson et al. .......... 280/730.2 |
| 2001/0033073 A1 | * | 10/2001 | Hammond et al. ..... 280/730.2 |
| 2003/0075906 A1 | | 4/2003 | Inoue et al. |
| 2009/0058054 A1 | * | 3/2009 | Nelson et al. .......... 280/730.2 |

FOREIGN PATENT DOCUMENTS

JP  11-048902  2/1999

OTHER PUBLICATIONS

Anonymous; "Safety net for occupant protection in vehicle rollover event"; Research Disclosure, Mason Publications, Hampshire, GB. vol. 457, No. 102, May 1, 2002.
Extended European Search Report dated Dec. 3, 2009: Application No. 09010869.7-1264.

* cited by examiner

*Primary Examiner* — Faye M. Fleming
(74) *Attorney, Agent, or Firm* — Studebaker & Brackett PC; Donald R. Studebaker

(57) ABSTRACT

An attachment structure comprises a top ceiling, a cover member to cover a window glass from the inside of a vehicle compartment, an airbag which is stored along an upper edge portion of the window glass in its non-operation state and inflates downward through a gap which is formed between the window glass and the side end portion of the top ceiling which is pressed down by the airbag receiving a gas pressure from an inflator; and support members to support the cover member longitudinally at a position which is on an outside of the inflating airbag. Accordingly, the proper inflation of the airbag can be provided despite of the cover member at the window.

20 Claims, 57 Drawing Sheets

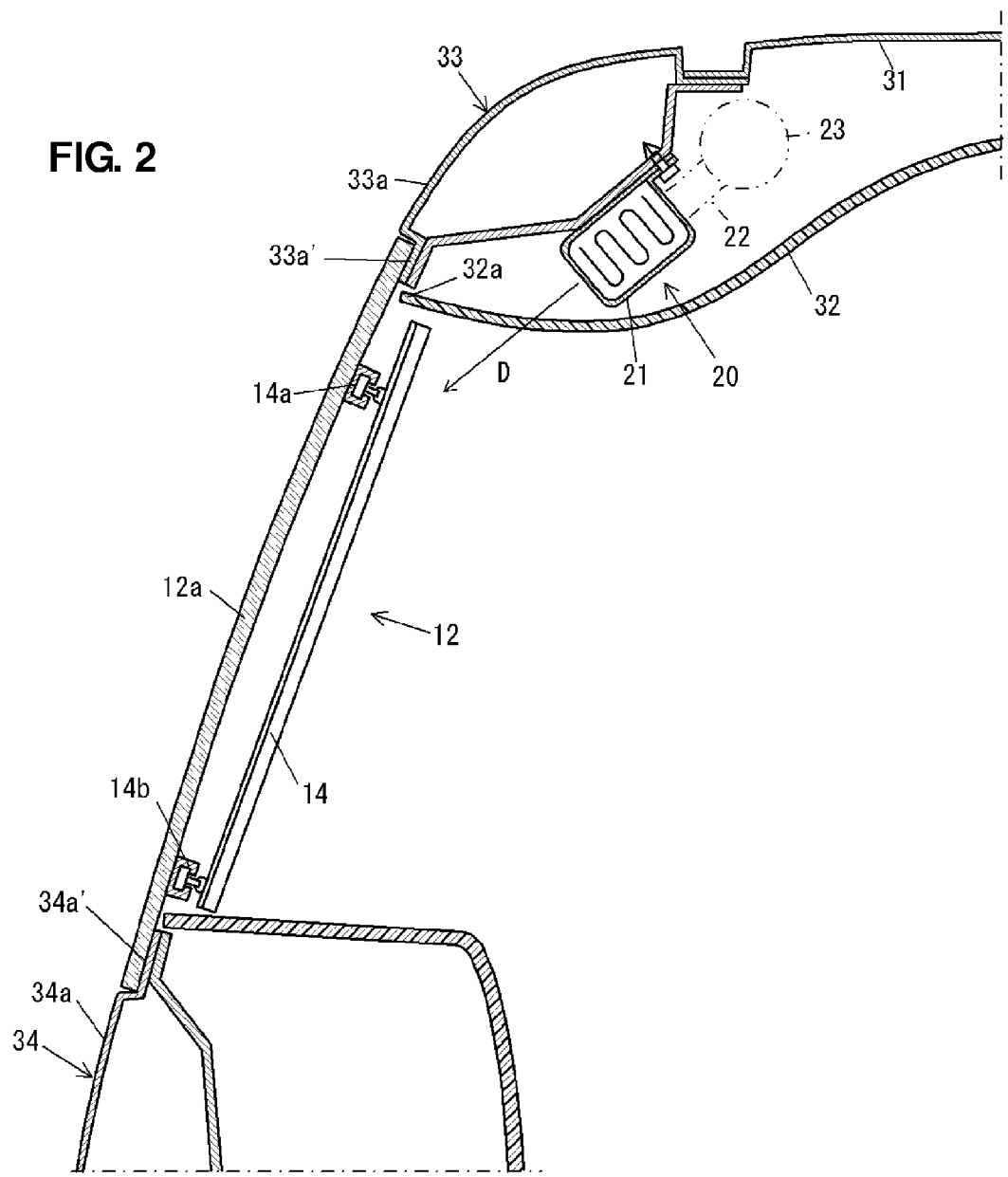

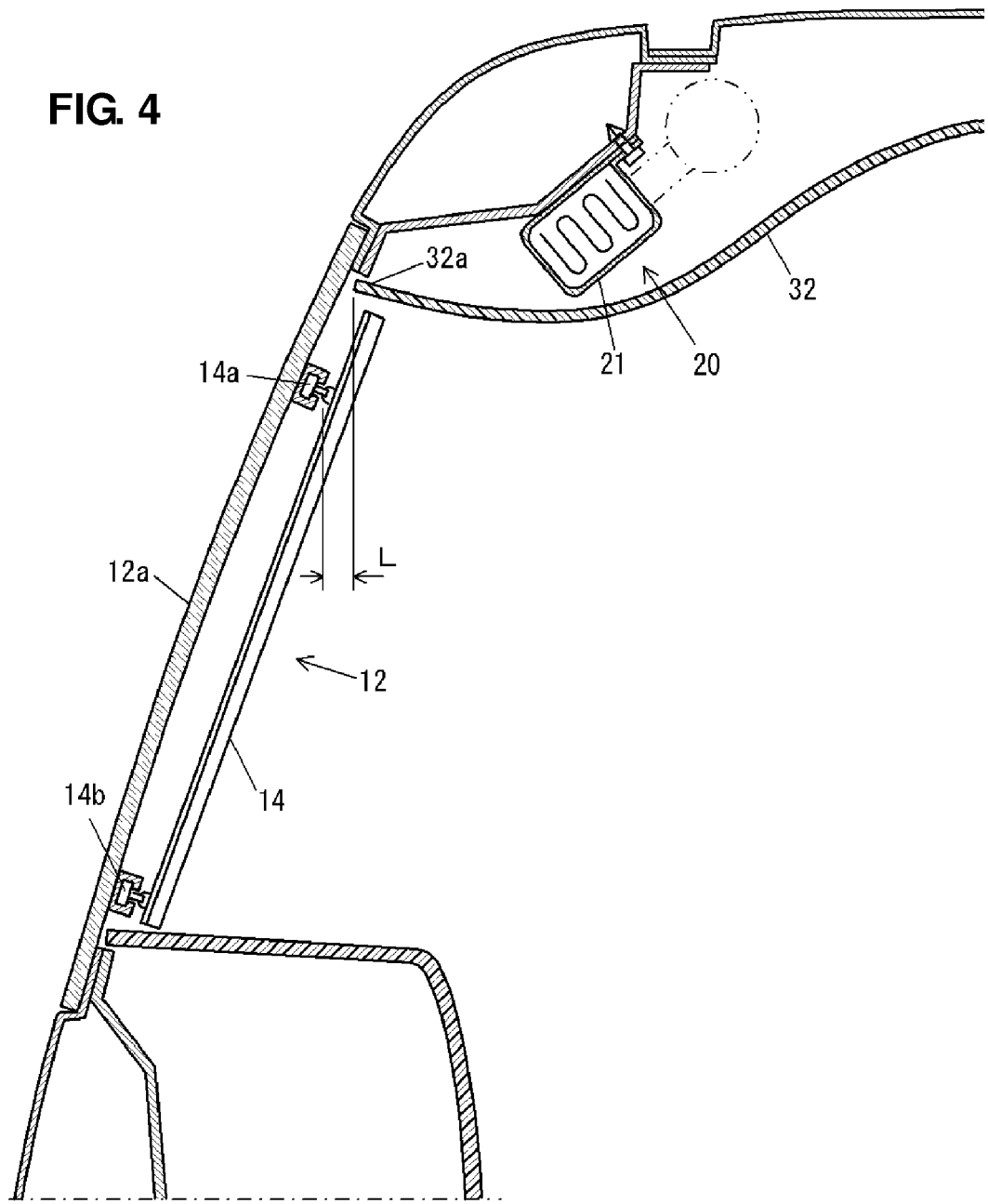

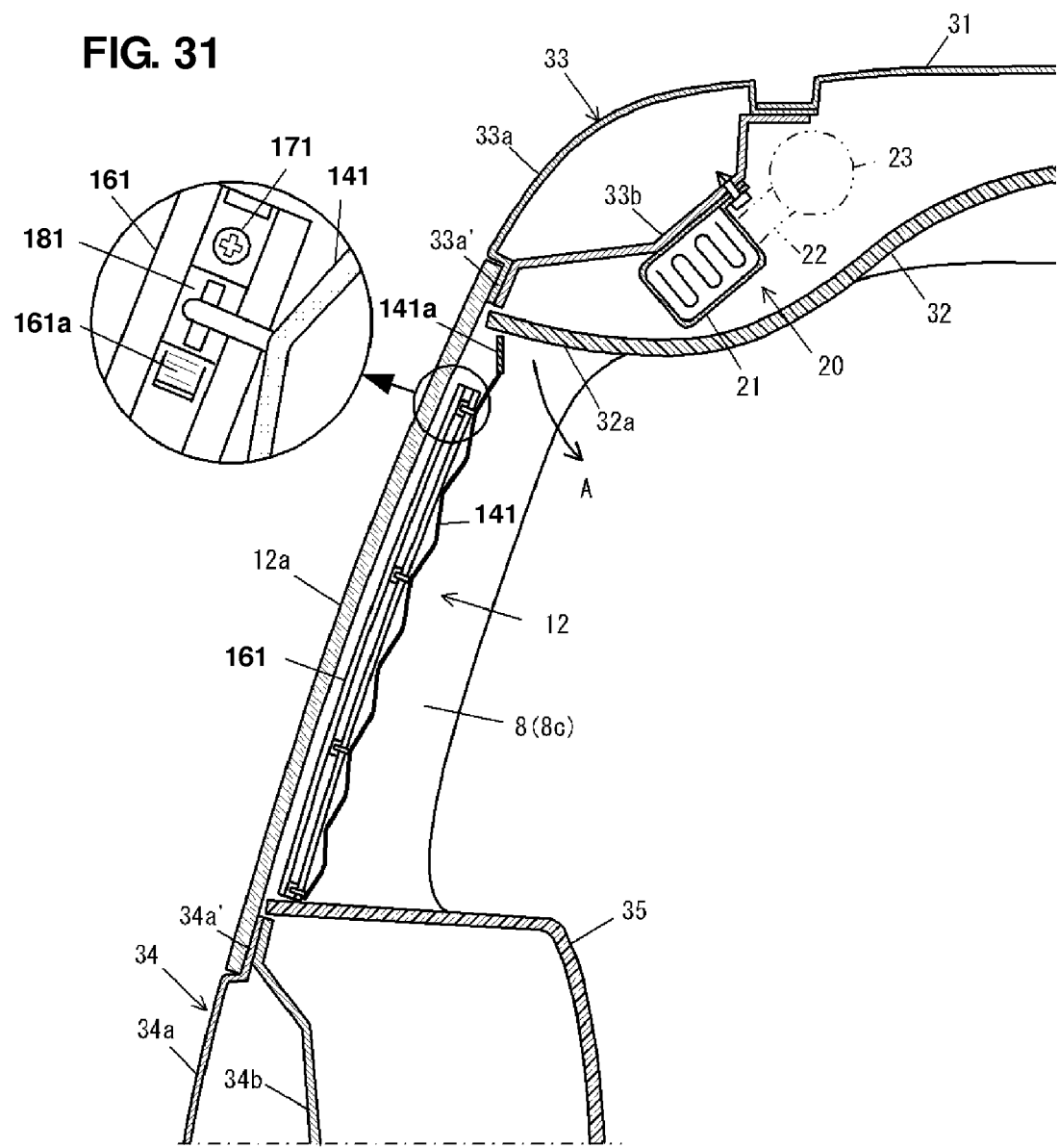

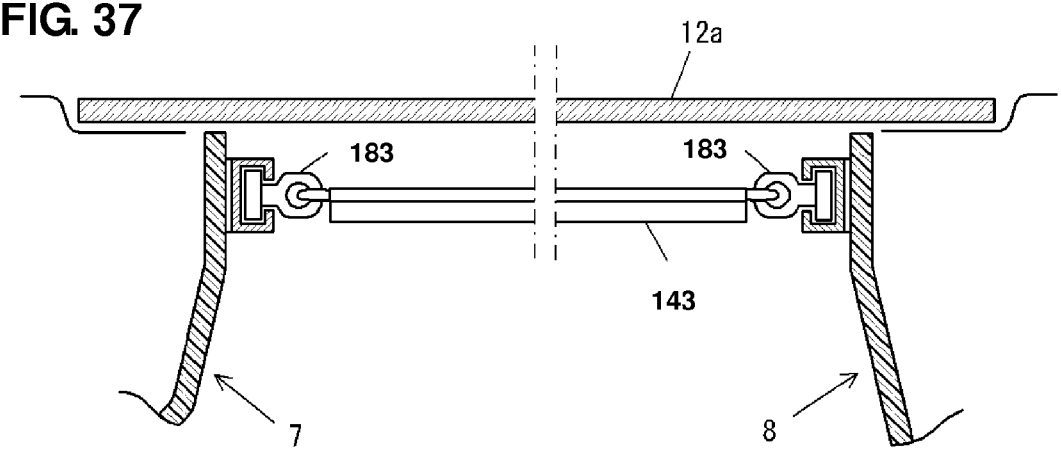
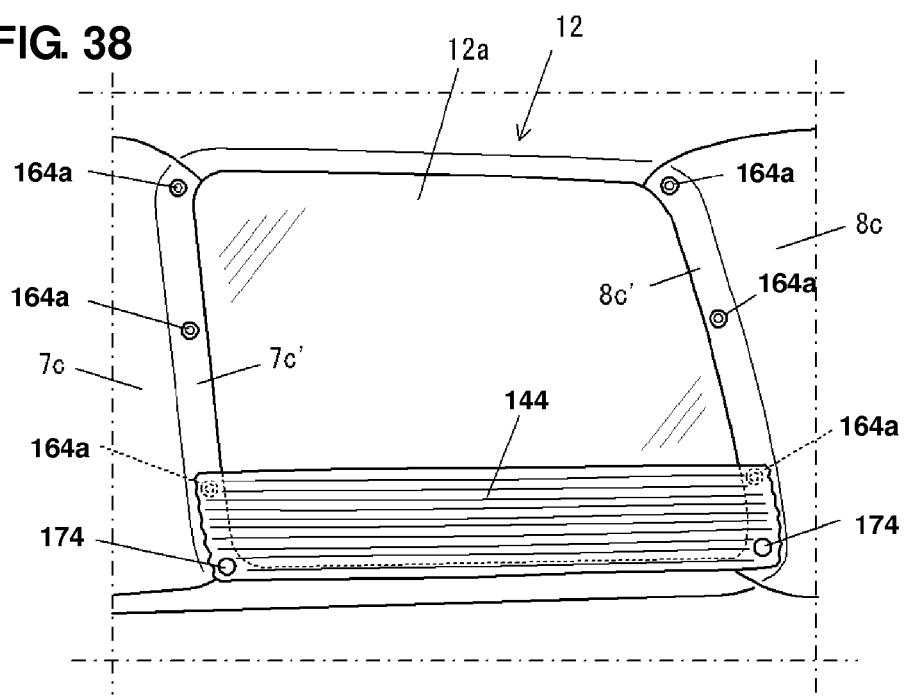
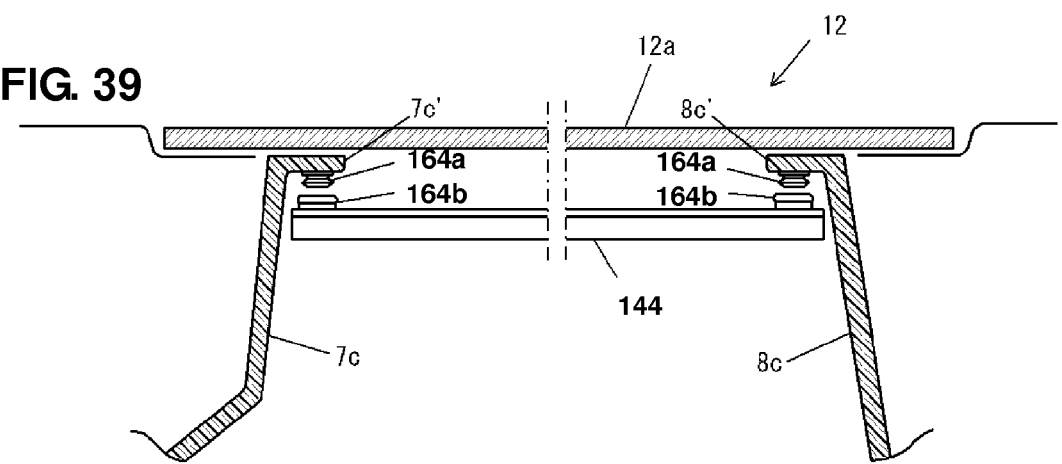

ATTACHMENT STRUCTURE OF CURTAIN-SHAPED COVER MEMBER OF VEHICLE

BACKGROUND OF THE INVENTION

The present invention relates to an attachment structure of a curtain-shaped cover member which is provided at a window of a vehicle.

Some vehicles have been recently equipped with a curtain airbag device to protect a passenger from a side impact load, in addition to an airbag device to protect a passenger from a frontal impact load. In the curtain airbag device, an airbag is stored in a vehicle longitudinal direction at a portion above a window or at an upper portion of a pillar which forms a side face of a vehicle body, and the airbag inflates receiving a gas pressure from an inflator when the side impact load acts from the vehicle side. Herein, the airbag may inflate downward along a window glass or an inner face of the pillar, pressing down or breaking part of a top ceiling which covers a roof panel from the inside of a vehicle compartment, for example.

Meanwhile, a cover member, such as a curtain or blind, which can shut out person's eyes from the vehicle outside may be optionally provided at a side face of the vehicle body beside a rear seat or a rear window in order to ensure a privacy of the passenger in the vehicle compartment or the like. Japanese Patent Laid-Open Publication No. 11-48902 discloses a member, as the cover member, which has the above-described curtain-airbag function.

Herein, in case the airbag is configured to inflate downward through a gap which is formed between the window glass and the side end portion of the top ceiling which is pressed down by the inflating airbag when the curtain airbag device is operated, if the above-described cover member, such as the curtain or the blind, is provided at the window, the following problem may occur.

While this kind of cover member generally hangs on the side end portion of the top ceiling beside the window, in case the above-described structure of the curtain airbag device is provided, the airbag of the curtain airbag device may improperly inflate into a space between the cover member and the window glass, resulting in breaking the cover member or forcing the cover member to move toward the inside of the vehicle compartment. Accordingly, a smooth inflation of the airbag would be deteriorated. As a result, it would be actually difficult for the cover member, such as the curtain, to be provided at the window in case the curtain airbag device is provided.

This problem may occur in a situation in which the curtain airbag device is provided at the upper portion of the vehicle-body rear face, for example, a back door, and the airbag inflates downward along a window glass of a rear window of the vehicle-body rear face.

SUMMARY OF THE INVENTION

Accordingly, an object of the present invention is to provide an attachment structure of a curtain-shaped cover member of a vehicle equipped with the curtain air bag device which can allow the airbag to inflate properly and smoothly.

According to the present invention, there is provided an attachment structure of a curtain-shaped cover member of a vehicle, comprising a soft top ceiling covering a roof panel from an inside of a vehicle compartment, a side end portion of which points to near an upper edge portion of a window glass of a window which is formed at a vehicle body, a curtain-shaped cover member provided to cover at least an upper portion of the window glass from the inside of the vehicle compartment, a curtain airbag device provided near an upper portion of the window, the curtain airbag device including an airbag which is stored along the upper edge portion of the window glass in a non-operation state of the curtain airbag device and inflates downward through a gap which is formed between the window glass and the side end portion of the top ceiling which is pressed down by the airbag receiving a gas pressure from an inflator, and a support member to support the curtain-shaped cover member at a position which is on an outside or lower side of the inflating airbag.

According to the present invention, since the cover member is supported at the position which is on the outside or lower side of the inflating airbag, the airbag can inflate downward along an inside face of the cover member without getting into the space between the window glass and the cover member. As a result, the airbag can inflate smoothly to perform its function properly.

Herein, according to an embodiment of the present invention, the support member supports the cover member so that the cover member can move in a vehicle longitudinal direction.

According to another embodiment of the present invention, the support member supports the cover member so that the cover member can move in a vertical direction. Accordingly, even if the inflating airbag contacts the cover member, the cover member can be allowed to move down properly by the support member. As a result, the airbag can inflate smoothly to perform its function properly.

According to another embodiment of the present invention, the attachment structure of a curtain-shaped cover member of a vehicle further comprises a rear pillar which is positioned behind the window and covered with a rear pillar trim, which is made from hard resin, from the inside of the vehicle compartment, wherein the curtain airbag device is fixed to the vehicle body along a specified portion of the rear pillar, the airbag inflates out of a space between the window and an outside end portion of the rear pillar trim so as to cover the window from the inside of the vehicle compartment, and there is provided a holding member to hold a rear end portion of the cover member at a position which is on an outside of the inflating airbag. Thereby, the rear end portion of the cover member can be surely positioned on the outside of the inflating airbag by the holding member, so that the airbag can inflate smoothly to perform its function properly.

According to another embodiment of the present invention, the rear pillar comprises an inner panel and an outer panel, a holding bracket which extends forward is provided at the inner panel, and the holding member is provided at the holding bracket. Thereby, the holding member can be fixed firmly to the vehicle body via the bracket, so the rear end portion of the cover member can be held firmly.

According to another embodiment of the present invention, the holding member is attached to the window. Thereby, the holding member can be provided without any particular bracket, so the number of parts and costs can be reduced.

According to another embodiment of the present invention, the cover member is biased forward, and engagement of the holding member with the cover member is released according to an inflation of the airbag. Thereby, the cover member is provided so as to move forward from the rear pillar according to the inflation of the airbag, so that the cover member does not prevent the inflation of the airbag surely.

According to another embodiment of the present invention, a trim is provided below the window, and the cover member is stored inside the trim in an open state thereof. Thereby, since the cover member is hidden inside the trim below the window, the exterior appearance of the vehicle can improve.

According to another embodiment of the present invention, the support member is positioned on an outside of the side end portion of the top ceiling when the curtain airbag device is in the non-operation state. Thereby, the side end portion of the top ceiling which is pressed downward by the inflating airbag can be prevented from contacting the support member.

According to another embodiment of the present invention, a support position of the cover member is located on an outside of a moving locus of the side end portion of the top ceiling which is pressed down according to an inflation of the airbag. Thereby, preventing the contact of the side end portion of the top ceiling with the support member can be achieved surely.

According to another embodiment of the present invention, there is provided an interference preventing member to prevent interference of the support member with the inflating airbag at an upper portion of the support member. Thereby, the interference of the support member with the inflating airbag can be prevented.

According to another embodiment of the present invention, a middle pillar is provided in front of the window with the window glass and a rear pillar is provided in back of the window with the window glass.

According to another embodiment of the present invention, the support member is a rail member which is attached to the window glass so as to extend in a vehicle longitudinal direction at an upper portion of the window. Thereby, the upper portion of the covering member can be kept adjacent to the upper portion of the widow glass. Accordingly, it can be prevented surely that the airbag inflates into the space between the window glass and the cover member.

According to another embodiment of the present invention, another rail member is attached to the window glass so as to extend in the vehicle longitudinal direction at a lower portion of the window, and the cover member is supported by both the rail members. Thereby, a whole part of the cover member inflates along the window glass. Accordingly, the airbag can inflate along the window glass on the inside of the cover member.

According to another embodiment of the present invention, a middle pillar is provided in front of the window with the window glass and a rear pillar is provided in back of the window with the window glass, and the rail member has a fixing portion at least one of a front end and a rear end thereof, the fixing portion being fixed to the middle pillar and/or the rear pillar. Thereby, the rail member can be fixed firmly, compared to a case in which it is fixed to the window glass.

According to another embodiment of the present invention, the middle pillar is provided in front of the window with the window glass and the rear pillar is provided in back of the window with the window glass, and the support member is a pair of rail members which is attached to the pillars. Thereby, the downward move of the cover member can be achieved surely when the inflating airbag contacts the cover member, without any particular structure for providing the support member.

According to another embodiment of the present invention, a holding portion to hold the cover member is provided at an upper portion of the support member, and holding of the cover member by the holding portion is released when the airbag inflates and contacts an upper portion of the cover member. Accordingly, opening or closing of the window with the cover member can be properly achieved at a normal state, and when the curtain airbag device operates, the airbag can inflate properly.

According to another embodiment of the present invention, the cover member is biased downward. Accordingly, the downward move of the cover member by the contact of the inflating airbag is assisted. Thus, the cover member can move quickly to the inflation of the airbag, thereby further improving the smooth inflation.

According to another embodiment of the present invention, a treatment to prevent exposure of the support member to a vehicle outside is applied to a specified potion of the window glass where the support member is attached. Thereby, the exterior appearance of the vehicle can improve.

According to another embodiment of the present invention, a slant member which extends obliquely downward and inward is provided at an upper portion of the cover member. Thereby, the passenger may operate the cover member easily by grasping the slant member. Further, the inflation of the airbag can be properly guided toward the vehicle compartment along the face of the slant member. Moreover, any interference of the inflating airbag with the support member can be prevented by the slant member.

According to another embodiment of the present invention, the cover member is a roll type of curtain member. Thereby, the cover member can be stored inside the trim compactly.

According to another embodiment of the present invention, the cover member includes a resilient member which is expandable in a vehicle longitudinal direction so that a longitudinal length thereof is adjustable. Thereby, the whole part of the window can be covered with the cover member.

Other features, aspects, and advantages of the present invention will become apparent from the following description which refers to the accompanying drawings.

BRIEF DESCRIPTION OF THE DRAWINGS

FIG. 2 is a sectional view of a support member of a curtain when an airbag is stored according to a first embodiment of the present invention, when viewed in a vehicle longitudinal direction.

FIG. 4 is a view to show position of rail members.

FIG. 31 is an enlarged sectional view taken along line X-X of FIG. 30A.

FIG. 37 is an enlarged sectional view of a curtain according to a fourteenth embodiment.

FIG. 38 is an elevation view of the rear window according to a fifteenth embodiment.

FIG. 39 is an enlarged sectional view of a curtain according to the present embodiment.

DETAILED DESCRIPTION OF THE INVENTION

Hereinafter, preferred embodiments of the present invention will be described.

Embodiment 1

Figure 1:
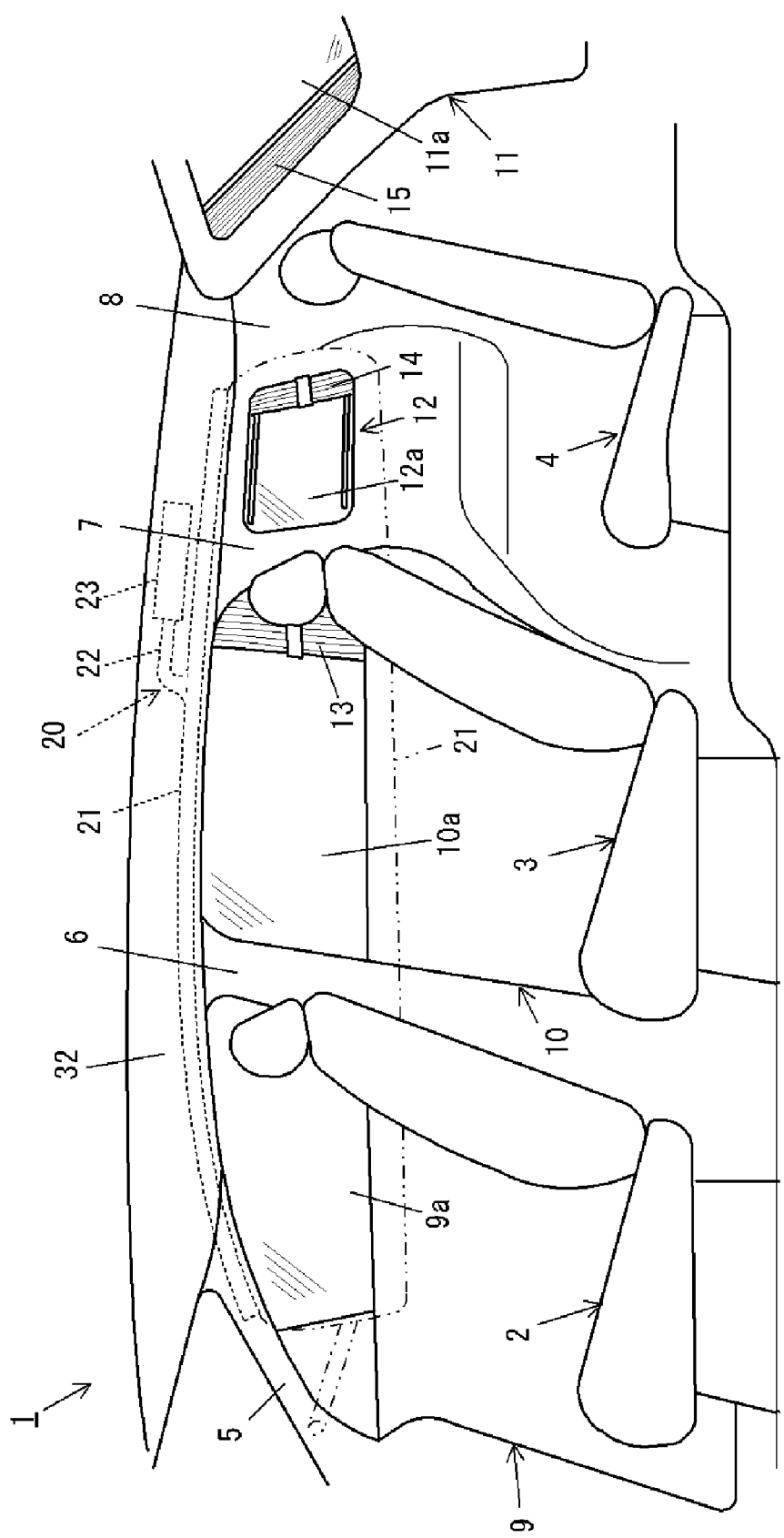
FIG. 1 is a schematic inside view of a vehicle compartment of a vehicle to which the present invention is applied.

As shown in FIG. 1, there are provided a front seat 2, a second-row seat 3 and a third-row seat 4 in a vehicle compartment of a vehicle 1 according to a first embodiment. Further, an A pillar 5, a B pillar 6, a C pillar 7 and a D pillar 8 are provided at a side face of the vehicle 1. A front side door 9 is disposed between the A pillar 5 and the B pillar 6, and a rear side door 10 is disposed between the B pillar 6 and the C pillar 7. A back door 11 is provided at a vehicle-body rear face. Window glasses 9a, 10a, 11a are provided at windows of the side doors 9, 10 and the back door 11, respectively. Herein, the window glasses 9a, 10a of the side doors 9, 10 are a vertically opening type of window glass, while the window glass 11a of the back door 11 is fixed without opening. Further, a rear window 12 is formed between the C pillar 7 and the D pillar 8, and a fixed window glass 12a is provided at this rear window 12. Moreover, curtains 13, 14, 15 are provided at the rear side door 10, the back door 11, and the rear window 12 respectively so as to cover the window glasses 10a, 11a, 12a from the inside of the vehicle compartment.

Meanwhile, in addition to an airbag device (not illustrated) which protects a passenger seated in the front seat 2 from the frontal impact load, a curtain airbag device 20 which protects passengers seated on the seats 2, 3, 4 from the side impact load is provided in the vehicle 1. The curtain airbag device 20 comprises an airbag 21 and an inflator 23 as shown in FIG. 2. The airbag 21 is stored in the vehicle longitudinal direction along an upper edge portions of the window glasses 9a, 10a, 12a of the front side door 9, the rear side door 10 and the rear window 12 at a specified position above a side end portion of a soft top ceiling (roof trim) 32 which covers a roof panel 31 form the inside of the vehicle compartment. The inflator 23 supplies an inflatable gas pressure to the airbag 21 via a supply passage 22. When the side impact load acts from the side or its action is predicted, the airbag 21 receives the gas pressure from the inflator 23 and inflates downward along the window glasses 9a, 10a, 12a through a gap which is formed between these window glass and a side end portion 32a of the top ceiling 32 which is pressed down by the inflating airbag 21, thereby protecting the passengers seated in the seats 2, 3, 4.

Herein, the curtain 13 which is provided at the rear door 10 is positioned on the outside of the above-described gap through which the airbag 21 inflates, so the curtain 13 may not be any obstacle for the airbag inflating. However, since the curtain 14 of the rear window 12 is positioned almost below the gap, there is a concern that the curtain 14 would prevent the inflation of the airbag 21.

As countermeasures for this concern, the curtain 14 is supported by support members 14a, 14b which are attached to the window glass 12a so that it can be located adjacent to the window glass 12a of the rear window 12, specifically it can be positioned on the outside of the inflating airbag 21 in the vehicle width direction. Of course, the window glass 12a to which the support members 14a, 14b are fixed is a fixed type without opening, which is firmly fixed to a flange 33a' of an outer panel 33a which forms a part of a roof side rail 33 and a flange 34a' of an outer panel 34a which forms a part of a rear fender 34. The curtain 14 is supported by the support members 14a, 14b in such a manner that an upper end of the curtain 14 is positioned above an inflation direction D of the airbag 21 of the curtain airbag device 20 as shown in FIG. 2.

Figure 3A:
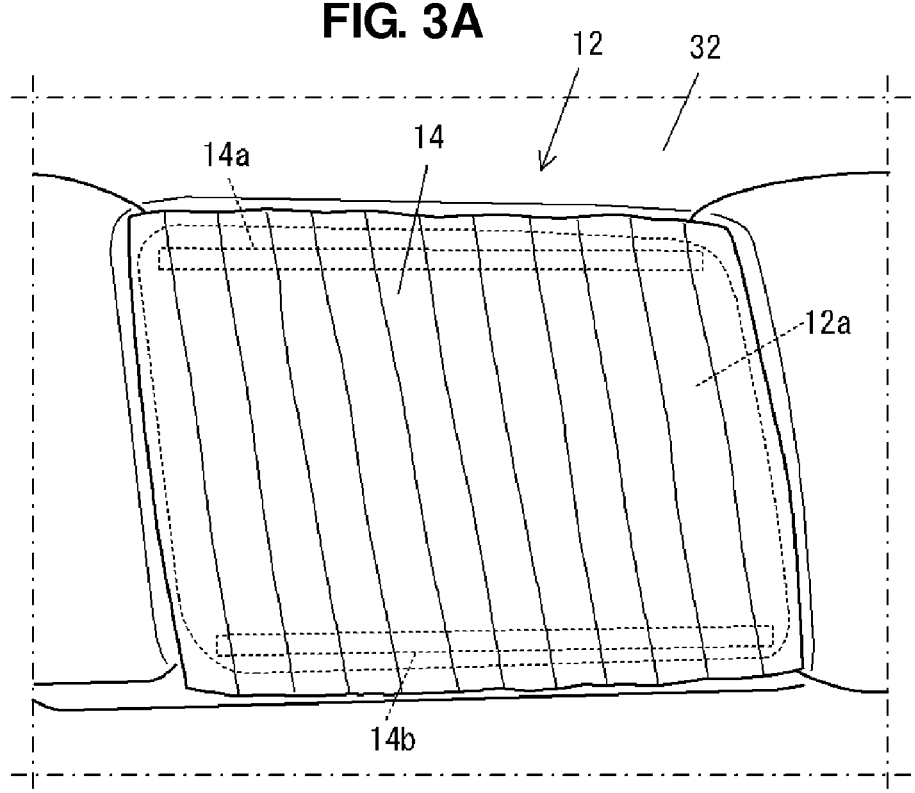
FIG. 3A is a view of the curtain which has inflated.
Figure 3B:
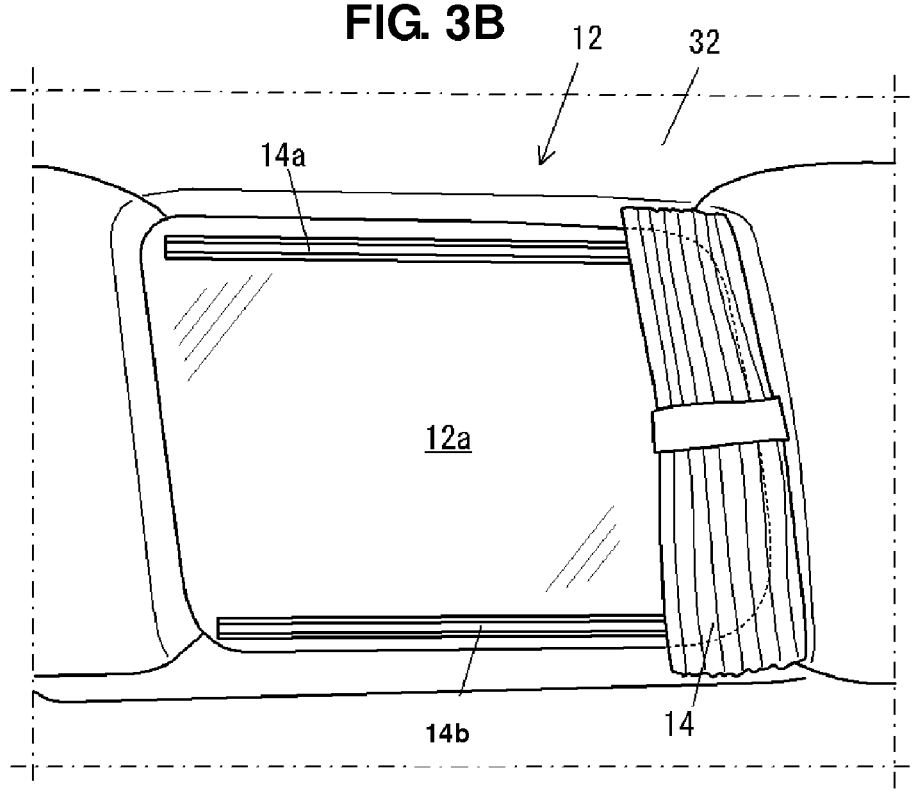
FIG. 3B is a view of the curtain which is stored, according to the first embodiment of the present invention.
Figure 5:
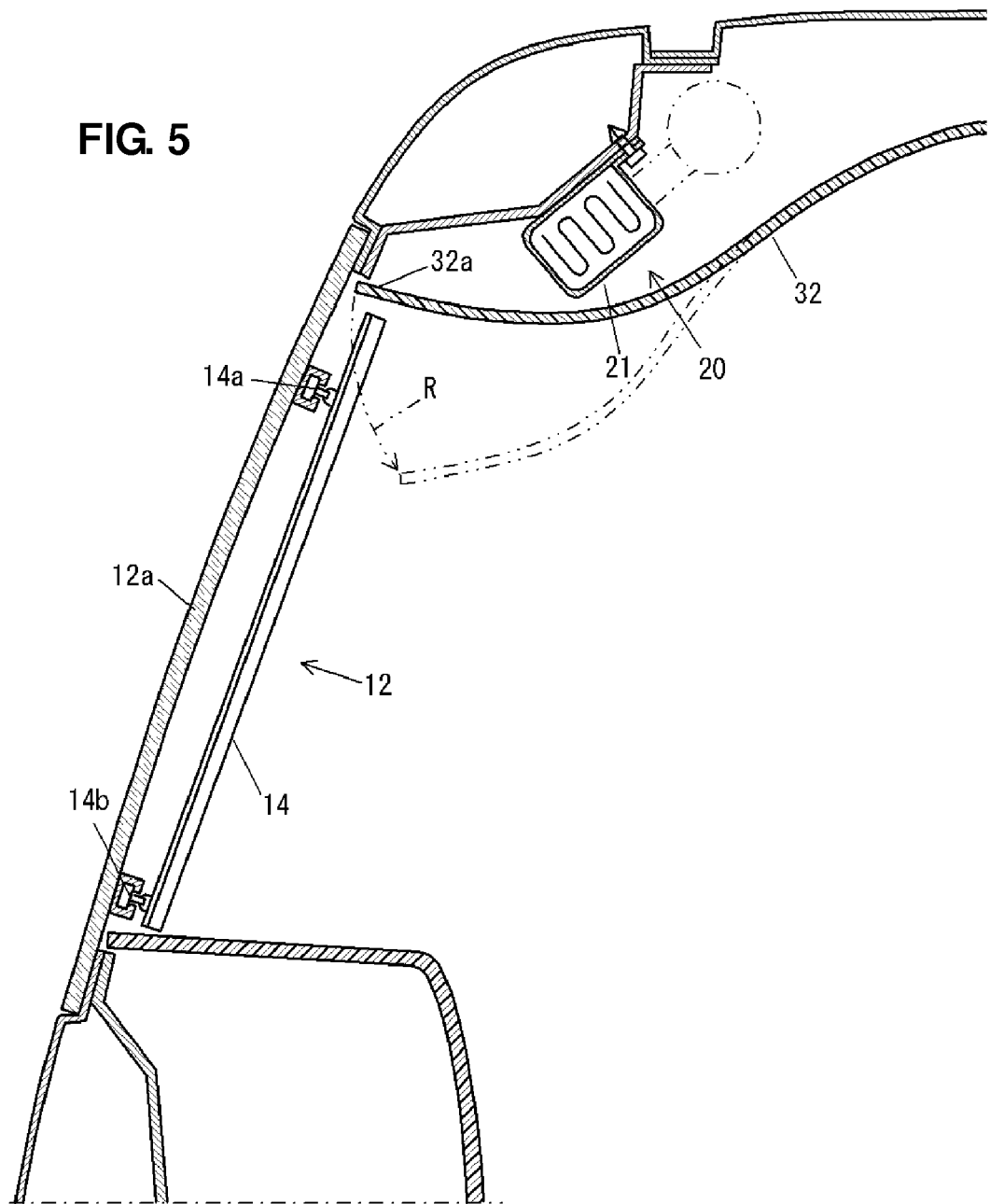
FIG. 5 is another view to show position of the rail members.

The support members 14a, 14b of the curtain 14, which are rail members extending in the vehicle longitudinal direction, supports the curtain horizontally. The member 14a is fixed to an upper portion of the window glass 12a, and the member 14b is fixed to a lower member of the window glass 12a in parallel to the member 14a (see FIG. 3A, a view of the curtain which has inflated; FIG. 3B, a view of the curtain which is stored). Fixing of these rails may be conducted by means of a both-side adhesive tape. The upper rail member 14a supports a portion of the curtain 14 which is located slightly below an upper end of the curtain 14, and the lower rail member 14b supports a lower end of the curtain 14. This position of the upper rail member 14a is located so that the side end portion 32a of the top ceiling 32 does not contact the rail member 14a when the airbag 21 inflates. Specifically, as shown in FIG. 4, the upper rail member 14a is fixed to the window glass 12a at a position which is a specified distance L away from the side end portion 32a toward the vehicle outside when the curtain airbag device 20 is not operated. Thereby, it can be prevented that the rail member 14a contacts the side end portion 32a of the top ceiling 32 which may be pressed down by the inflating airbag 21. Herein, it may be preferable that the rail member 14a be fixed to the window glass 12a so that the support position of the curtain 14 by the rail member 14a is located on the outside of a moving locus R of the side end portion of the top ceiling 32 which is pressed down according to the inflation of the airbag 21. Thereby, the contact of the side end portion 32a of the top ceiling 32 which may be pressed down according to the inflation of the airbag 21 with the rail member 14a can be prevented surely.

Hereinafter, the inflation of the airbag 21 at the position of the curtain 14 will be described. At first, the airbag 21 starts to inflate, then the side end portion 32a of the top ceiling 32 is pressed down by the inflating airbag 21. Herein, while the side end portion 32a of the top ceiling 32 contacts the curtain 14a, the upper end of the curtain 14 may return to its original position after the side end portion 32a has moved toward the inside of the vehicle compartment to some extent.

Figure 6:
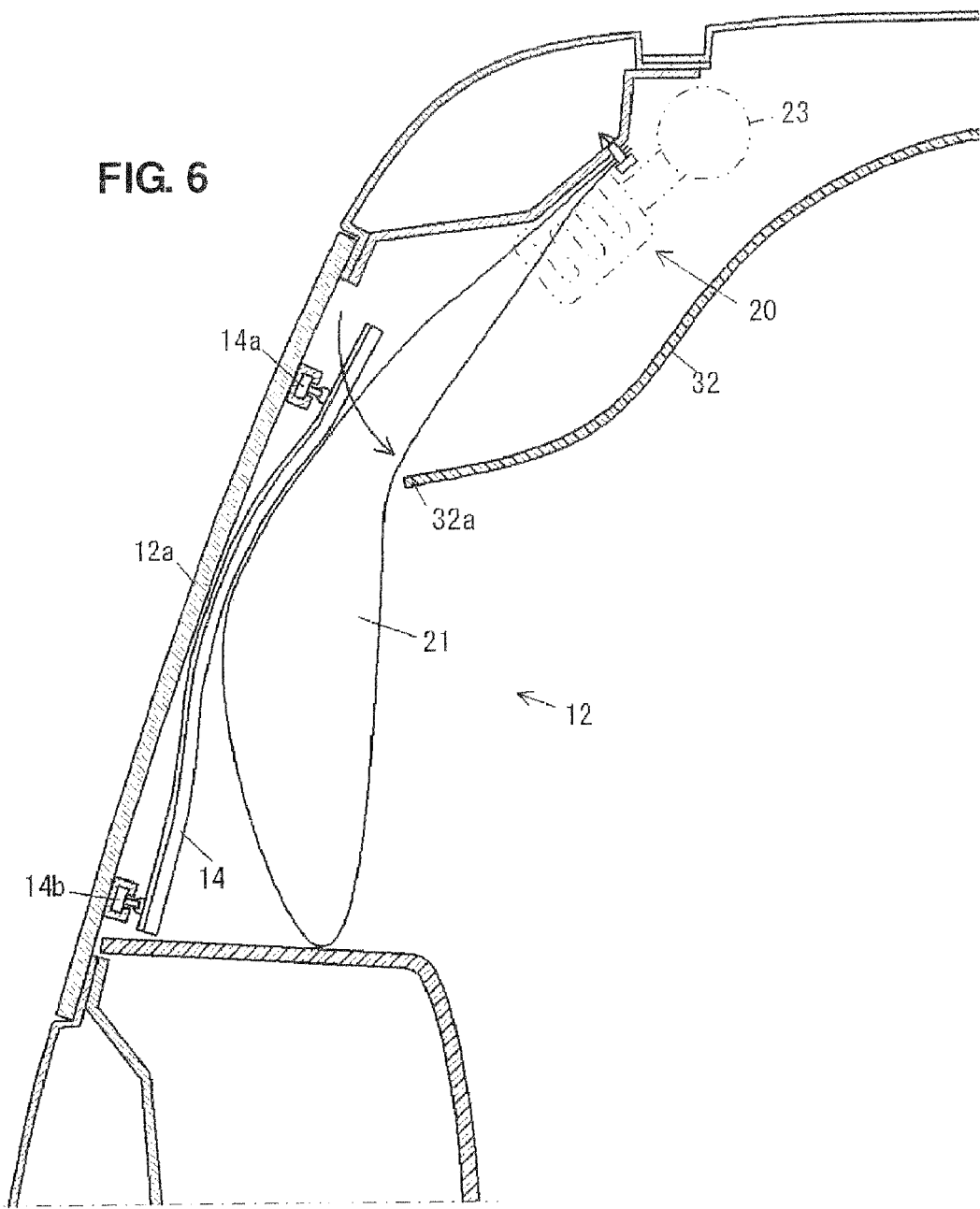
FIG. 6 is a sectional view of the support member of the curtain when the airbag inflates according to the first embodiment of the present invention, when viewed in the vehicle longitudinal direction.

Specifically, the vertical (vehicle-height direction) length of the curtain 14 is set so that the upper end of the curtain 14 can return to its original position after the contact with the side end portion 32a by the time the airbag 21 has inflated beyond the side end portion 32a of the top ceiling 32. This is because if the above-described length was too long, there is a possibility that the airbag 21 may inflate beyond the side end portion 32a of the top ceiling 32 which contacts the upper end of the curtain 14 and then inflate into a space between the window glass 12a and the curtain 14. As the airbag 21 further inflates, the side end portion 32a of the top ceiling 32 moves toward the inside of the vehicle compartment, and the airbag 21 goes beyond the side end portion 32a of the top ceiling 32 and inflates on the inside of the vehicle compartment. The airbag 21 inflates downward along the inside face of the curtain 14. Then, as shown in FIG. 6, the airbag 21 fully inflates, resulting in covering the window glass 12a of the window 12.

According to the present embodiment, since the curtain 14 is supported by the rail members 14a, 14b at the position which is on the outside of the inflating airbag 21 in the vehicle width direction, the airbag 21 can inflate downward along the inside face of the curtain 14 without getting into the space between the window glass 12a and the curtain 14. As a result, the airbag 21 can inflate smoothly to perform its function properly. Further, since the upper portion of the curtain 14 is supported by the upper rail member 14a, it can be kept adjacent to the upper portion of the widow glass 12a. Accordingly, it can be prevented surely that the airbag 21 inflates into the space between the window glass 12a and the curtain 14. Moreover, since the curtain 14 is supported by the upper and lower rail members 14a, 14b, a whole part of the curtain 14 inflates along the window glass 12a. Accordingly, the airbag 21 can inflate smoothly along the window glass 12a on the inside of the curtain 14.

Embodiment 2

While the rail members to support the curtain as the support member are fixed to the window glass by means of the both-side adhesive tap in the above-described embodiment, they are fixed to a vehicle-body member in a second embodiment.

Figure 7:
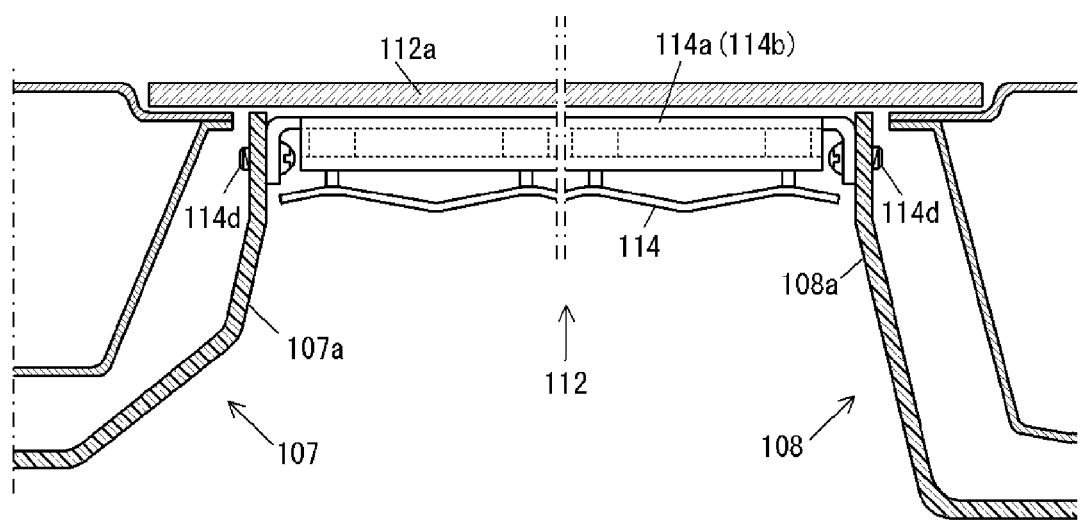
FIG. 7 is a sectional view of a support member of the curtain according to a second embodiment, when viewed from a ceiling side.

FIG. 7 is a view of rail member 114a (114b) attached according to the present embodiment, when viewed from a ceiling side. The rail member 114a (114b) extends on the vehicle longitudinal direction and supports a curtain 114 horizontally. This rail member is not fixed to the window glass 112a by means of the both-side adhesive tape, but its one end is fixed to a pillar trim 107a which forms a C pillar 107 and the other end is fixed to a pillar trim 108a which forms a D pillar 108 by bolts 114d, respectively.

According to the present embodiment, the rail members 114a, 114b are fixed to the pillar trims 107a, 108a near side end portions of the window 112. Thereby, fixing of the rail members may be made properly firm, compared to the fixing by means of the both-side adhesive tape. This embodiment may be effective for the opening type of window glass. Herein, if such firm fixation is not required very much, the both ends of the rail member may be fixed to the both pillar trims by the both-side adhesive tape. In this case, if the curtain is not provided at the window optionally (in case the rail member is not fixed to the pillar trim), the design of the pillar trim may not be deteriorated. In case the fixing is conducted by the bolt, a bolt hole to be formed at the pillar trim may not be hidden unless the curtain is provided, resulting in damaging the design.

Embodiment 3

While the both rail members as the support member to support the curtain of the first embodiment are fixed to the window glass, they are fixed to the pillar trims according to the second embodiment. The present invention should not be limited to these. According to a third embodiment, one of them is fixed to the window glass and the other is fixed to the vehicle-body member.

Figure 8:
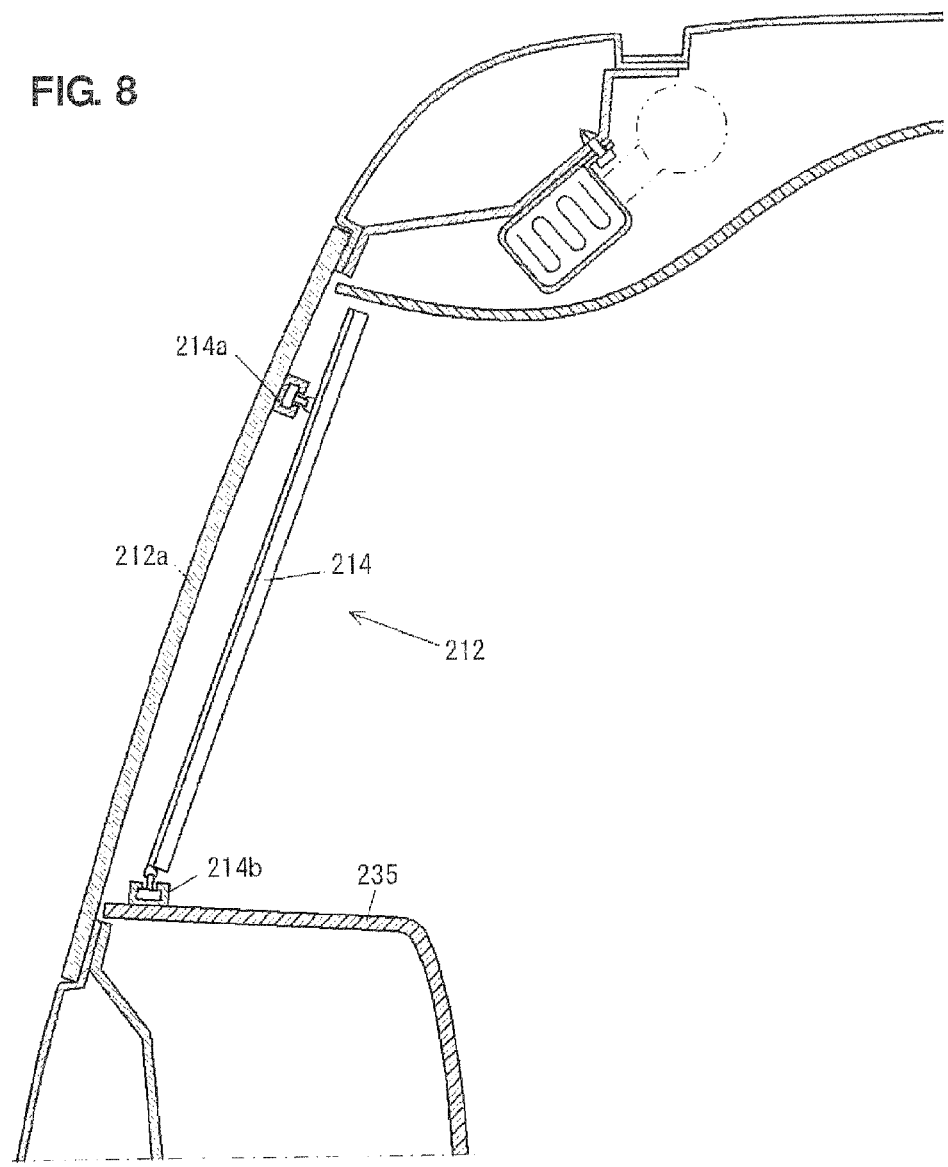
FIG. 8 is a sectional view of a support member of the curtain according to a third embodiment, when viewed in the vehicle longitudinal direction.

FIG. 8 is a sectional view of rail members 214a, 214b attached according to the present embodiment, when viewed in the vehicle longitudinal direction. An upper rail member 214a extends in the vehicle longitudinal direction and is fixed to an upper portion of a window glass 212a (which is fixed by means of the both-side adhesive tape like the first embodiment). A lower rail member 214b extends in the vehicle longitudinal direction and is fixed to a rear wheel-house trim 235 which is positioned below a window 212 (which is fixed by means of the both-side adhesive tape or bolt like the second embodiment). Herein, not limited to these, one of the rails may be attached to the upper portion of the window glass, and the other may be attached to the pillar trims at its both ends. The present embodiment may be effective in case it is difficult for the both rail members to be attached to the window glass or the vehicle-body member.

Embodiment 4

According to a fourth embodiment, the two rail members are firmly fixed to another vehicle-body member than the pillar trims.

Figure 9:
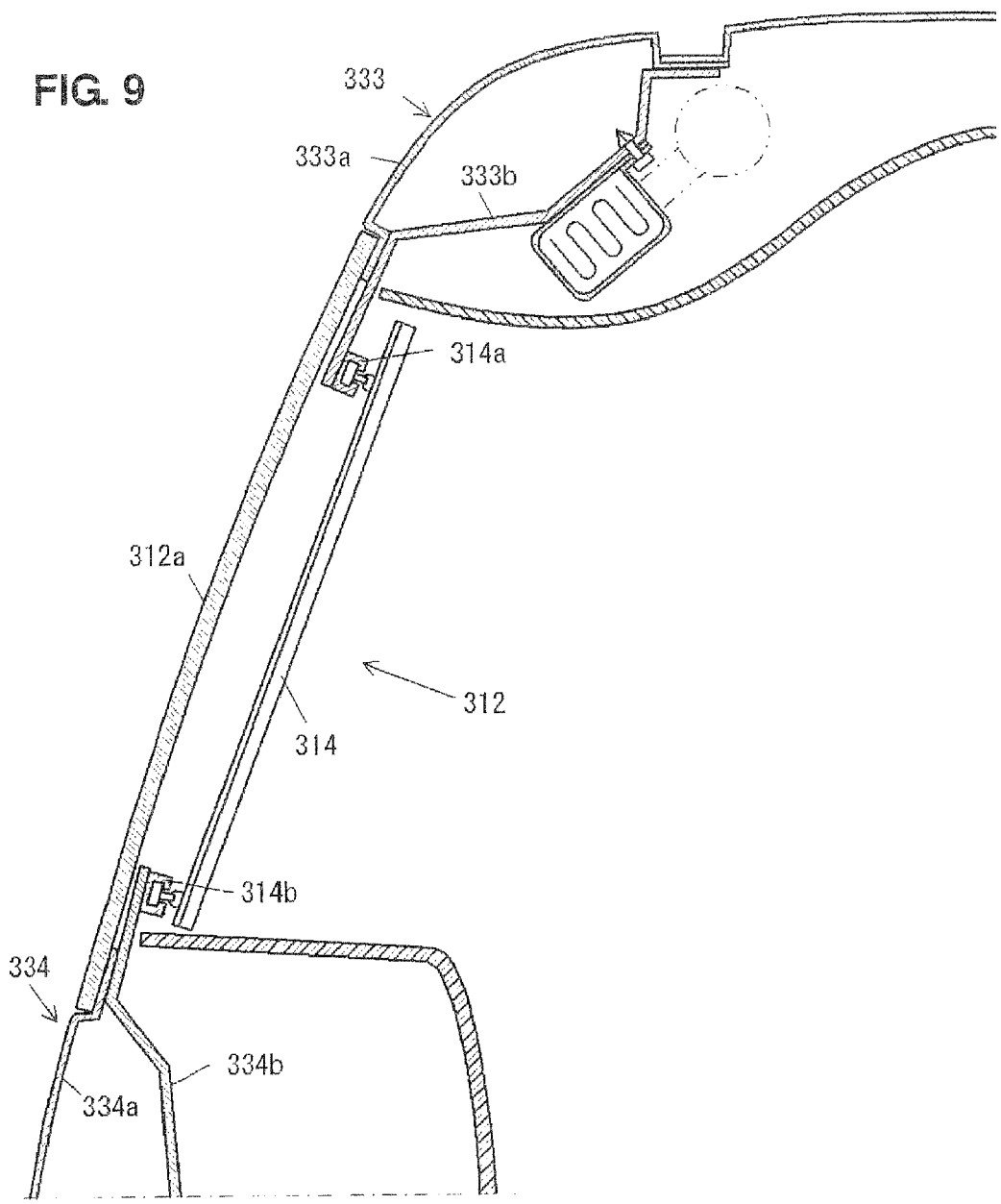
FIG. 9 is a sectional view of a support member of the curtain according to a fourth embodiment, when viewed in the vehicle longitudinal direction.

FIG. 9 is a sectional view of rail members 314a, 314b attached according to the present embodiment, when viewed in the vehicle longitudinal direction. An upper rail member 314a extends in the vehicle longitudinal direction and is fixed to an inner panel 333b which forms a part of a roof side rail 333 which supports an upper end of a window glass 312a. Specifically, a part of the inner panel 333b extends toward the inside of the vehicle compartment (window 312) at the upper portion of the window glass 312a, and the upper rail member 314a is attached to this extending portion. Meanwhile, a lower rail member 314b is fixed to an inner panel 334b which forms a part of a rear fender 334 which supports a lower end of the window glass 312a. Specifically, a part of the inner panel 334b extends toward the inside of the vehicle compartment (window 312) at the lower portion of the window glass 312a, and the lower rail member 314b is attached to this extending portion. The present embodiment may be effective in case the curtain is always provided at the window, not optionally. The rail members can be fixed firmly.

Embodiment 5

A fifth embodiment is an example in which rail members attached to the window glass is not visible from the vehicle outside.

Figure 10:
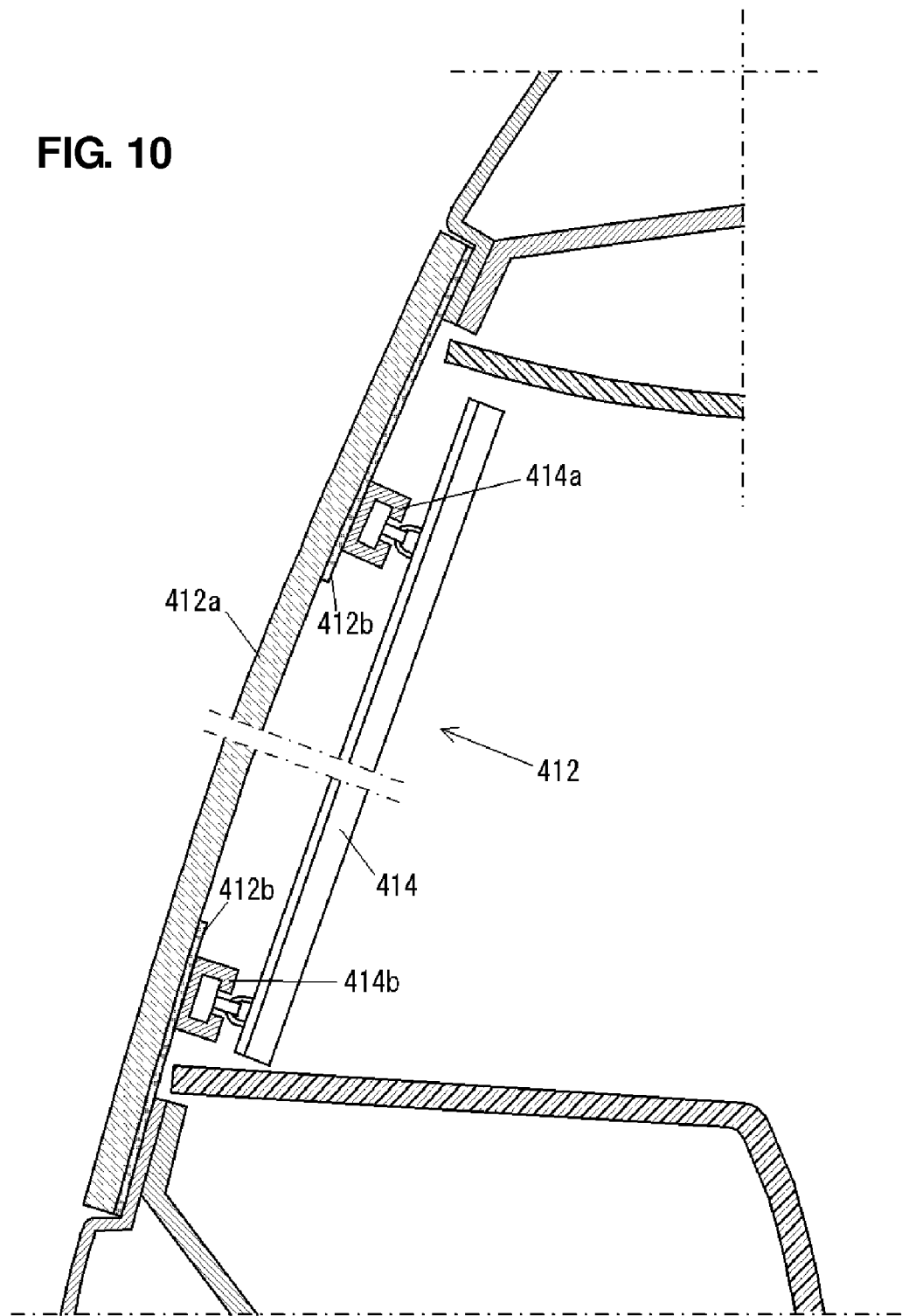
FIG. 10 is a sectional view of a support member of the curtain according to a fifth embodiment, when viewed in the vehicle longitudinal direction.

FIG. 10 is a sectional view of rail members 414a, 414b attached according to the present embodiment, when viewed in the vehicle longitudinal direction. Two rail members 414a, 414b are fixed onto a ceramic coat 412b which is applied at a periphery of an inner face of a window glass 412 by means of the both-side adhesive tape, for example. In other words, to an attachment portion of the rail members 414a, 414b to the window glass is applied a treatment of the ceramic coat 412b to prevent exposure of the rail members 414a, 414b to the vehicle outside.

Figure 11:
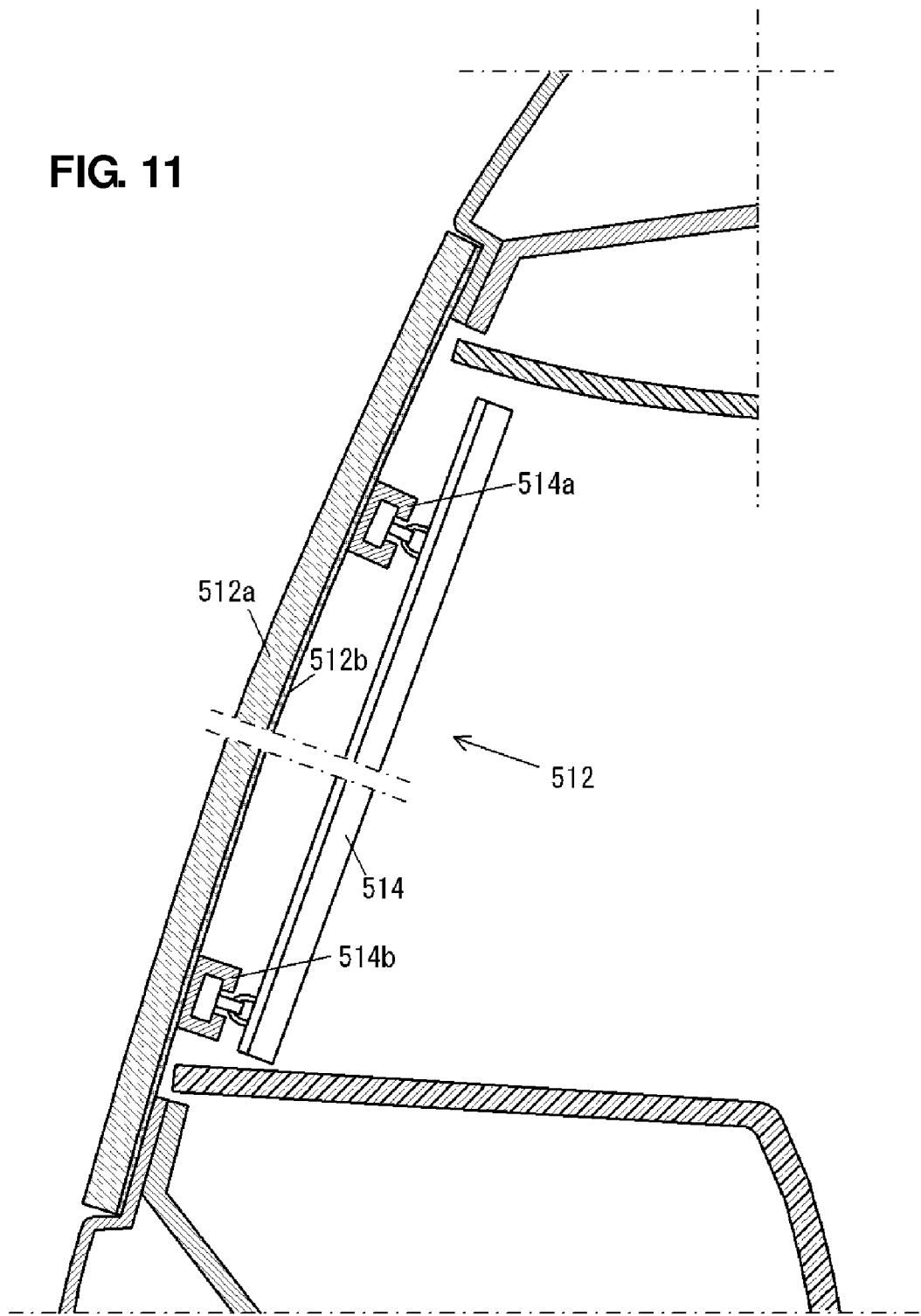
FIG. 11 is a sectional view of another support member of the curtain according to the fifth embodiment, when viewed in the vehicle longitudinal direction.

According to the present embodiment, since the ceramic coat 412b prevents the rail members 414a, 414b from being seen from the vehicle outside, the exterior appearance of the vehicle can improve. Herein, in place of the ceramic coat, a color film 512b, such as an infrared shut-off film, may be stuck on the inside face of a window glass 512, and the rail members 514a, 514b may be fixed on the film 512b as shown in FIG. 11. In this alternative, likewise, the rail members 514a, 514b can be prevented from being seen from the vehicle outside. Consequently, the exterior appearance of the vehicle is improved.

Embodiment 6

A sixth embodiment shows an example to cope with a case in which there occurs interference of the rail member with the inflating airbag.

Figure 12:
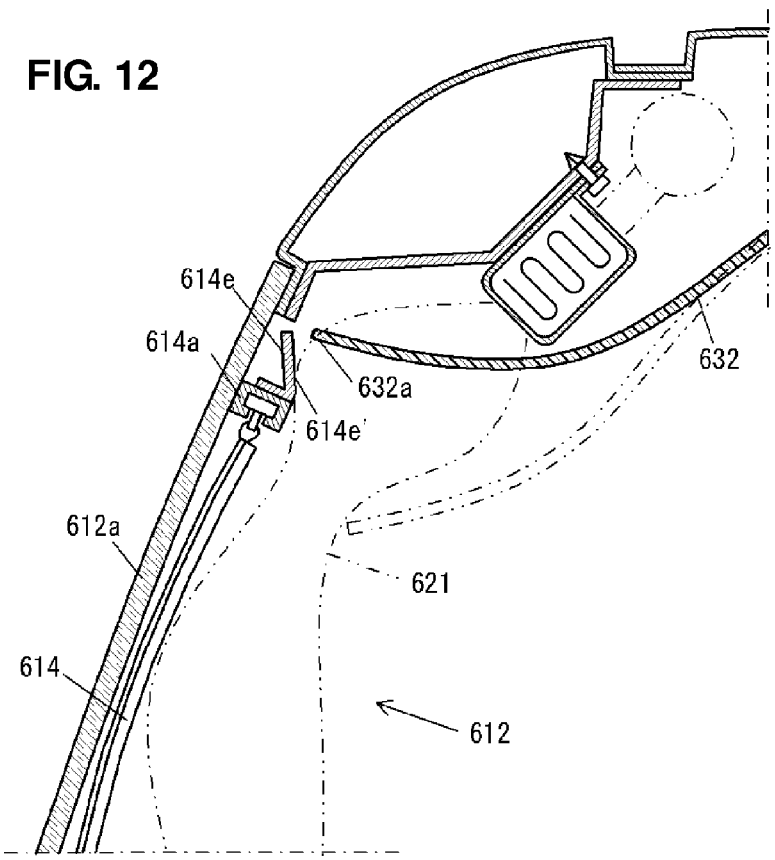
FIG. 12 is a sectional view of a support member of the curtain according to a sixth embodiment, when viewed in the vehicle longitudinal direction.

FIG. 12 is a sectional view of a rail member according to the present embodiment, when viewed in the vehicle longitudinal direction. As shown in FIG. 12, a rail member 614a extends in the vehicle longitudinal direction and supports a curtain 614 in such a manner that the curtain 614 hangs on a window 612. Thus, there is a concern that the inflating airbag would contact the rail member directly, compared to the case shown in FIG. 2 in which the rail member supports the portion of the curtain which is located slightly below the upper end of the curtain. This would deteriorate the smooth inflation of the airbag.

Thus, according to the present embodiment, there is provided an interference preventing member 614e which prevents interference of the rail member 614a with an inflating airbag 621, i.e., which avoids a direct contact of these members, at an upper portion of the rail member 614a. This interference preventing member 614e also performs function of assisting the inflation of the airbag 621 toward the inside of the vehicle compartment, that is, it guides the airbag 621 inflating toward the rail member 614a toward the inside of the vehicle compartment, in addition to preventing the above-described interference. Therefore, this member 614e has a guide face 614e'. Thereby, the airbag 621 is prevented from interfering with the rail member 614a, and its inflation direction is changed from a direction toward the rail member 614a to a direction toward the inside of the vehicle compartment. Herein, of course, interference of the interference preventing member 614e with a side end portion 632a of a top ceiling 632 which is pressed down by the inflating airbag 614e is avoided (considering this, the rail member 614a is fixed to the window glass 612a).

Figure 15:
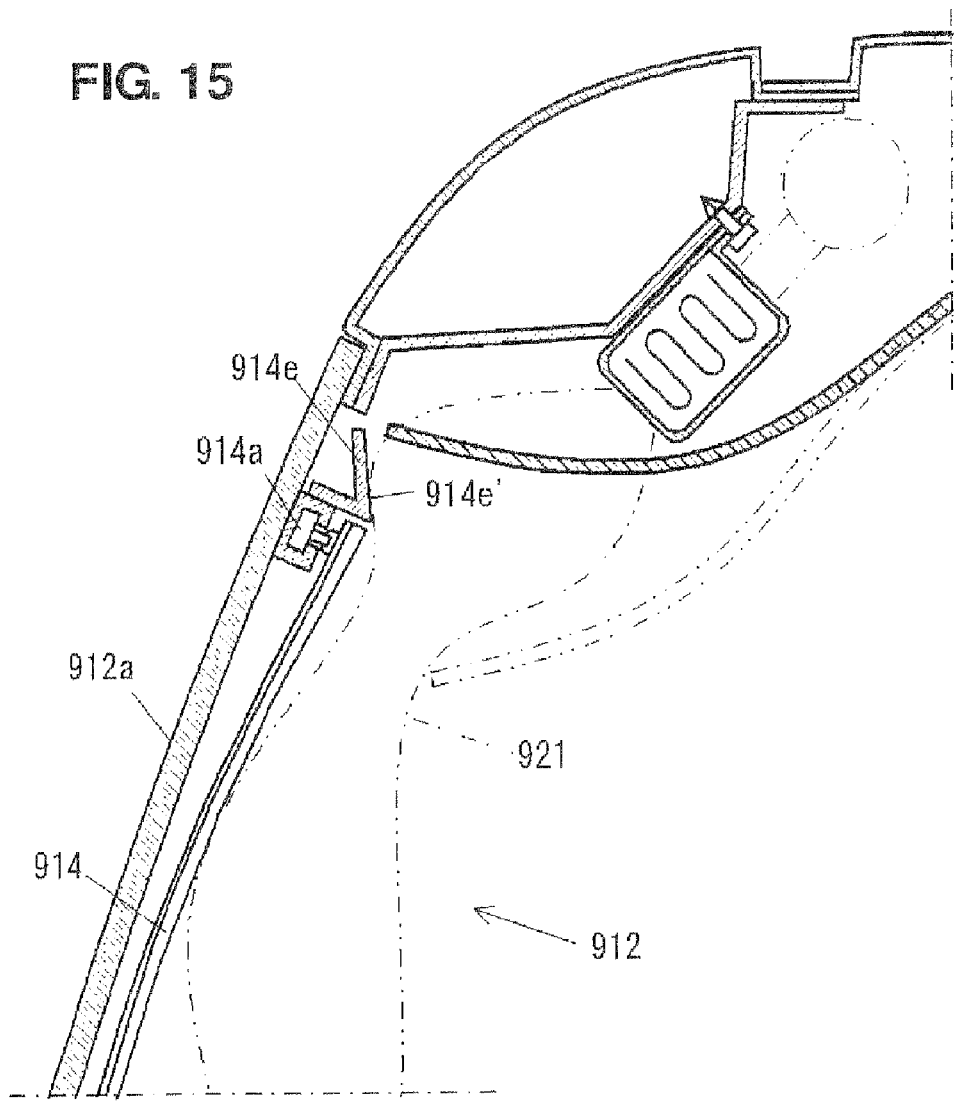
FIG. 15 is a sectional view of another support member of the curtain according to the sixth embodiment, when viewed in the vehicle longitudinal direction.
Figure 16:
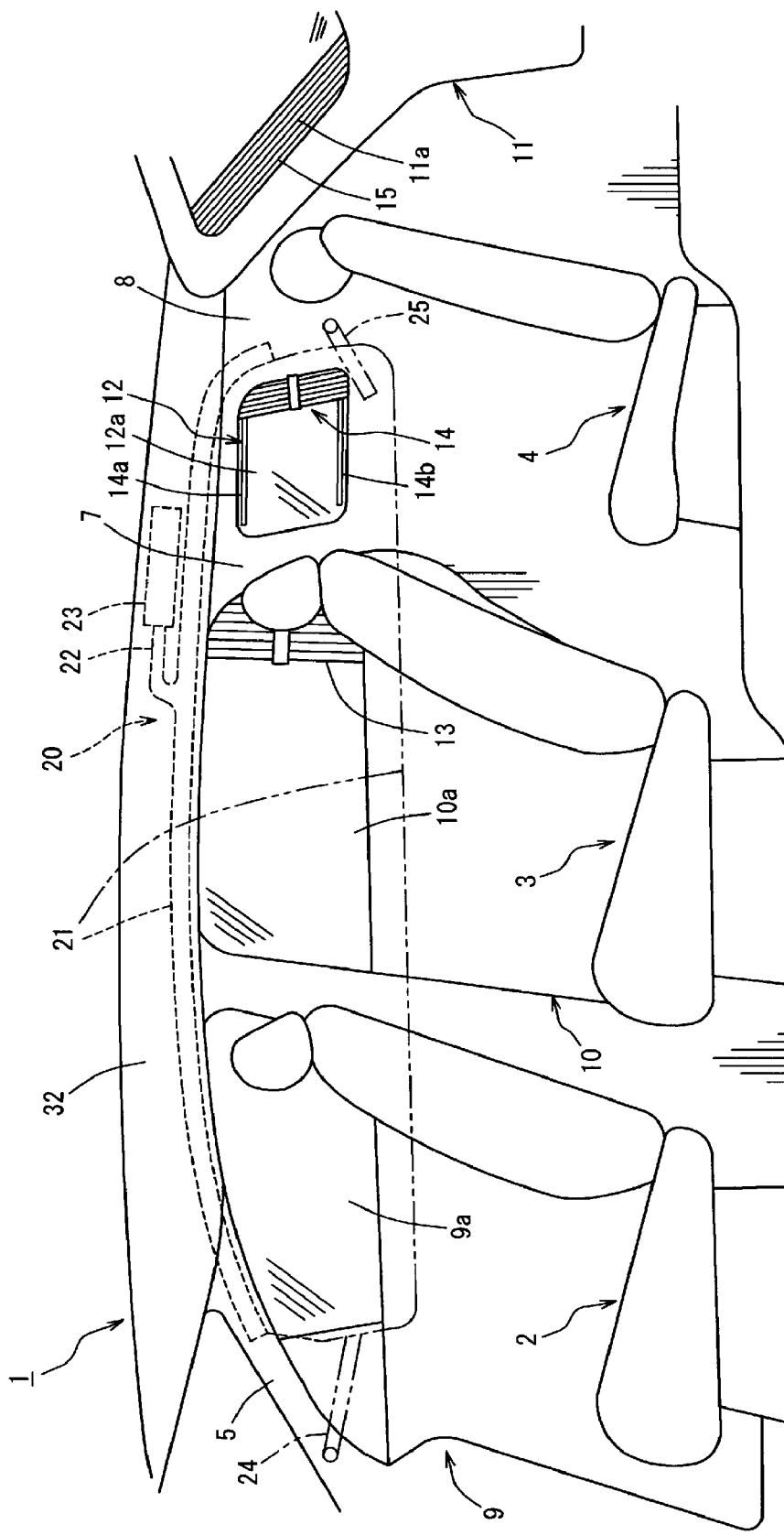
FIG. 16 is a schematic inside view of a vehicle compartment of a vehicle according to an eighth embodiment of the present invention, which shows each open state of curtains.
Figure 17:
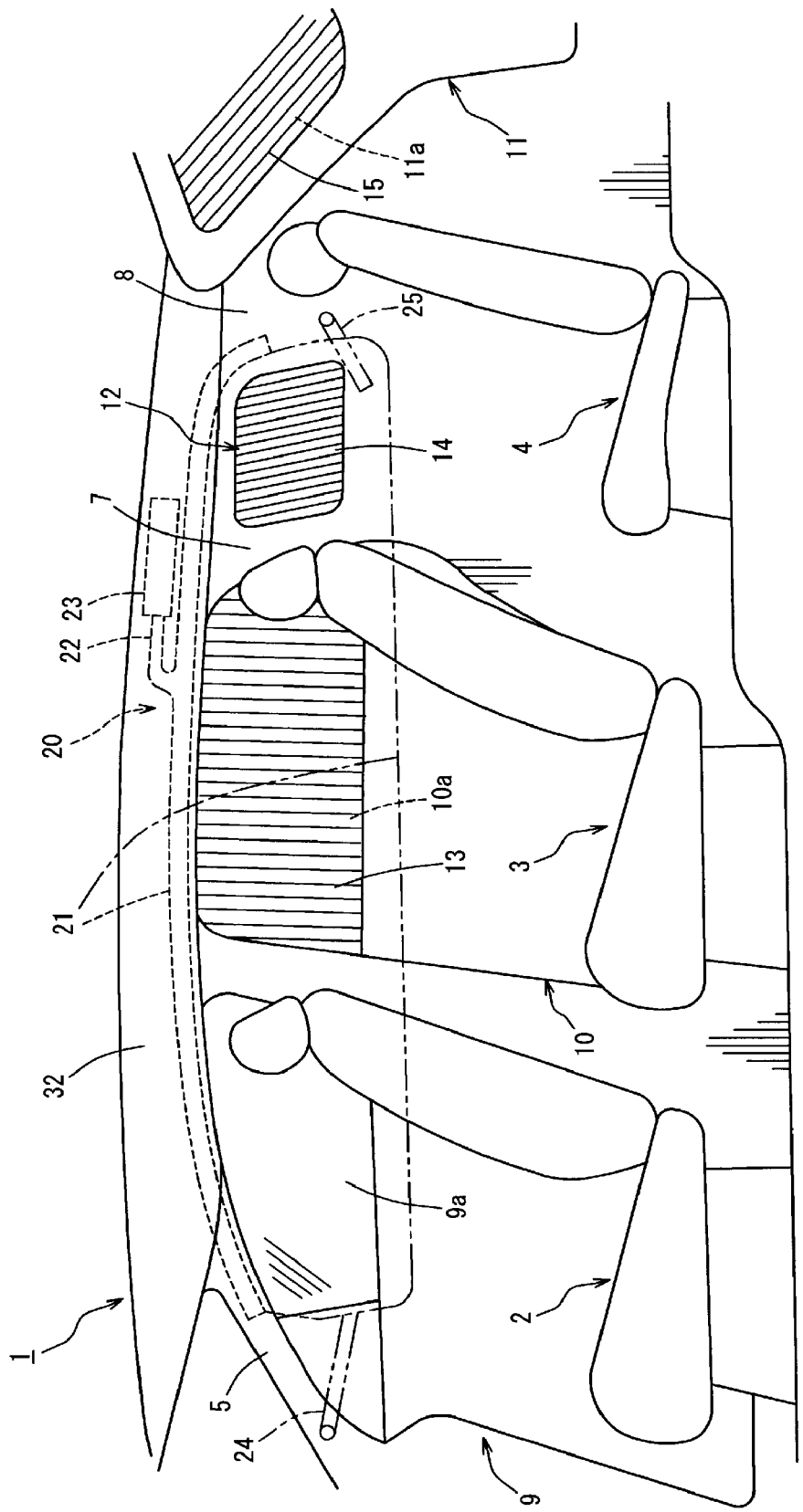
FIG. 17 is a schematic inside view of the vehicle compartment of the vehicle according to the eighth embodiment of the present invention, which shows each closed state of the curtains.
Figure 18:
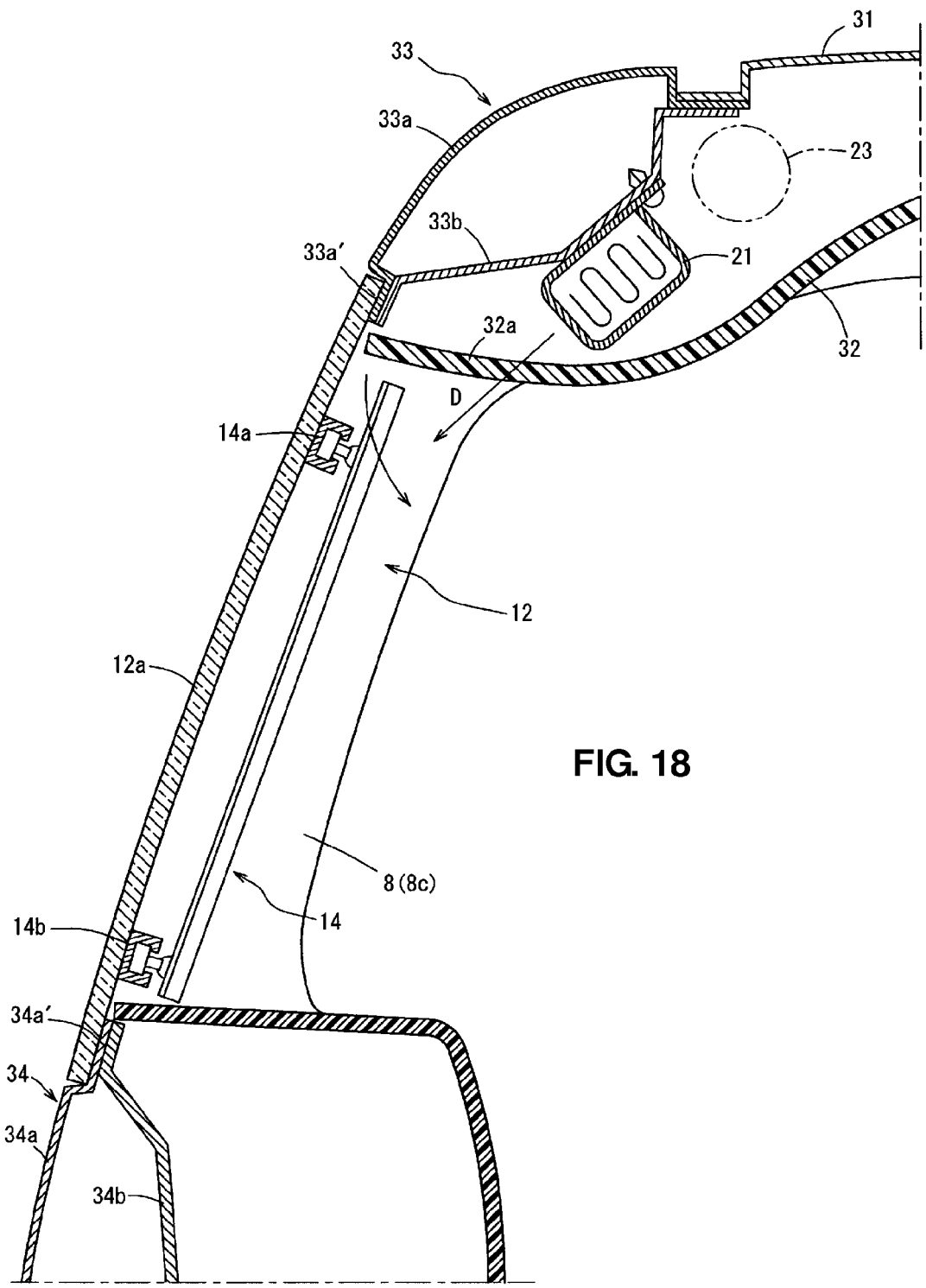
FIG. 18 is a sectional view of surroundings of a rear window.

According to the present embodiment, the interference of the rail member 614a with the inflating airbag 621 can be prevented by the interference preventing member 614e provided at the upper portion of the rail member 614a. Herein, while the rail member 614a with the interference preventing member 614e of the embodiment described above supports the curtain 614 in such a manner that the curtain 614 hangs, the rail member may be configured to support the curtain horizontally as shown in FIG. 15, which is like the first through fifth embodiments. Herein, in case an interference preventing member 914e is equipped with a guide face 914e' like the interference preventing member 914e of the embodiment described above, it may be preferable that an upper end of a curtain 914 be supported horizontally by a rail member 914a. This is because if the curtain is supported at the specified portion thereof which is located slightly below its upper like the above-described first through fifth embodiments, the curtain may be some obstacle for the inflating airbag which is guided by the guide face toward the inside of the vehicle compartment.

Embodiment 7

A seventh embodiment is an example in which the support member to support the curtain is not a rail member.

Figure 13:
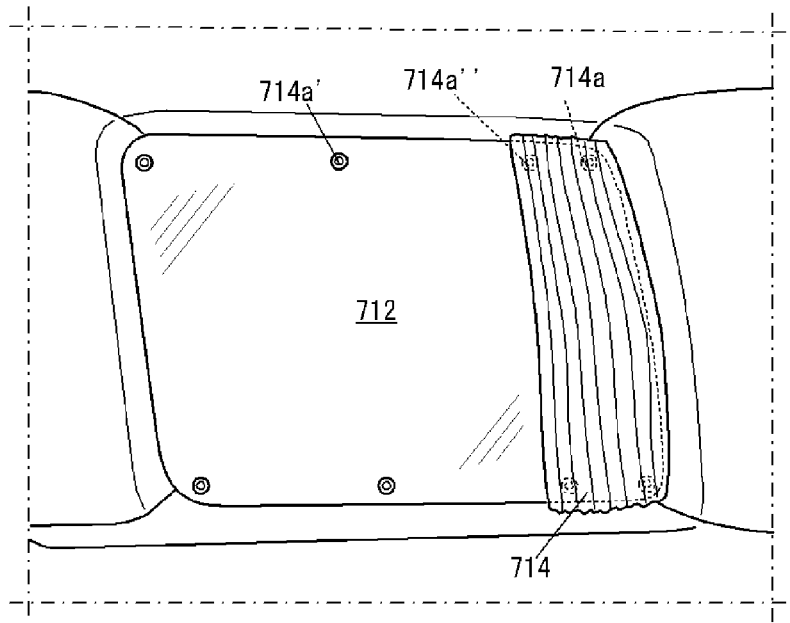
FIG. 13 is a view of a support member of the curtain according to a seventh embodiment.
Figure 14:
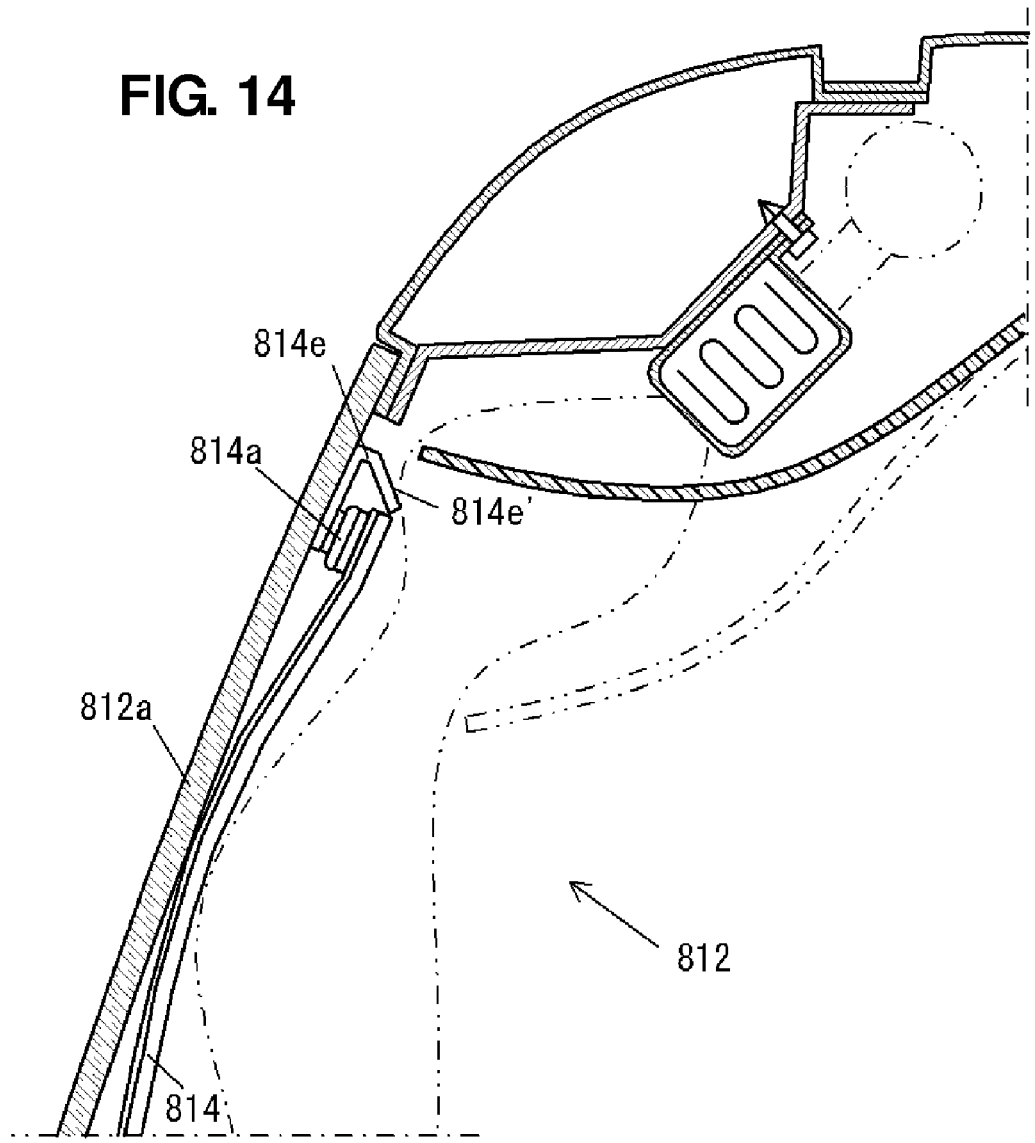
FIG. 14 is a sectional view of another support member of the curtain according to the seventh embodiment, when viewed in the vehicle longitudinal direction.

In the present embodiment, snap buttons 714a are used as the support member to support a curtain 714 as shown in FIG. 13. The snap button 714a comprises a convex (or concave) button 714a' which is fixed to a window glass 712, and a button 714a" which is fixed to the curtain 714 so as to engage with the button 714a'. The present embodiment performs the similar function like the rail members described above, and in case the curtain becomes unnecessary, it can be removed from the window easily. Herein, it may be preferable that an interference preventing member 814e be provided above a snap button 814a, as shown in FIG. 15, as an alternative embodiment like the above-described sixth embodiment in case the support member possibly has a possibility of the interference with the inflating airbag. In this case, a guide face 814e' of the interference preventing member 814e guides the inflation of an airbag 821 toward the inside of the vehicle compartment, and the direct contact of the airbag 821 with the snap button 814a can be avoided by this member 814e.

The present invention should not be limited to the above-described embodiments. For example, while two rail members are provided in the above-described embodiments, only a single member to support the upper portion of the window glass may be applied instead of the two in case the window glass is provided so as to extend substantially vertically. This is because the curtain may properly hang along a whole part of the window glass without a lower rail member, so that the airbag can inflate smoothly.

Hereinafter, some alternatives of the above-described first embodiment which are equipped with a holding member (snap member) to hold a rear end portion of the curtain at a position which is on the outside of the inflating airbag will be described as eighth through eleventh embodiments. The same components parts as those of the first embodiment are denoted by the same reference characters, and detailed descriptions of those will be omitted.

Embodiment 8

Figure 19A:
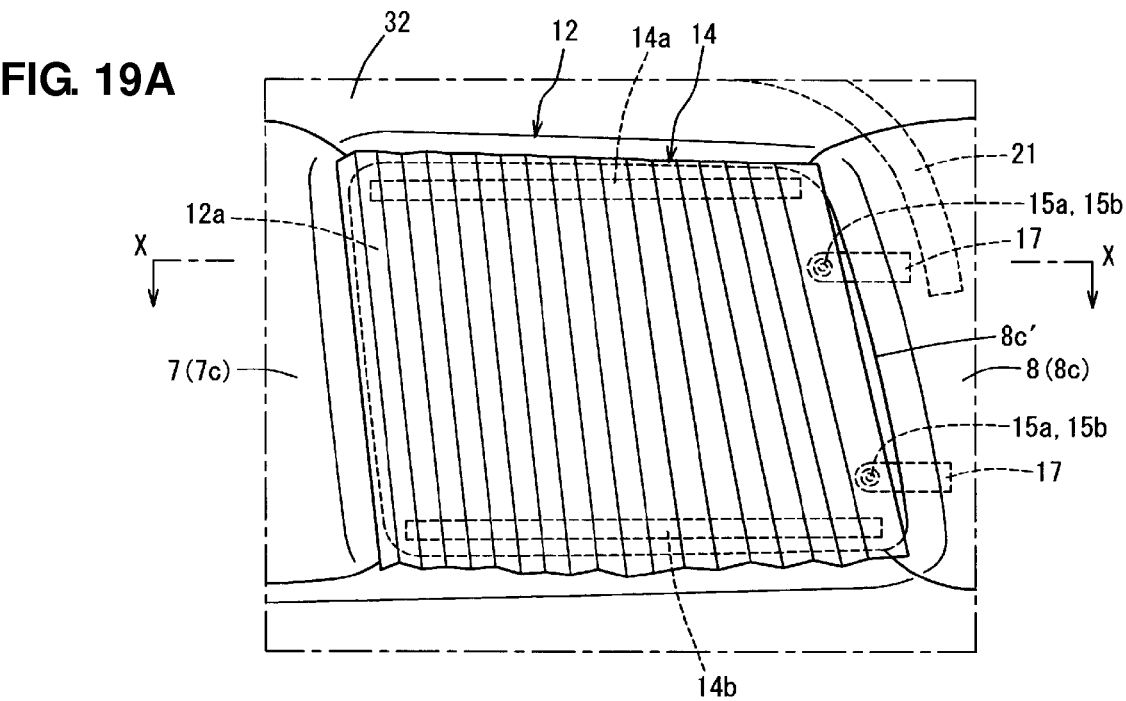
FIG. 19A is an elevation view of the rear window with the curtain closed.
Figure 19B:
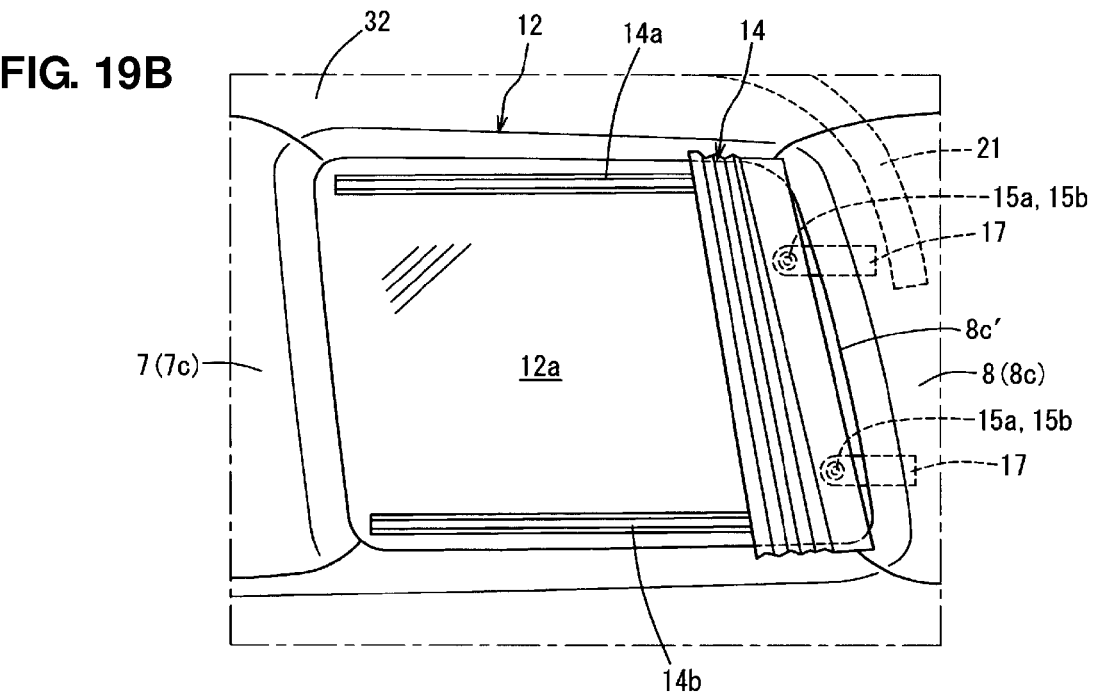
FIG. 19B is an elevation view of the rear window with the curtain open.

An eighth embodiment will be described referring to FIGS. 16 through 21. In the present embodiment, there are provided tethers 24, 25, one ends of which are fixed to the A pillar 5 and the D pillar 8 and the other ends of which are the front end and the rear end of the airbag 21, respectively. The airbag 21 is configured such that its rear end portion extends to the inside of the D pillar 8 and is covered with a trim 8c from the inside of the vehicle compartment as shown in FIGS. 19A, 19B. Further, the rear end portion of the airbag 21 is fixed to the vehicle body along a specified portion (a front side portion) of the D pillar 8 when the airbag is stored. The tethers 24, 25 are stored so as to extend substantially along the A pillar 5 and the D pillar when the airbag 21 is stored. The tethers 24, 25 extend in the vehicle longitudinal direction and pull the airbag 21. Thereby, a tension line is formed at the airbag 21 in the vehicle longitudinal direction, thereby applying a tension to the airbag 21 to improve the protection of the passenger.

Figure 20:
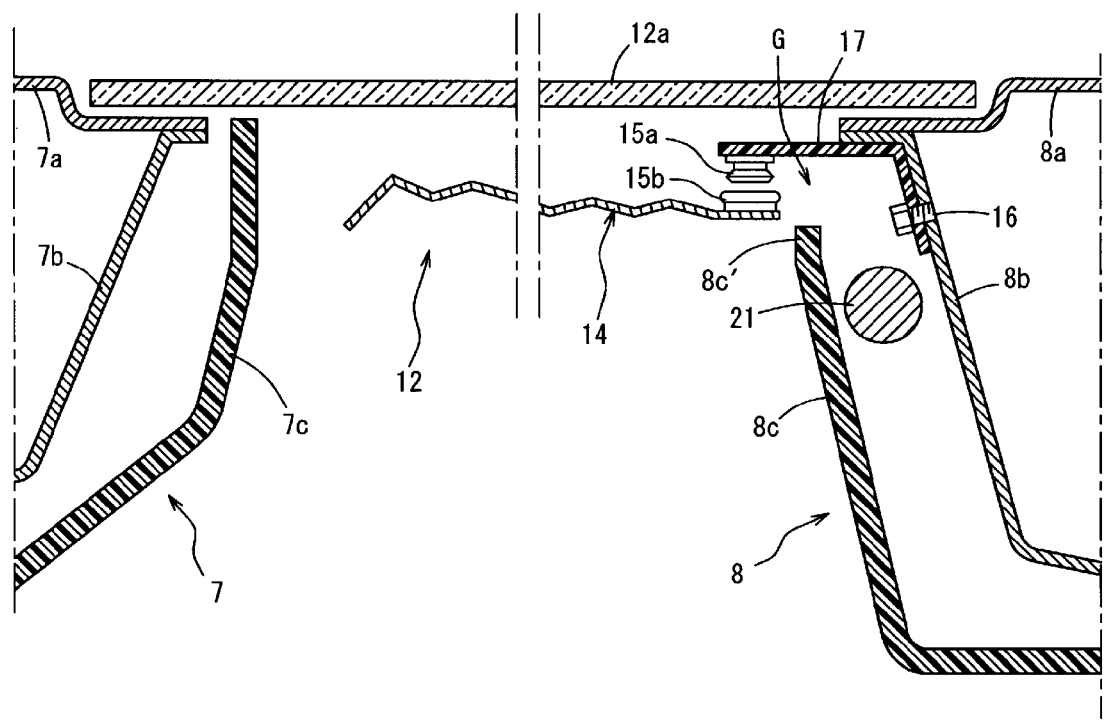
FIG. 20 is a sectional view taken along line X-X of FIG. 19A.

FIG. 20 is a sectional view taken along line X-X of FIG. 19A. As shown in FIGS. 19A, 19B and 20, two vehicle-body side snap members 15a, 15a (hereinafter, referred to as "snap member 15a") are provided near a front edge portion 8c' of the trim 8c, i.e., near a rear side portion of the rear window 12. Meanwhile, two curtain-side snap members 15b, 15b (hereinafter, referred to as "snap member 15b") which correspond to the vehicle-body side snap members 15a, 15a respectively are provided at the outside of the rear end portion of the curtain 14. Herein, by connecting the snap members 15b, 15b to the snap members 15a, 15a, the rear end portion of the curtain 14 is held at a specified position with the snap members 15a, 15b. An illustration of the rail members 14a, 14b is omitted in FIG. 20.

The C pillar 7 and the D pillar 8 have closed cross sections which are formed by outer panels 7a, 8a and inner panels 7b, 8b, respectively, and their respective insides are covered with pillar trims 7c, 8c as shown in FIG. 20. The above-described snap member 15a is attached to the vehicle body (inner panel 8b) via a resin bracket 17 which is fixed to the inner panel 8b of the D pillar 8 with a fixing member 16 of a bolt and a nut.

Figure 21:
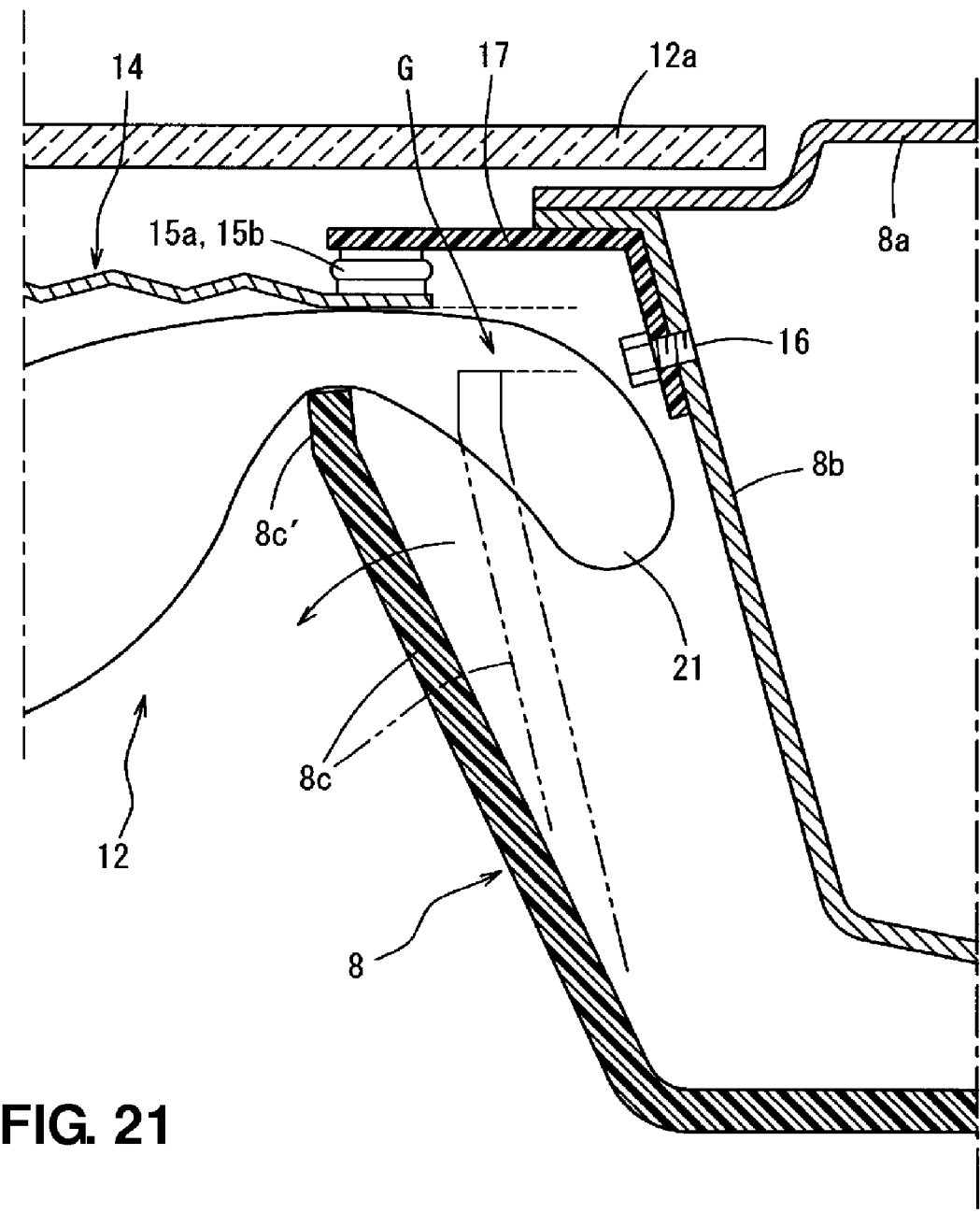
FIG. 21 is a view showing a state in which the airbag inflates.

Specifically, a rear end portion of the bracket 17 is fixed to the inner panel 8b with the fixing member 16, meanwhile a front end portion of the bracket 17 extends forward along the window glass 12a of the rear window 12. A tip of the front end portion extends into the inside of the vehicle compartment through a gap between the inner panel 8b and the trim 8c, and the snap member 15a is attached to this tip of the front end portion. Thus, the passenger can connect or disconnect these snap members 15a, 15b easily in the vehicle compartment. The rear end portion of the airbag 21 is stored in a space between the inner panel 8b of the D pillar 8a and the trim 8c as shown. When the airbag 21 inflates, as shown in FIG. 21, the front edge portion 8c' of the trim is opened by the inflating airbag toward the inside of the vehicle compartment. Then, the airbag 21 inflates forward along the window glass 12a, getting out of a gap G which is formed near the front edge portion 8c' opened.

According to the present embodiment, herein, by connecting the snap members 15a, 15b, the rear end portion of the curtain 14 is held at the position which is on the outside of the front edge portion 8c' of the trim 8c, i.e., on the outside of inflation position of the airbag 21, as shown in FIG. 21. Accordingly, since the curtain 14 is located on the outside of inflating airbag 21, the forward inflation of the airbag 21 is not prevented by the curtain 14. Consequently, the airbag can inflate toward the inside of the vehicle compartment smoothly, thereby achieving the protection of the passenger. Further, the tether 25 (see FIGS. 16 and 17) inflates toward the inside of the vehicle compartment through the gap G which is formed according to the inflation of the rear end portion of the airbag 21 at the rear end portion of the airbag 21. Moreover, since the snap member 15a can be firmly fixed to the vehicle body via the bracket 17 by providing the snap member 15a at the bracket 17 which extends forward from the inner panel 8b of the D pillar 8, the rear end portion of the curtain 14 can be held firmly.

Embodiment 9

Figure 22A:
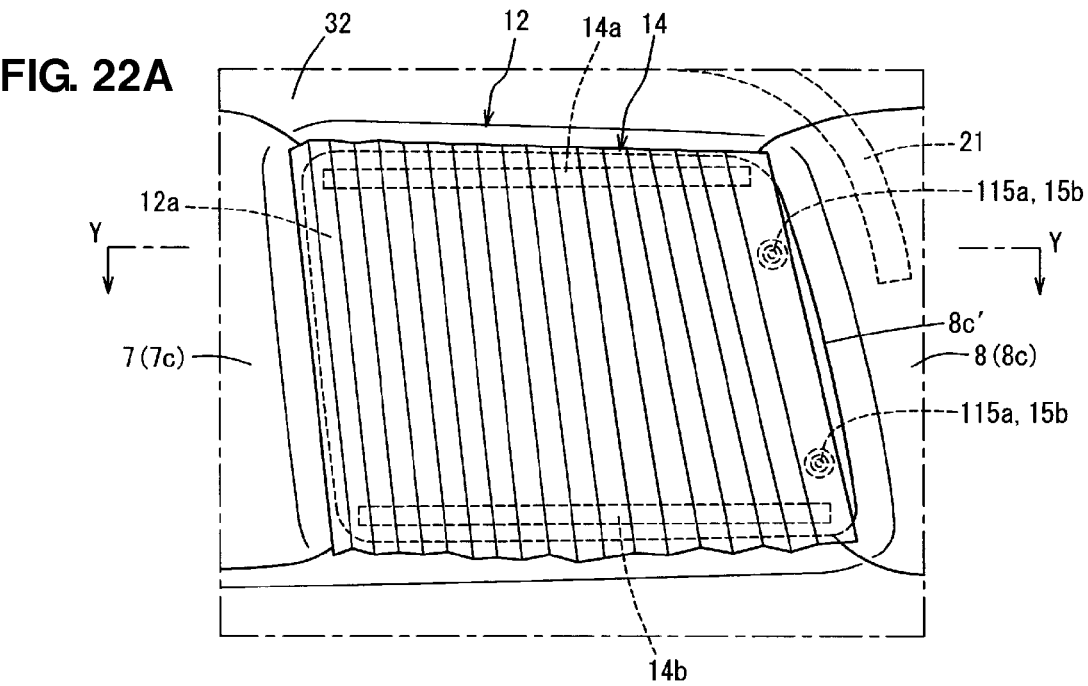
FIGS. 22A, 22B are elevation views of the rear window according to a ninth embodiment, which corresponds to FIG. 19A, 19B, respectively.
Figure 22B:
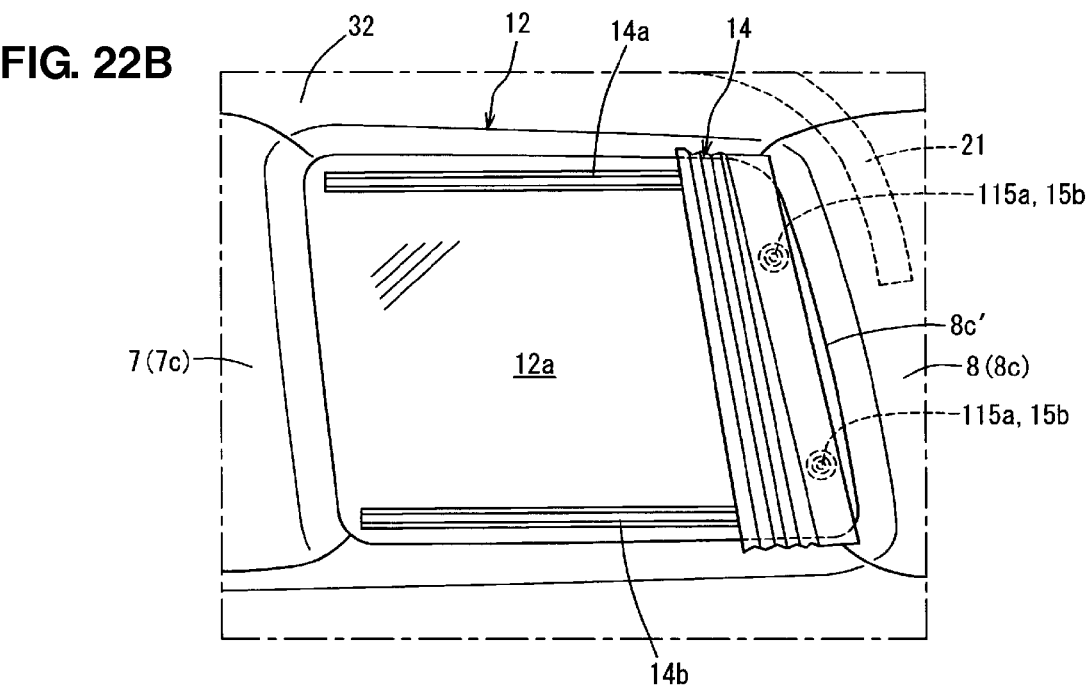
Figure 23:
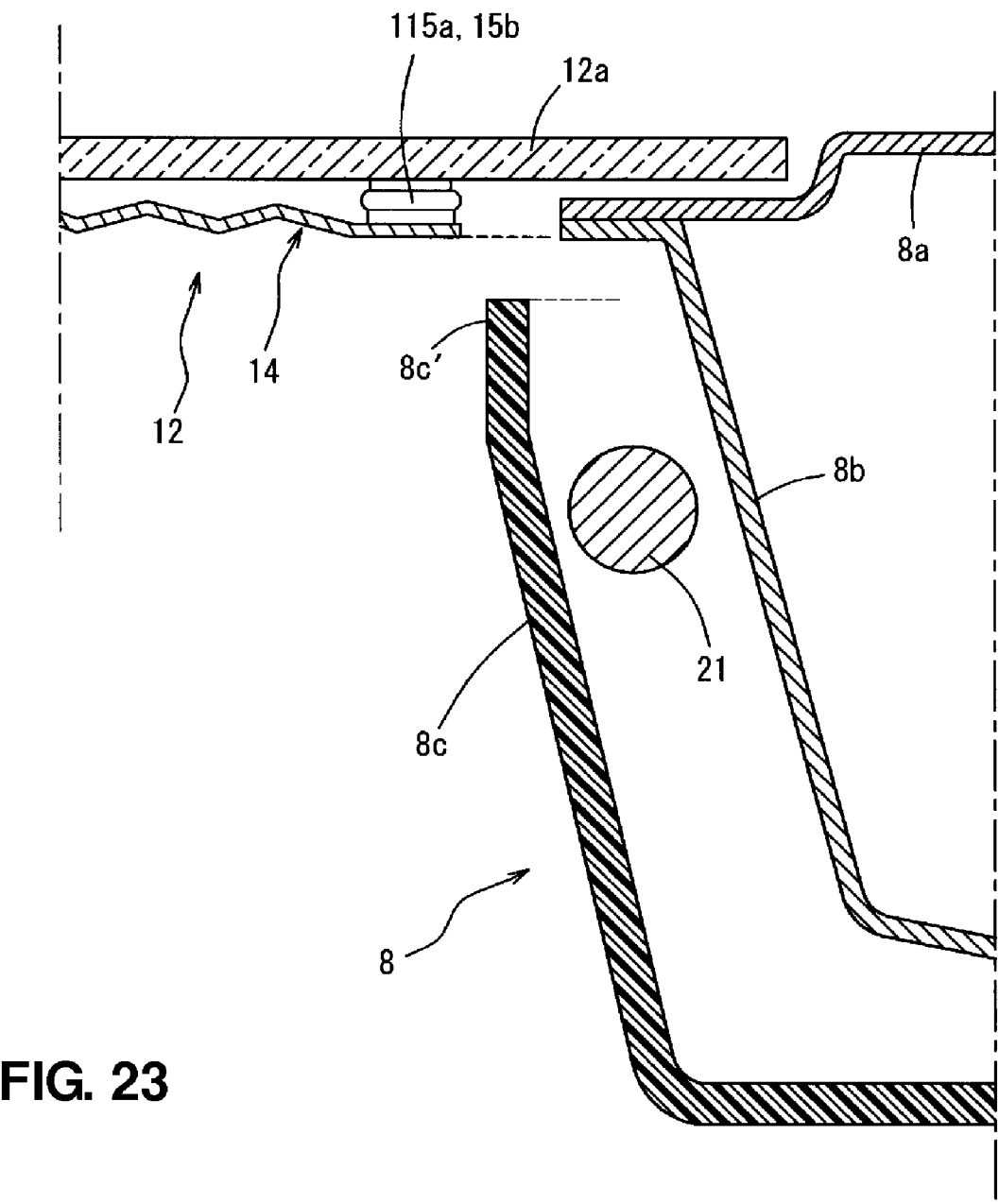
FIG. 23 is a sectional view taken along line Y-Y of FIG. 22A.

A ninth embodiment will be described referring to FIGS. 22A, 22B and 23. FIGS. 22A, 22B are elevation views of the rear window according to the ninth embodiment, which corresponds to FIG. 19A, 19B. FIG. 23 is a sectional view taken along line Y-Y of FIG. 22A.

In the present embodiment, snap members 115a, which correspond to the snap member 15a, are fixed onto a rear portion of the inside face of the window glass 12a of the rear window 12, which is near the front edge portion 8c' of the trim 8c. This fixing is conducted by the both-side adhesive tape. Similarly to the eight embodiment, by connecting the snap members 115a, 15b, the rear end portion of the curtain 14 which covers the rear window 12 is held at the position which is on the outside of the front edge portion 8c' of the trim 8c, i.e., on the outside of the airbag 21 and the tether 25 as shown in FIG. 23. Accordingly, the inflation of the airbag 21 is not prevented. Further, since the snap members 115a are directly attached to the window glass 12a, it can be provided without any particular member like the bracket 17 of the eighth embodiment. As a result, the number of parts and costs can be reduced.

Embodiment 10

A tenth embodiment will be described referring to FIGS. 24A, 24B through 27.

Figure 24A:
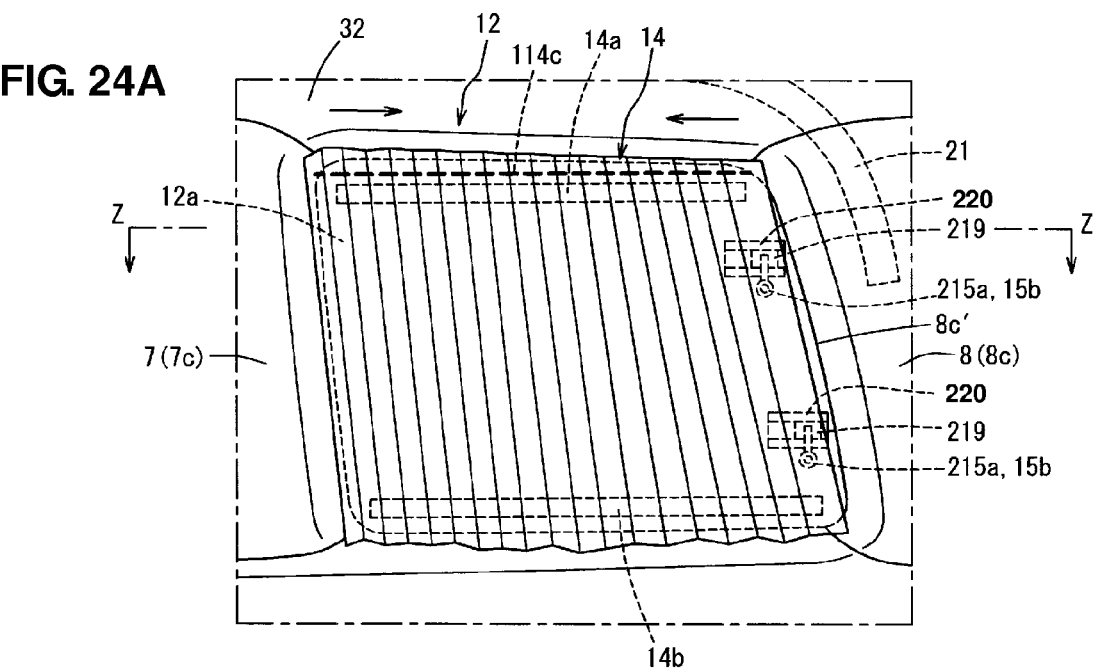
FIGS. 24A, 24B are elevation views of the rear window according to a tenth embodiment, which corresponds to FIG. 19A, 19B, respectively.
Figure 24B:
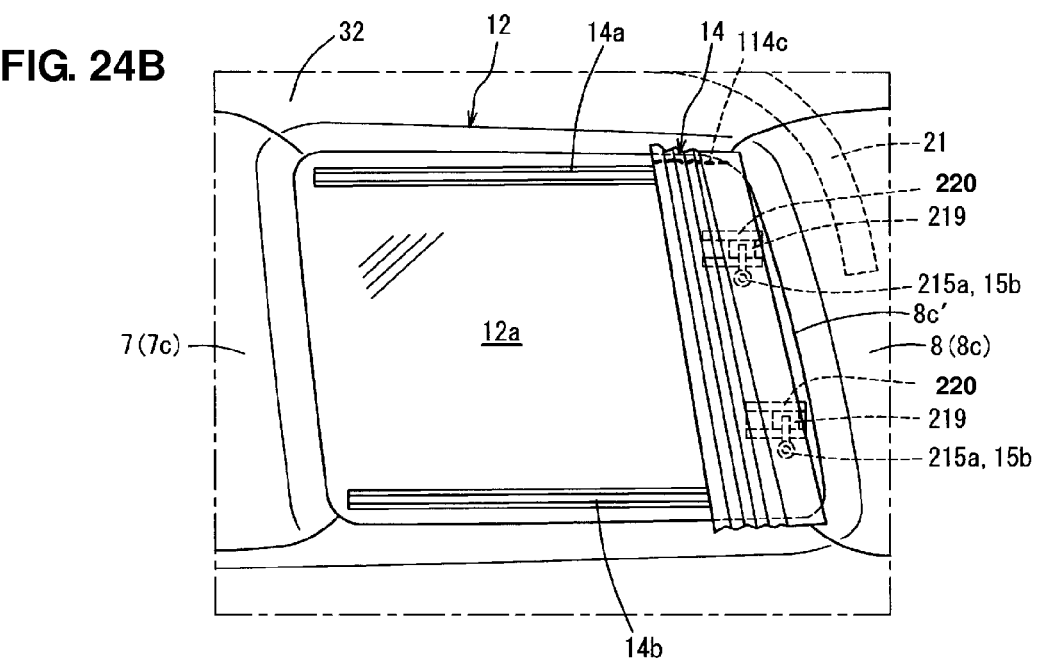
Figure 25:
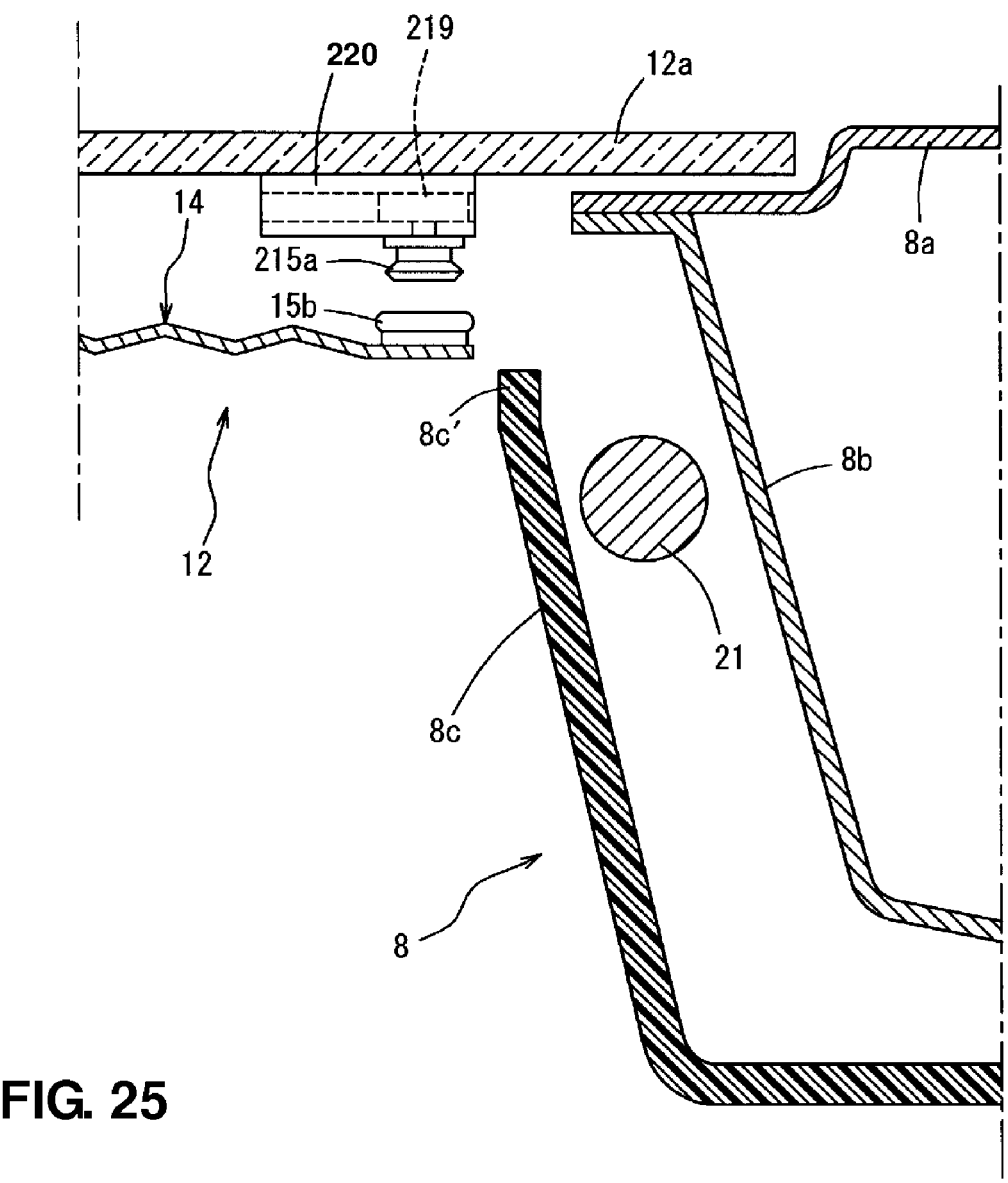
FIG. 25 is a sectional view taken along line Z-Z of FIG. 24A.

In the present embodiment, as shown in FIGS. 9A, 9B, a resilient band 114c which extends in the vehicle longitudinal direction is attached to the curtain 14 so that the front end and the rear end of the curtain 14 are biased rearward and forward, respectively. Snap members 215a, which correspond to the snap member 15a, are supported at second rail members 220, 220 which are fixed onto the rear portion of the inside face of the window glass 12a of the rear window 12, which is near the front edge portion 8c' of the trim 8c as shown in FIGS. 24A, 24B and 25.

Figure 26A:
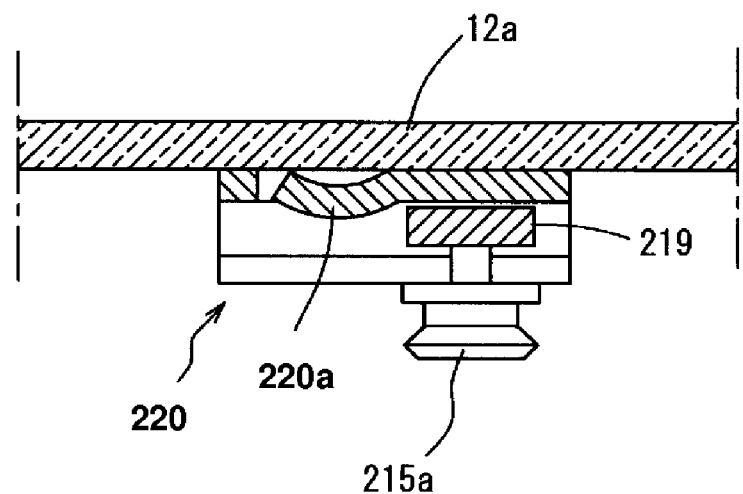
FIG. 26A is a sectional view of a second rail member and its surroundings, when viewed in the vehicle longitudinal direction.
Figure 26B:
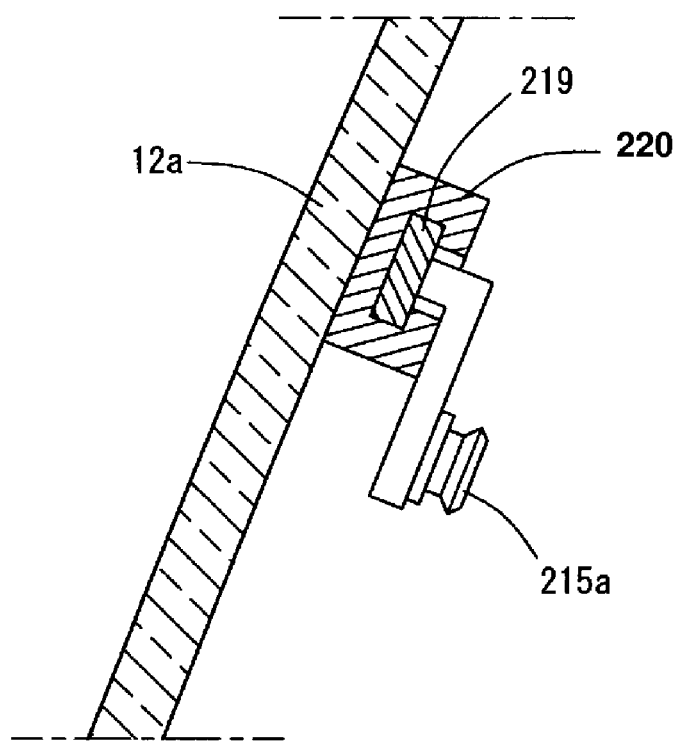
FIG. 26B is a horizontal sectional view of the second rail member and its surroundings.

Specifically, each of the snap members 215a is attached to a slider 219 which is supported at the second rail member 220 so as to slide longitudinally. Thereby, the curtain 14 engages with the second rail members 220, 220 via the snap members 215a, 215a and the snap members 15b, 15b. Herein, the rail member 220 has a C-shaped cross section and a holding portion 220a which holds the slider 219 at a specified portion as shown in FIGS. 26A, 26B. The holding portion 220a is formed by cutting and raising part of a bottom face of the rail so as to hold the slider 219 at its rear position as shown in FIG. 26A. This holding portion 220a functions as a spring in such a manner that the holding of the slider 219 thereby is maintained to prevent forward move of the slider 219 despite the passenger pulling the curtain 14 for covering the rear window 12. Meanwhile, in case a relatively large force which may be greater than an operational force by the passenger acts on the snap member 215a from behind, the holding portion 220a bends down to allow the slider 219 to pass over the holding portion 220a, thereby releasing the holding state of the slider 219 by the holding portion 220a. In this case, a biasing force of the resilient band 114c attached to the curtain 14 moves the connecting portion between the snap members 215a and the snap members 15b and the rear end of the curtain 14 forward.

Figure 27:
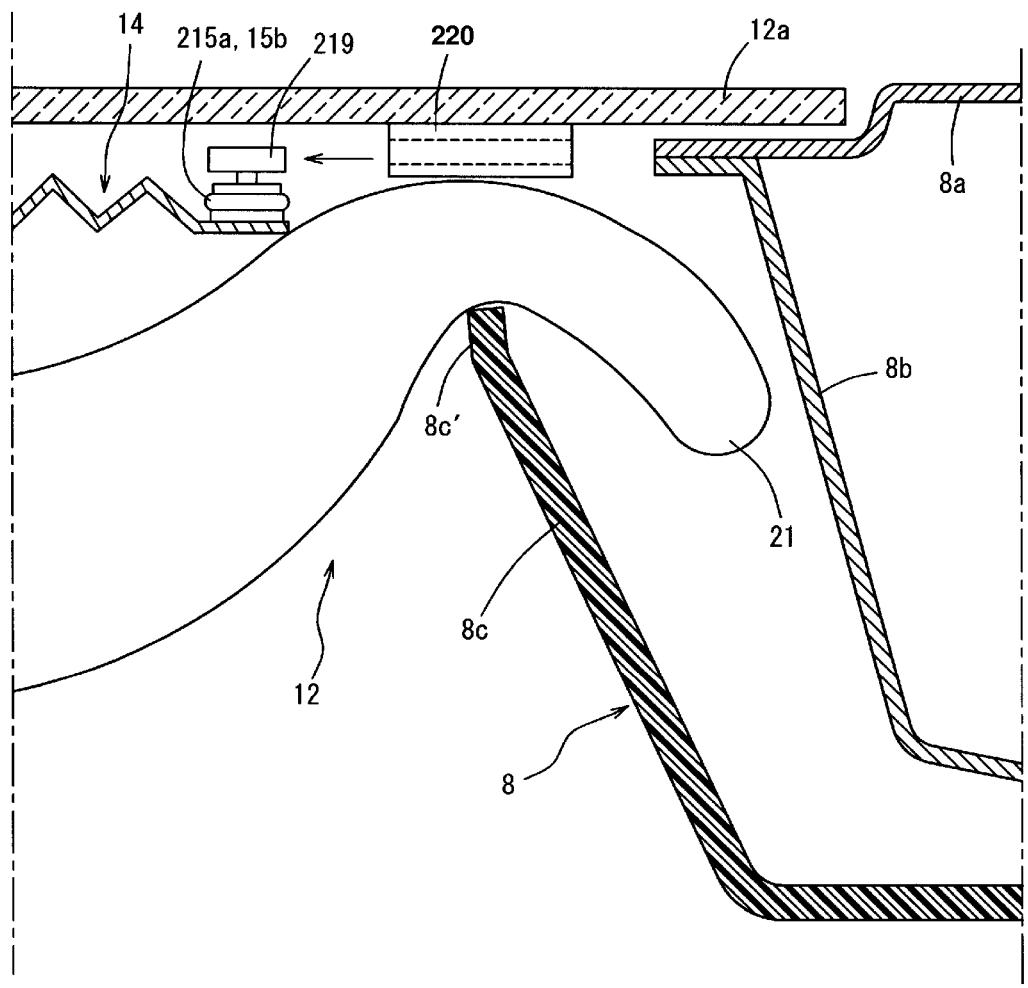
FIG. 27 is a sectional view showing a state in which the airbag inflates.

Accordingly, while the airbag 21 and the tether 25 inflate in a state in which the holding portion 220a holds the slider 219, when the airbag 21 pushes the connecting portion of the snap members 215a, 15b from behind, the above-described holding of the slider 219 by the holding portion is released by the inflation pressure of the airbag 21 as shown in FIG. 27. Then, the connecting portion between the snap members 215a and the snap members 15b and the rear end of the curtain 14 is forced to move forward by the airbag inflation pressure and the biasing force of the resilient band 114c. Thus, the holding of the curtain 14 by the second rails 220 is released by the inflatable member including the airbag 21, and the rear end portion of the curtain 14 is moved forward from the D pillar 8. Thereby, the inflatable member including the airbag 21 can smoothly inflate without any obstacle by the curtain 14.

Embodiment 11

Figure 28:
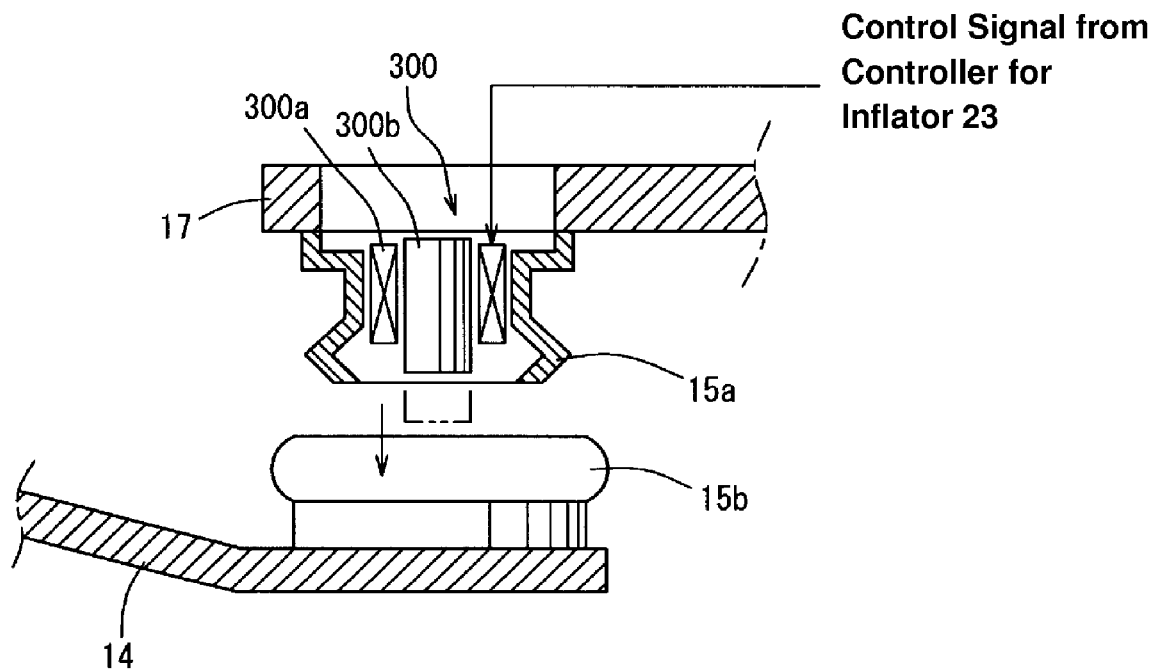
FIG. 28 is a partial sectional view of a snap member according to an eleventh embodiment of the present invention.
Figure 29:
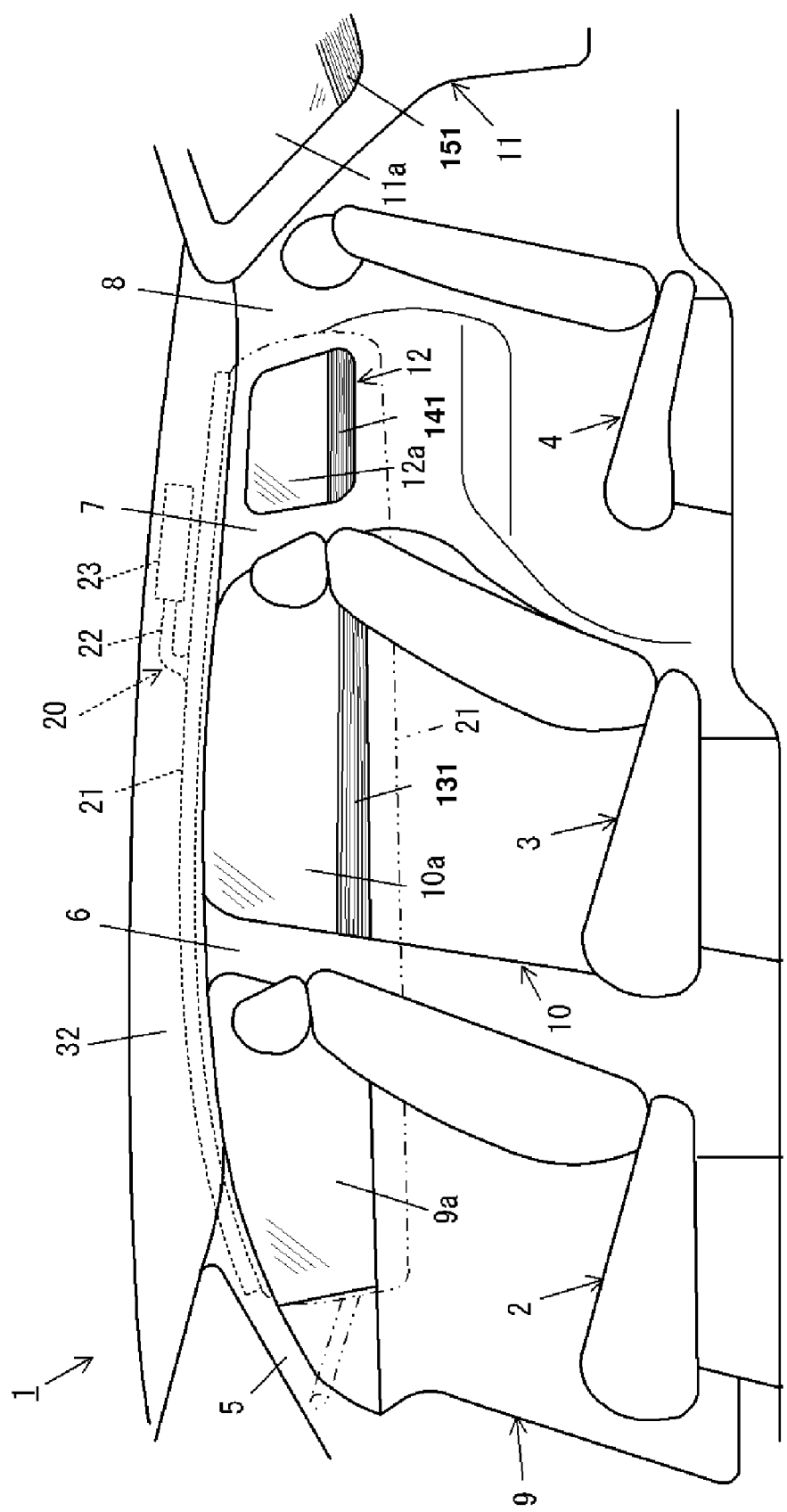
FIG. 29 is a schematic inside view of the vehicle compartment of a vehicle to which a twelfth embodiment of the present invention is applied.
Figure 30A:
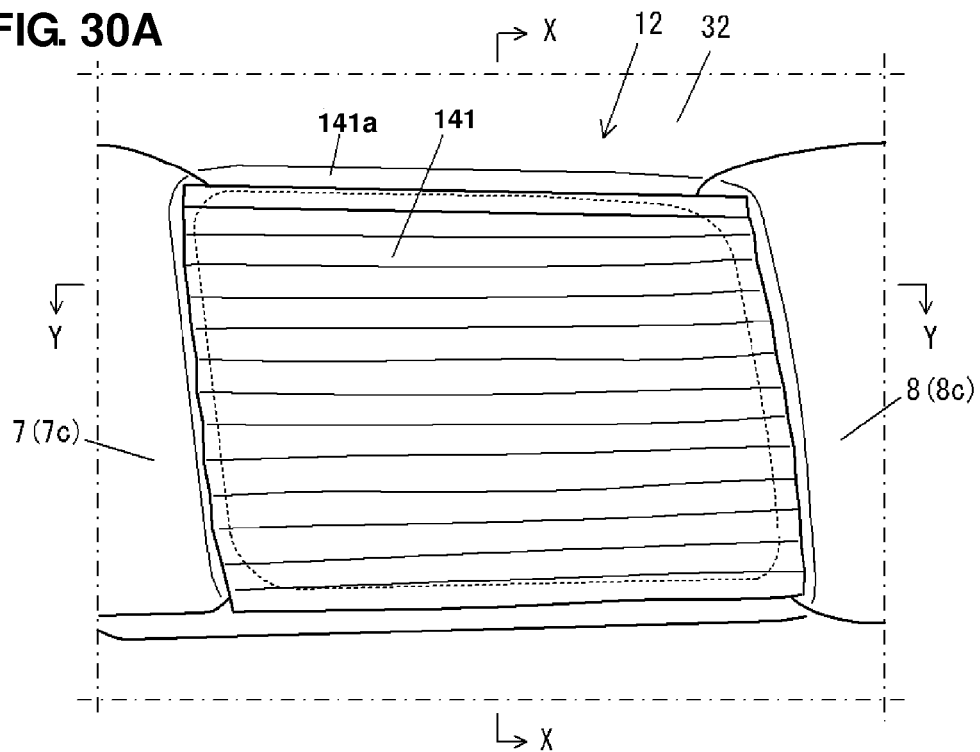
FIG. 30A is an elevation view of a rear window showing a closed state of a curtain.
Figure 30B:
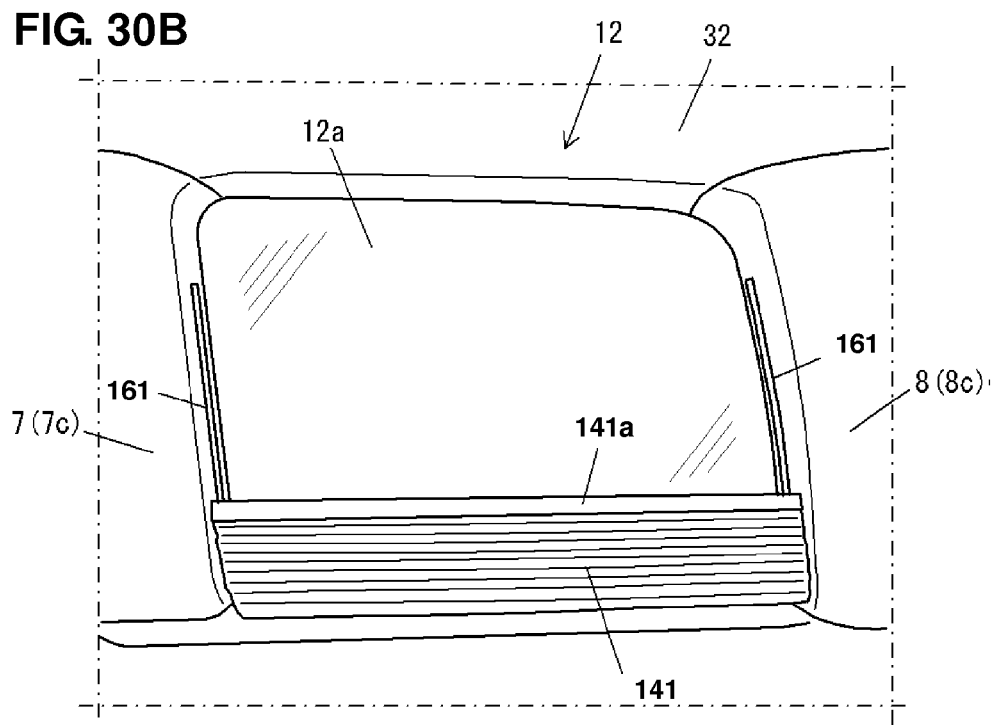
FIG. 30B is an elevation view of the rear window showing an open state of the curtain according to the twelfth embodiment.

The releasing of the rear end of the curtain 14 is not limited to using the inflation pressure of the airbag 21 like the above-described tenth embodiment. For example, as shown in FIG. 28, the connecting of the snap members 15a, 15b may be released by an operation of a solenoid 300 which is disposed inside the snap member 15a.

In the present embodiment, a control signal is supplied to the solenoid 300 from a controller (not illustrated) which controls the inflator 23 when the impact load acts from the vehicle side or its act is predicted. A coil 300a of the solenoid 300 which receives the control signal activates a plunger 300b. The plunger 300b is forced to move as shown by a two-dotted broken line in the figure. In this case, if the impact load acts from the vehicle side or its action is predicted while the snap member 15a, 15b are connected, the inflator 23 operates and the inflatable member of the airbag 21 and the like start inflating, and the plunger 300b is forced to release the connection of the snap members 15a, 15b, i.e., the connection of the snap member 15a and the curtain 14. Then, the rear end of the curtain 14 is eventually forced to move forward by the inflation pressure of the airbag 21 and the biasing force of the resilient band 114c (see FIG. 26A, 26B) like the tenth embodiment.

While the snap member is used as the connecting member to hold the rear end portion of the curtain at the vehicle body in the above-described embodiments, any other means may be applied as long as the proper connecting and releasing can be provided. Hereinafter, some embodiments in which the support member is provided at a position which is on a lower side of the inflating airbag will be described as twelfth through fifteenth embodiments. The same components parts as those of the first embodiment are denoted by the same reference characters, and detailed descriptions of those will be omitted.

Embodiment 12

A twelfth embodiment will be described referring to FIGS. 29 through 39. In the present embodiment, a curtain 141 is configured to be vertically expandable along a horizontal folding line. The both-side ends of the curtain 141 are supported by a pair of rail members 161, 161 which are attached to the side end portions of the rear window 12 near the C pillar 7 and the D pillar 8 and extend in the vertical direction.

Figure 32:
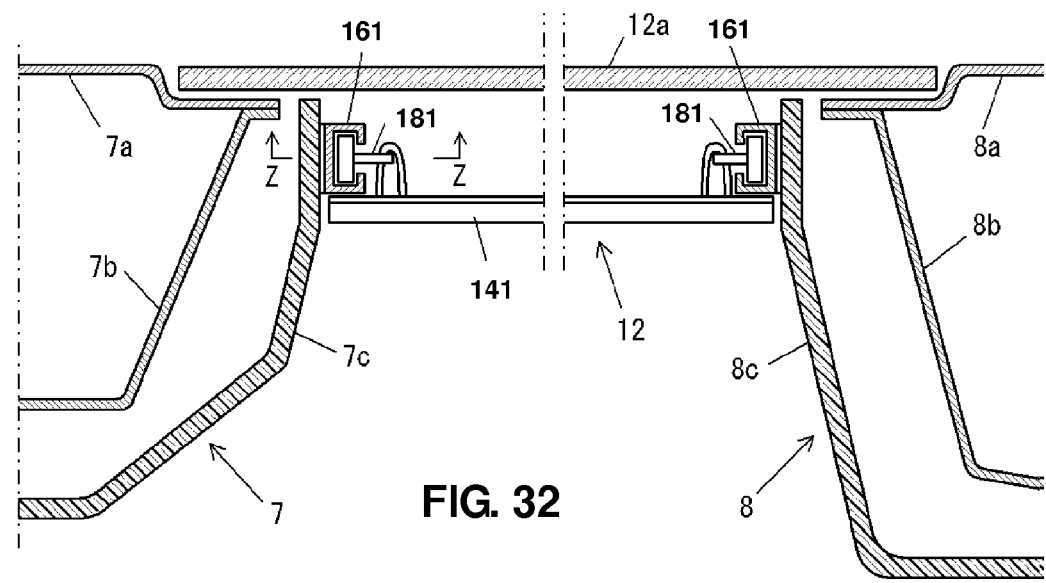
FIG. 32 is an enlarged sectional view taken along line Y-Y of FIG. 30A.
Figure 33:
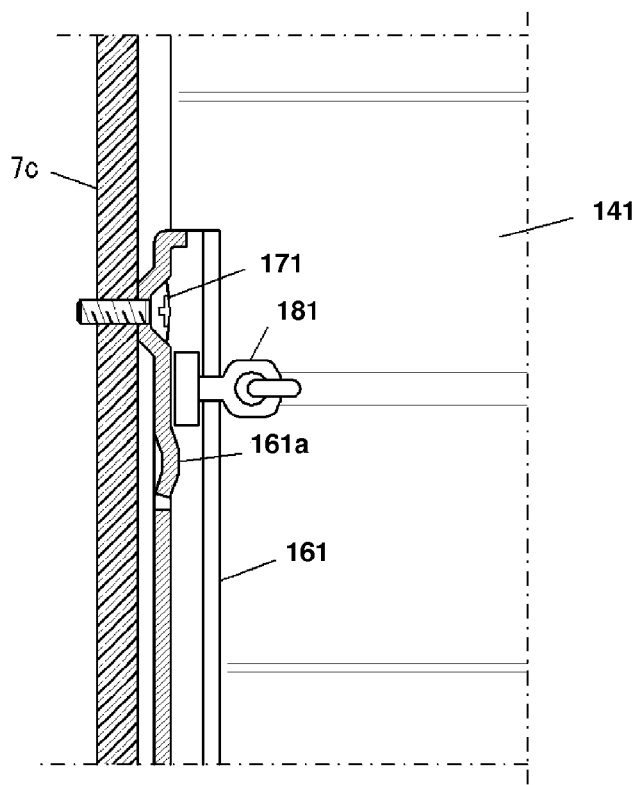
FIG. 33 is an enlarged sectional view taken along line Z-Z of FIG. 32.

The curtain 141 expands and closes the rear window 12 when an upper end portion 141a moves upward with its lower end portion being fixed. Meanwhile, the curtain 141 contracts and opens the rear window 12 when the upper end portion 141a moves downward. Herein, the upper end portion 141a of the curtain 141 is made from a reinforced material or a hard material for a proper shape holding or opening/closing operation. As shown in FIGS. 31 through 33, the rail members 161, 161 to support the curtain 141 are attached to the trims 7c, 8c of the pillars 7, 8 near the window glass 12. The rail members 161, 161, which have a C-shaped cross section, are fixed to the pillar trims 7c, 8c with screws 171 . . . 171 at plural positions, respectively. Plural curtain hooks 181 . . . 181 are supported at the real members 161 so as to slide vertically. The side portion of the curtain 141 is fixed to the curtain hooks 181 . . . 181, so that the curtain 141 is guided by the rail members 161, 161 at the both sides so as to move vertically. In this case, the curtain hook 181 at the end portion of the curtain 141 is fixed to the rail member 161 to prevent the lower portion of the curtain 141 from moving upward.

Further, as shown in FIG. 33, a holding portion 161a is provided at the upper end portion of the rail member 161. This holding portion 161a is formed with part of a bottom face which rises, so that the passing distance between the curtain hooks 181 is made so narrow that the curtain hooks 181 can be held at this upper position of the rail members 161. This holding portion 161a functions as a spring in such a manner that when the passenger operates to lower the upper portion of the curtain 141, the holding portion 161a retreats and allows the curtain hook 181 to pass over this portion 161a and when the curtain hook 181 has moved upward over this portion 161a, the holding portion 161a holds the curtain hook 181 to prevent the curtain 141 from being lowered by its weight. Then, when the downward-inflating airbag 21 contacts the upper portion of the curtain 141 and this contact pressure acts on the curtain 141 from above while the curtain hook 181 is held by the holding portion 161a, the holding of the curtain hook 181 by the holding portion 161a is released, so that the curtain hooks 181 and the curtain 141 move down.

Figure 34:
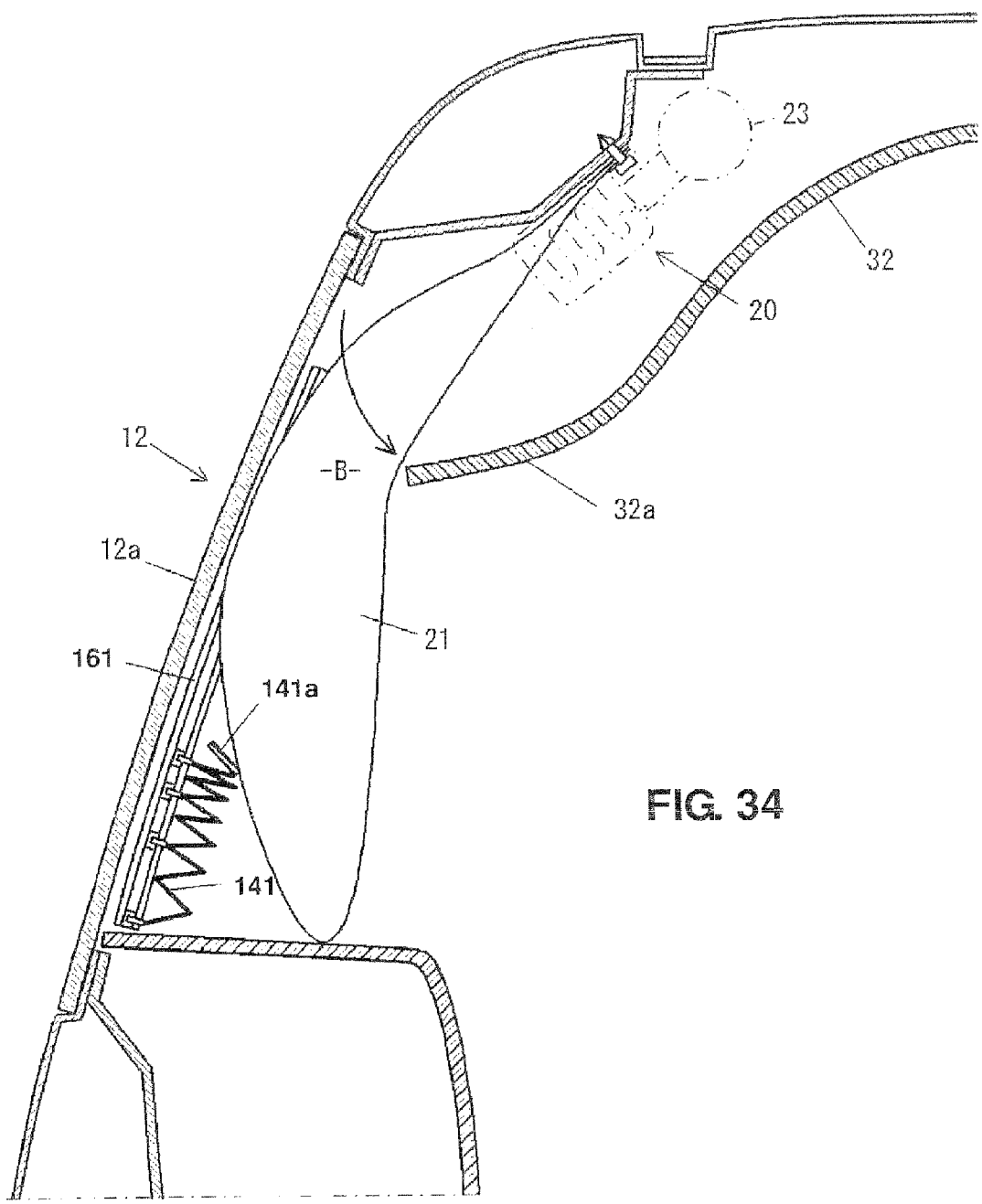
FIG. 34 is a sectional view showing the inflation state of the airbag, which corresponds to FIG. 31.

Accordingly, the curtain 141 moves downward quickly so as not to prevent the downward inflation of the airbag 21. As a result, as shown in FIG. 34, the airbag 21 can inflate downward smoothly and achieve the proper protection of the passenger.

Embodiment 13

Figure 35:
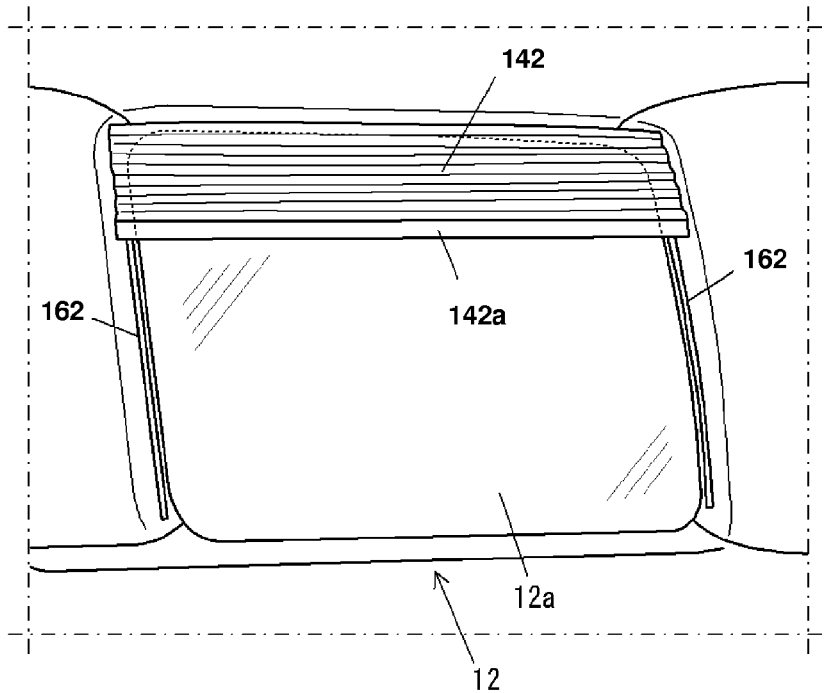
FIG. 35 is an elevation view of the rear window according to a thirteenth embodiment.
Figure 36:
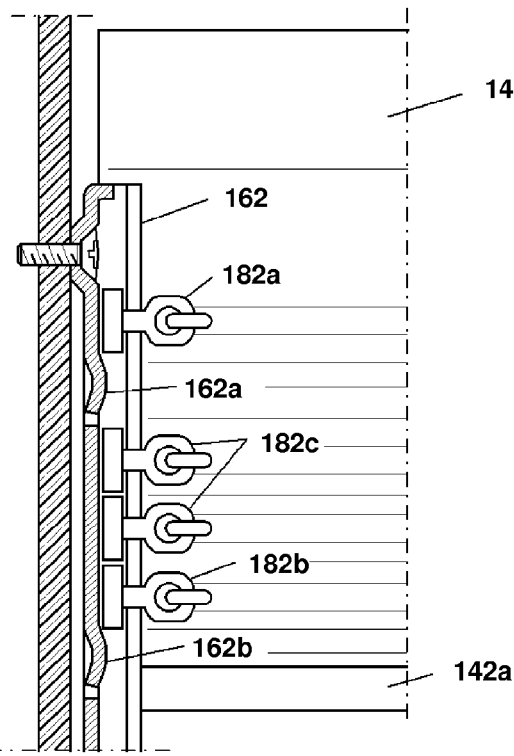
FIG. 36 is an enlarged sectional view of an upper portion of a rail member of the present embodiment.

A thirteenth embodiment will be described referring to FIGS. 35 and 36. In the present embodiment, a curtain 142 is fixed at its upper end portion, and by moving vertically its lower end portion 142a, the curtain 142 is configured to open or close the rear window 12.

In this case, it may be necessary that the inflation of the airbag 21 is not prevented by the fixing of the upper end portion. According to the present embodiment, as shown in FIG. 36, there are provided a first holding portion 162a and a second holding portion 162b at the upper portion of rail members 162 to support side portions of the curtain 142. Herein, the first holding portion 162a holds a curtain hook 182a attached to the upper end portion of the curtain 142. The second holding portion 162b holds a curtain hook 182b attached to the lowermost portion of the curtain 142 when the lower end portion 142a of the curtain 142 has been moved upward (the rear window 12 is open).

These holding portions 162a, 162b are configured in such a manner that at a normal time they hold the curtain hooks 182a, 182b at the closed or open positions of the curtain 142 at the rear window 12. Meanwhile, when the downward-inflating airbag 21 contacts the upper portion of the curtain 142 and this contact pressure acts on the curtain 142 from above, the holding of the curtain hook 182a by the first holding portion 162a is released and the holding of the lowermost curtain hook 182b by the second holding portion 162b is released, thereby allowing the curtain hooks 182c, 182a to move down. Accordingly, when the curtain airbag device 20 operates and the airbag 21 inflates and contacts the upper portion of the curtain 142, the curtain hooks 182a, 182b, 182c slide downward along the rail members 162, 162 and the curtain 142 moves down. Accordingly, the curtain 142 moves downward quickly so as not to prevent the downward inflation of the airbag 21.

Embodiment 14

According to a fourteenth embodiment, curtain hooks 183 are attached to side ends of a curtain 143 as shown in FIG. 37.

Embodiment 15

According to a fifteenth embodiment, snap members are used as the support member to support a curtain 144 as shown in FIGS. 38 and 39. In the present embodiment, lower ends of both side portions of the curtain 144 are fixed to the rear edge portion 7c' of the C pillar trim 7c and the front edge portion 8c' of the D pillar trim 8c via fixing members 174, 174, respectively. Further, plural trim-side snap members 164a . . . 164a are provided at the rear edge portion 7c' of the C pillar trim 7c and the front edge portion 8c' of the D pillar 8c, respectively. Meanwhile, at the both side ends of the curtain 144 are provided curtain-side snap members 164b . . . 164b which correspond to the above-described trim-side snap members 164a . . . 164a.

According to the present embodiment, by expanding the curtain 144 with the both-side lower ends fixed to the trims 7c, 8c upward and by connecting the curtain-side snap members 164b . . . 164b to the trim-side snap members 164a . . . 164a, the rear window 12 is closed with the curtain 144. Meanwhile, by making the curtain 144 contract and by connecting the uppermost curtain-side snap members 164b . . . 164b to the middle-high trim-side snap members 164a . . . 164a, the rear window 12 is open according to the connection position. Thus, the rear window 12 is adjustable so as to be closed with the curtain 144 or open without the curtain 144. The holding state of the curtain 144 is released by disconnection of the trim-side snap member 164a and the curtain-side snap member 164b due to some force acting. Accordingly, in case the curtain airbag device 20 operates while the rear window 12 is closed with the curtain 144 and the inflating airbag 21 contacts the upper portion of the curtain 144, the holding of the curtain 144 in its closed state is released. Thus, like the above-described embodiment, at least the upper portion of the curtain 144 moves down, so that the airbag 144 can inflate properly.

Herein, in case the lower end portion of the curtain 144 is configured to be detachable by using the snap members as well, in place of the above-described structure in which the lower ends of the both side portions of the curtain 144 are fixed with the fixing members 174, 174, the rear window 12 can be open by moving upward the lower end portion of the curtain 144. In this case, the holding with using the snap members is released by the inflating airbag 21, so that the upper portion or the whole portion of the curtain 144 can move down.

Herein, in the above-described twelfth through fifteenth embodiments, there may be provided a biasing means for abusing the curtain downward to assist the downward move of the curtain when the inflating airbag 21 contacts the upper portion of the curtain. Hereinafter, further other embodiments in which the support member is provided at the position which is on the outside side of the inflating airbag will be described as sixteenth through twentieth embodiments and twenty-third and twenty-fourth embodiments. Moreover, further other embodiments in which the support member is provided at the position which is on the lower side of the inflating airbag will be described as twenty-first and twenty-second embodiments. The same components parts as those of the first embodiment are denoted by the same reference characters, and detailed descriptions of those will be omitted.

Embodiment 16

A sixteenth embodiment will be described referring to FIGS. 40 through 46. A curtain 241 can be stored inside a rear-wheel-house trim 35 (hereinafter, referred to as a "trim 35") which is provided below the rear window 12 as shown in FIGS. 42A, 42B through 44. Specifically, the curtain 241 is provided so as to be wound up inside the trim 35 by a roll member 217 and to get out of an opening 35a which is formed at the trim 35 below the rear window 12 and move upward.

Figure 40:
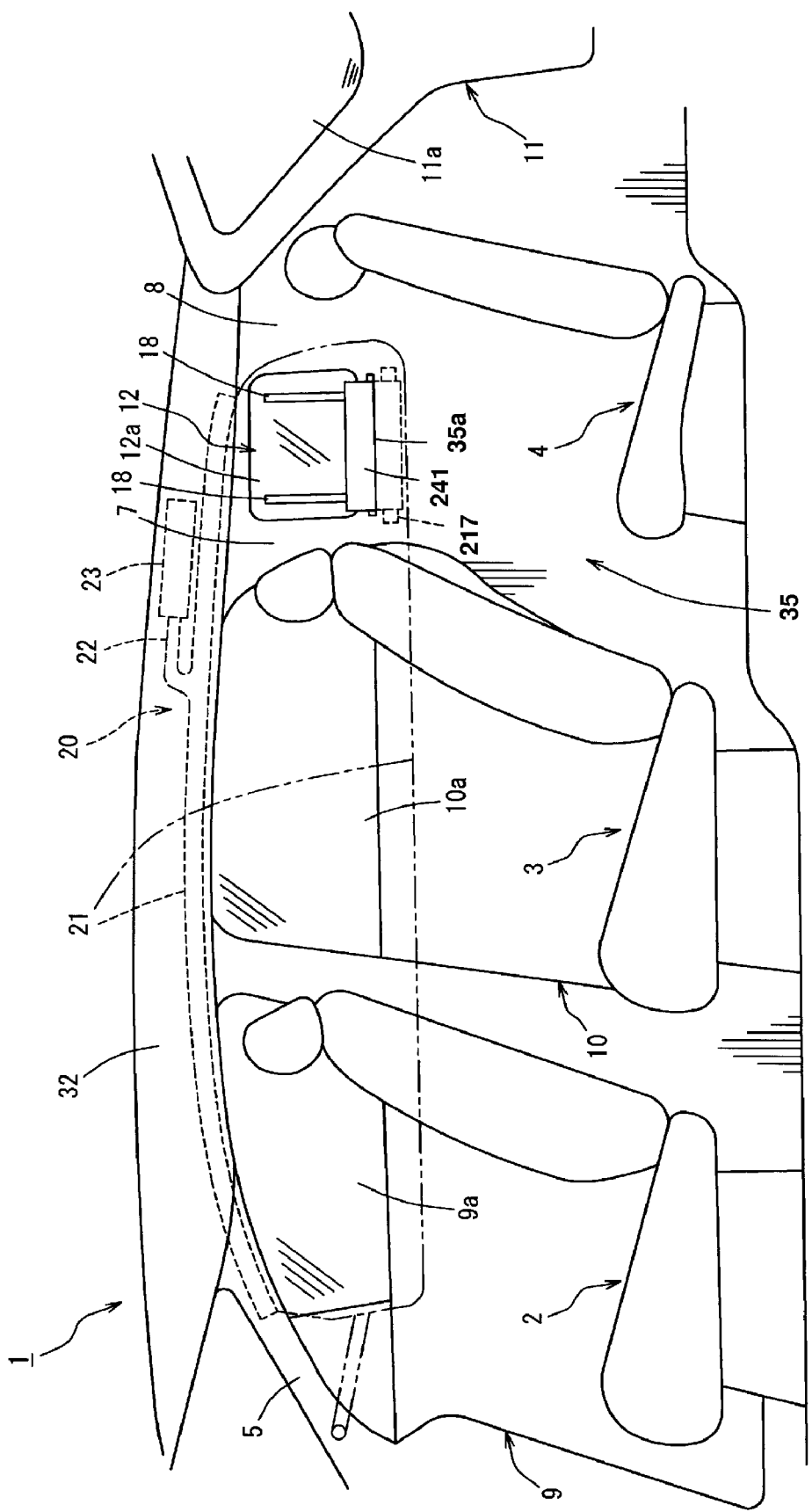
FIG. 40 is a schematic inside view of the vehicle compartment of a vehicle according to a sixteenth embodiment of the present invention, which shows a state in which curtains are open.
Figure 41:
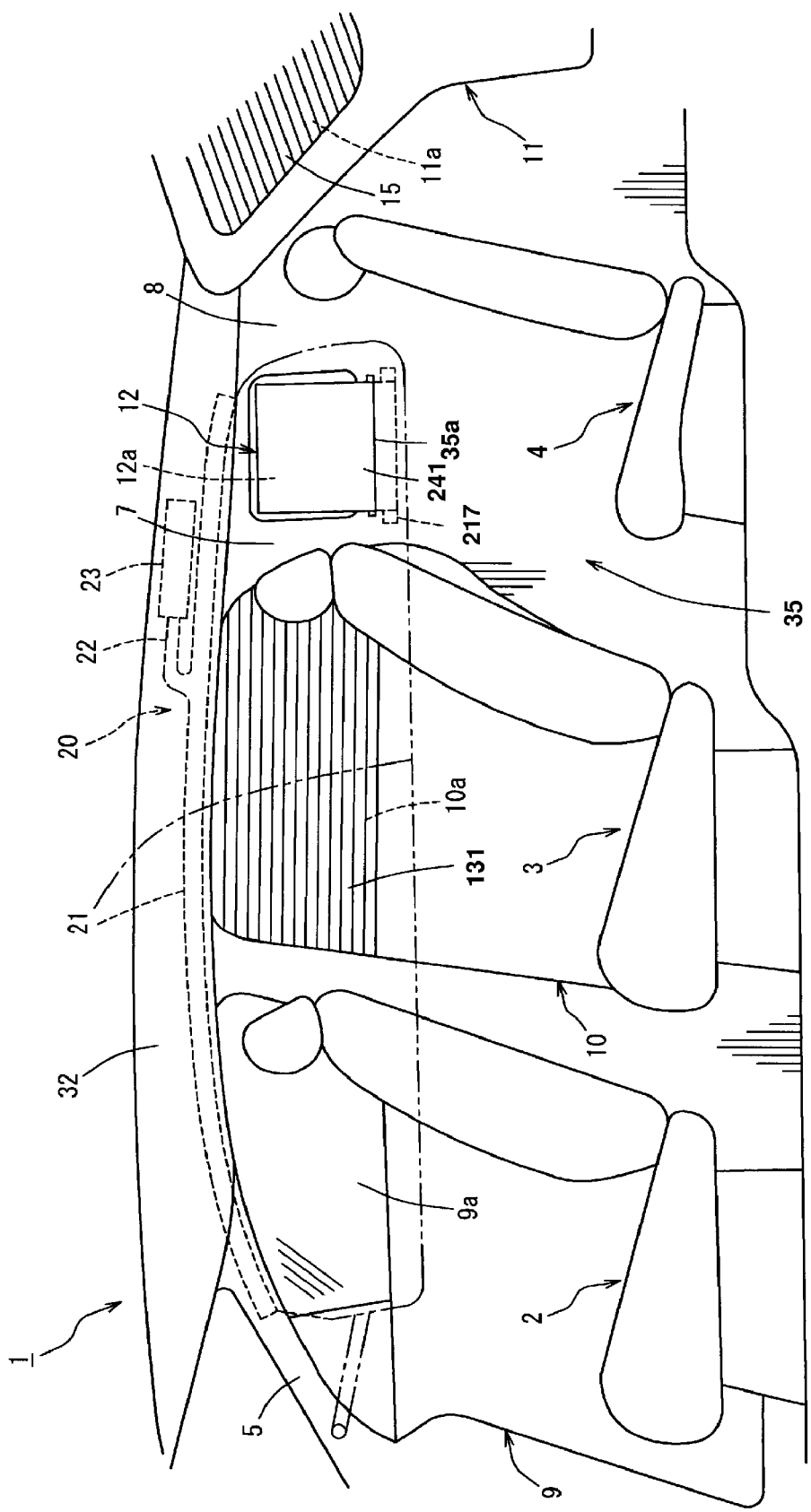
FIG. 41 is a schematic inside view of the vehicle compartment of a vehicle according to the sixteenth embodiment of the present invention, which shows a state in which the curtains are closed.
Figure 42A:
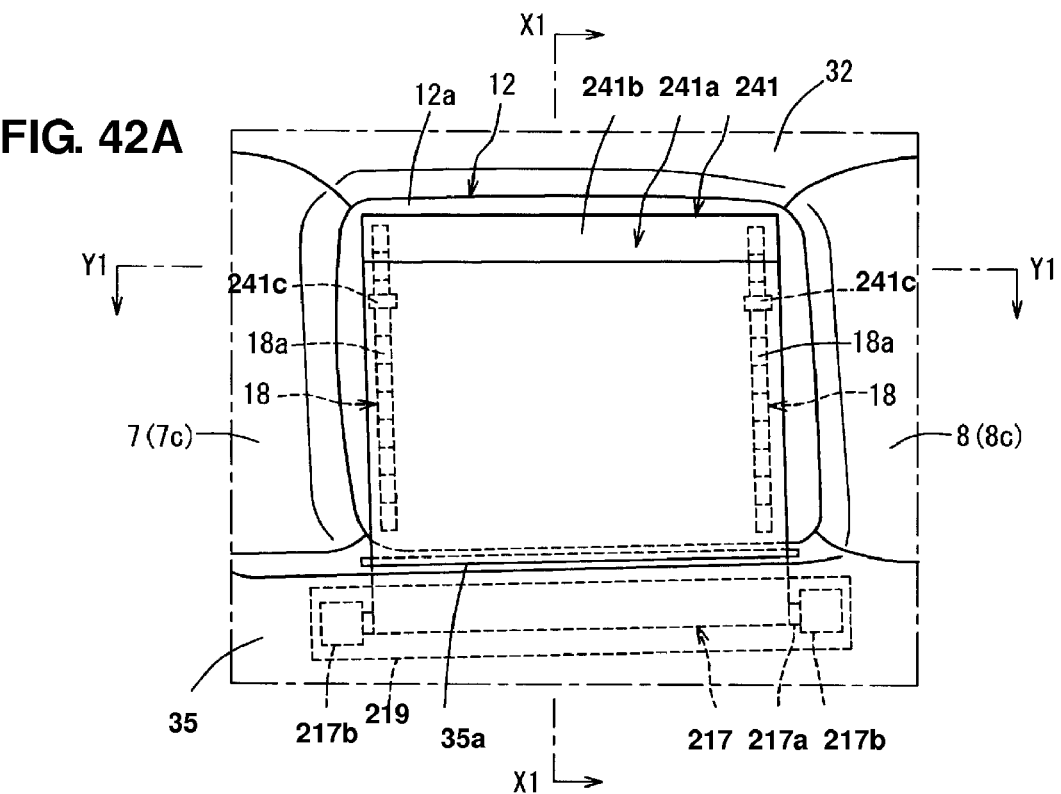
FIG. 42A is an elevation view of the rear window showing the closed state of the curtain.
Figure 42B:
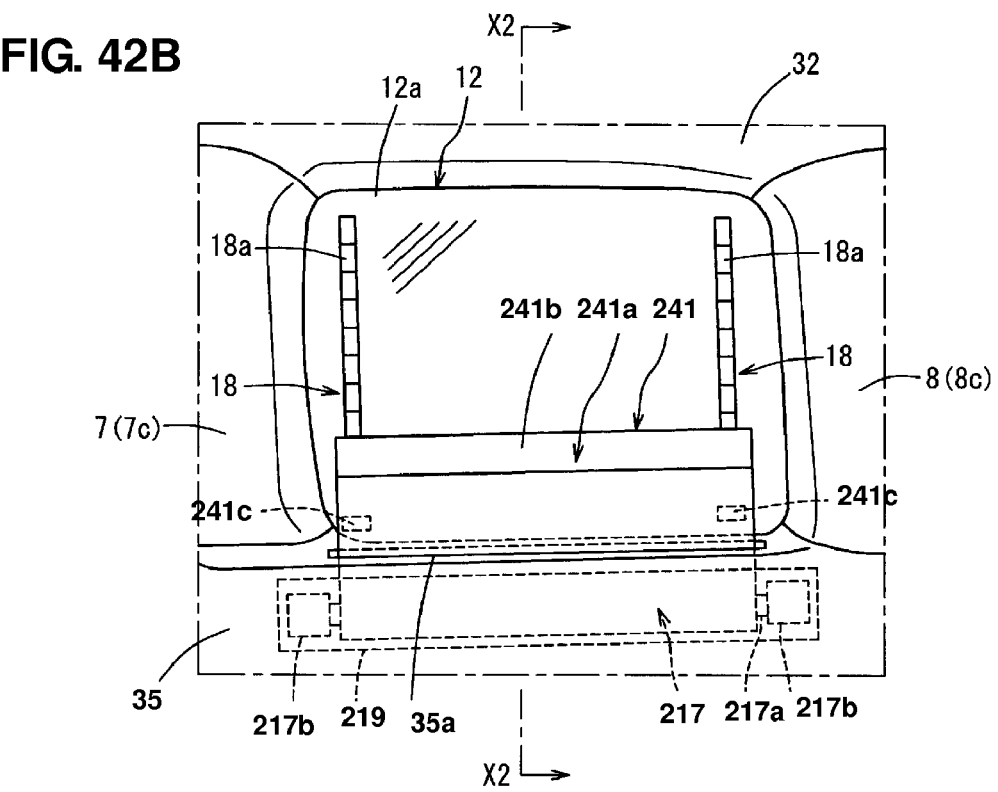
FIG. 42B is an elevation view of the rear window showing the open state of the curtain.
Figure 43:
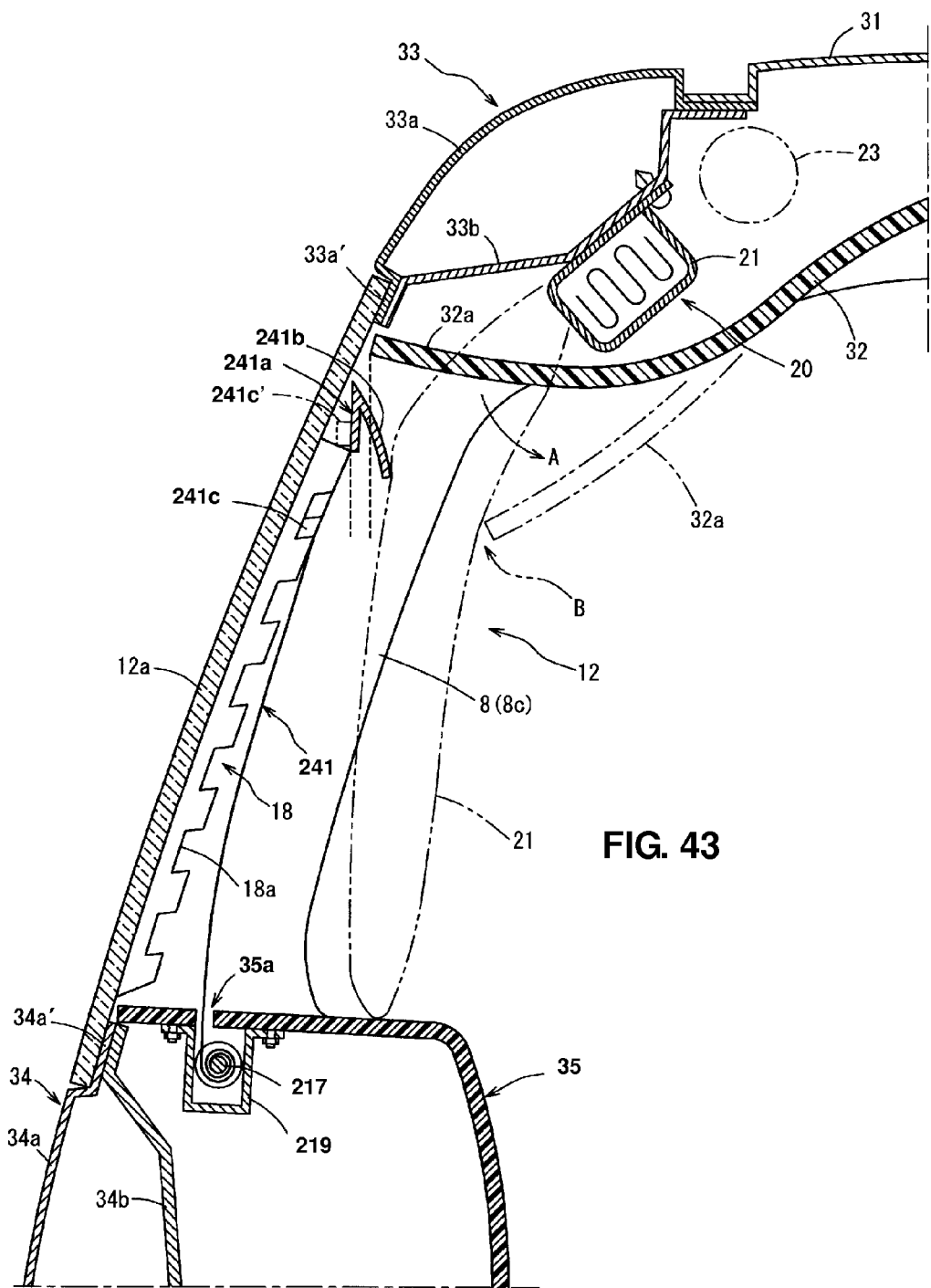
FIG. 43 is an enlarged sectional view taken along line X1-X1 of FIG. 42A.
Figure 44:
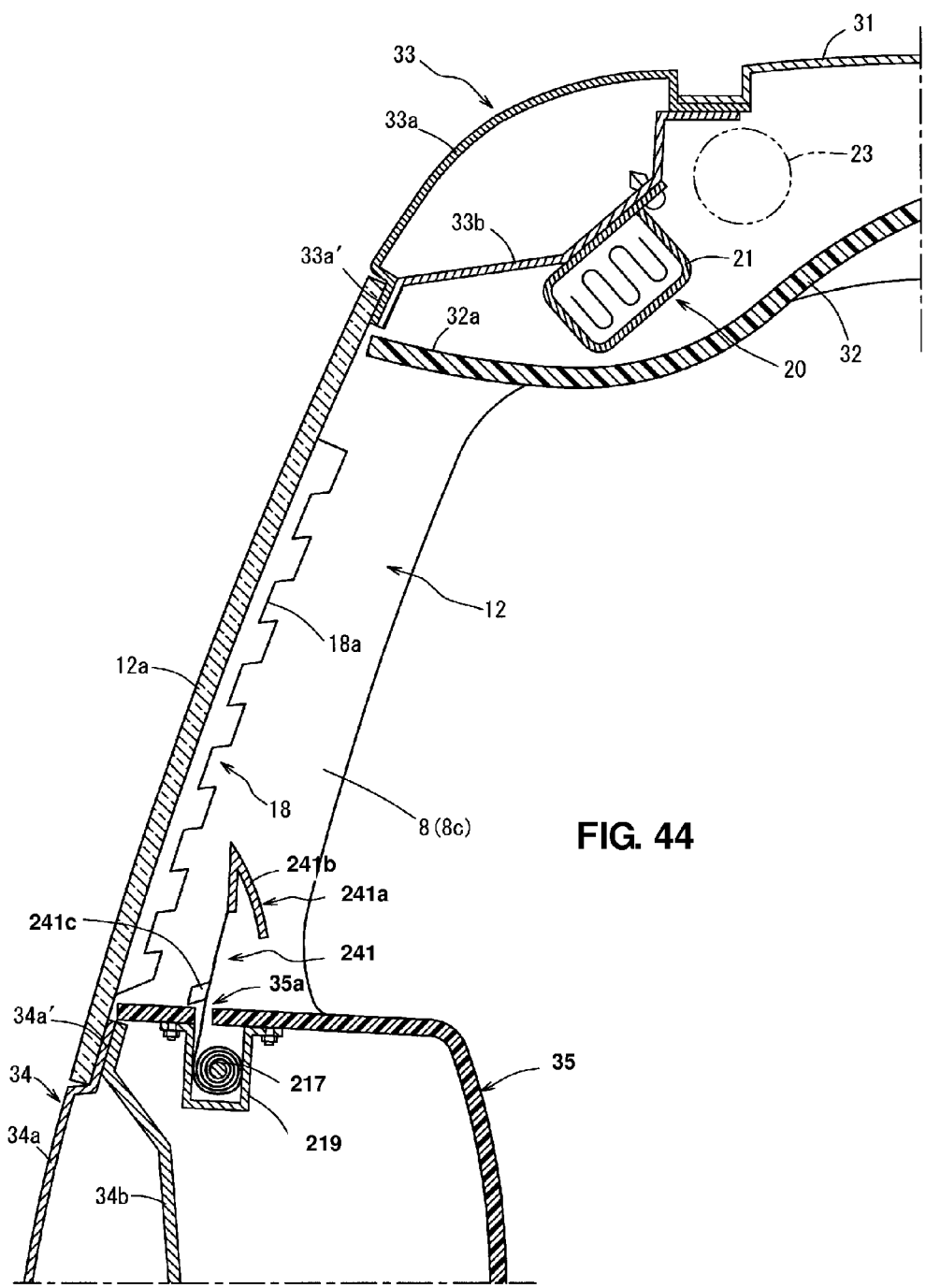
FIG. 44 is an enlarged sectional view taken along line X2-X2 of FIG. 42B.
Figure 45:
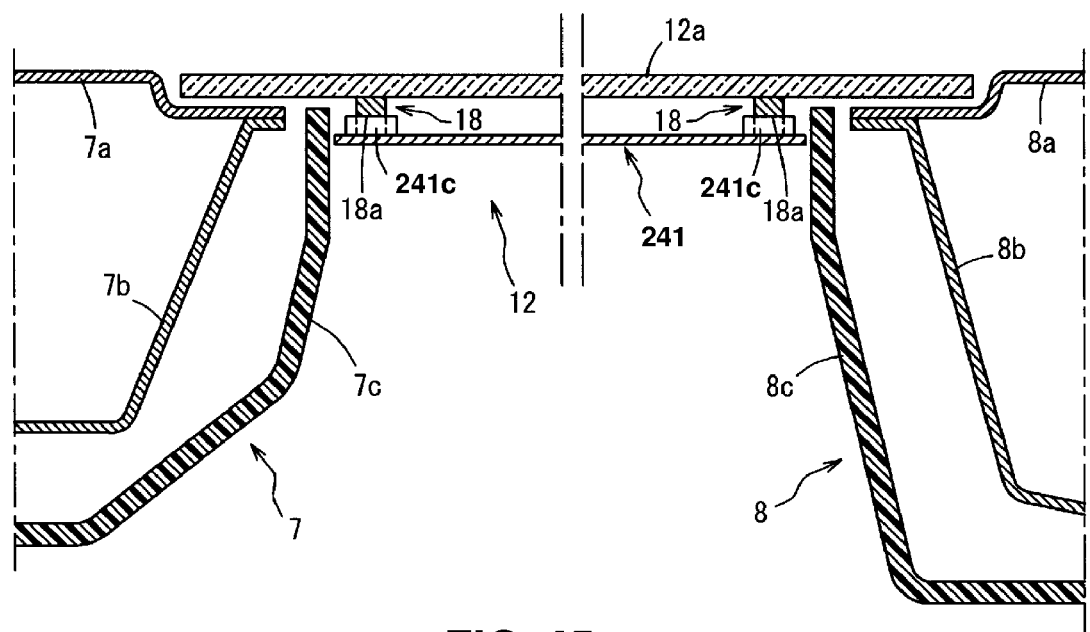
FIG. 45 is an enlarged sectional view taken along line Y1-Y1 of FIG. 42A.

When an upper end portion 241a of the curtain 241 moves upward while its lower end portion is fixed to the roll member 217, the rear window 12 is closed as shown in FIGS. 41, 42A and 43. Meanwhile, when the upper end portion 241a moves down, the rear window is open as shown in FIGS. 40, 42B and 44. Herein, the upper end portion 241a of the curtain 241 is made from a hard material, such as resin, for a proper shape holding or opening/closing operation, and it has a substantially reverse-V shape when viewed from the front. The upper end portion 241a has a slant portion 241b which extends obliquely downward and inward. Two engaging portions 241c which project toward the rear window 12 are provided near the upper end portion 241a of the curtain 241. Meanwhile, a pair of rail-shaped support members 18 which extends vertically so as to correspond to the engaging portions 241a is fixed to the inside face of the rear window 12 via the both-side adhesive tape.

Figure 46:
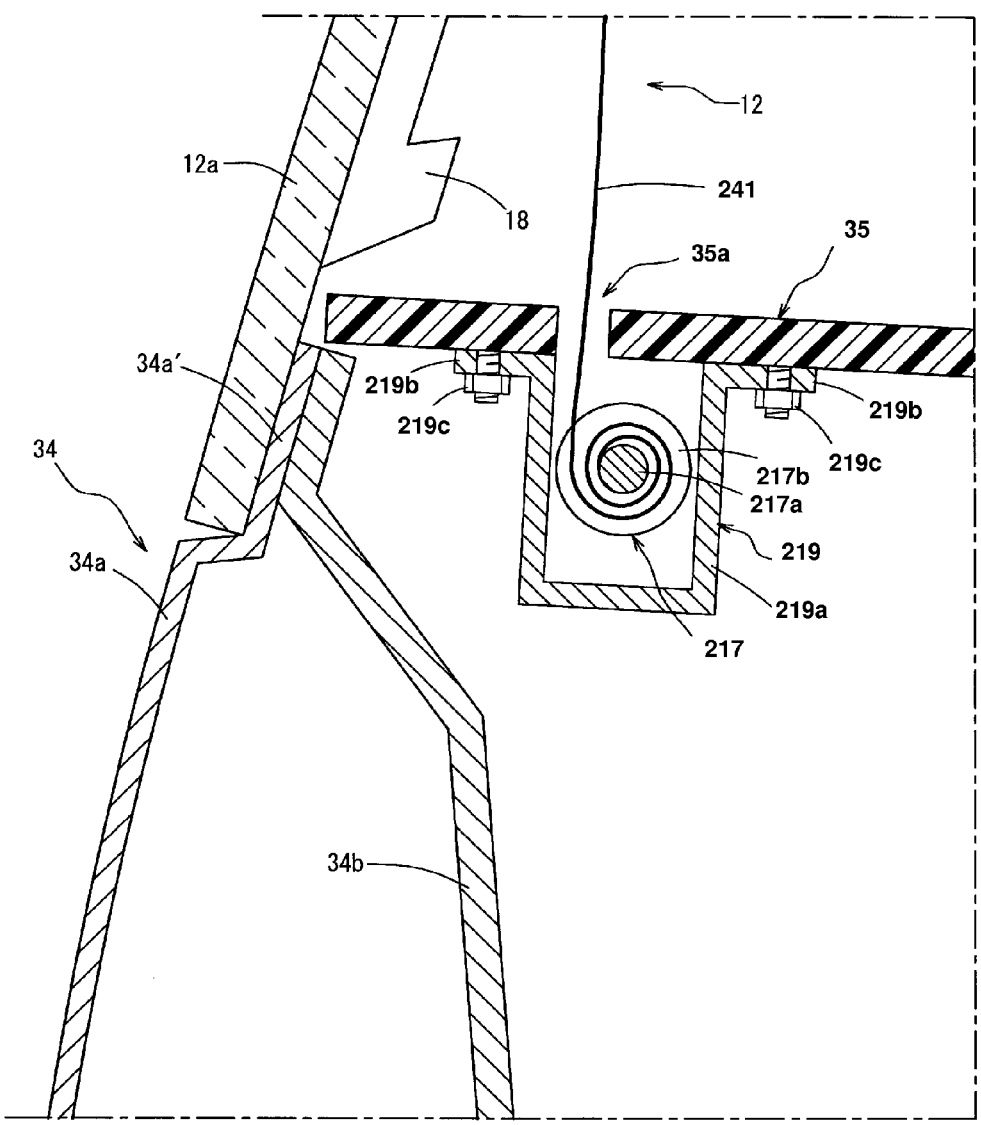
FIG. 46 is an enlarged sectional view of a major portion of an attaching structure of a curtain case member.

The support member 18 has plural engagement recess portions 18a which are formed along a longitudinal (vertical) direction thereof. Herein, since the support member 18 is disposed along a slant of the window glass 12a, these engagement recess portions 18a are positioned in such a manner that the upper-located ones are located much closer to the vehicle compartment as shown in FIGS. 43 and 44. Consequently, the upper-most portion 18a is located the closest to the vehicle compartment. The roll member 217 to wind up the curtain 241 comprises a cylindrical shaft portion 217a to which the base end portion of the curtain 241 is attached and a bearing portion 217b which rotatably support both ends of the shaft portion 217a as shown in FIGS. 42A, 42B and 46. The shaft portion 217a is biased in a direction of winding up the curtain 241 by a coil spring (not illustrated). Accordingly, the curtain 241 is always kept in a state in which it is biased downward by the roll member 217.

Accordingly, when the engagement between the engaging portions 241c of the curtain 241 and the engagement recess portions 18a of the support member 18 is released, the curtain 241 is lowered by a biasing force of the coil spring, so that the curtain 241 is wound up by the roll member 217 and automatically stored inside the trim 35. The curtain 241 which has been wound up by the roll member 217 extends in the vehicle longitudinal direction as shown in FIGS. 42A, 42B, and it is stored in the curtain case member 219 which has a substantially U-shaped cross section as shown in FIGS. 43, 44 and 46. The curtain case member 219, which is made from metal or resin, comprises a recess portion 219a which extends longitudinally and stores the roll member 217 and a pair of flange-shaped attaching portions 219b for attaching to the trim 35 as shown in FIG. 46.

The attaching portions 219b of the curtain case member 219 which extend substantially horizontally from the both-side ends of the recess portion 219a are fixed to the trim 35 via bolts and nuts of fixing members 219c (see FIG. 46). Thus, the curtain case member 219 is attached to the vehicle body integrally. The curtain 241 is withdrawn from the opening 35a toward the rear window 12 when the upper end portion 241a is pulled upward against the biasing force of the coil spring of the roll member 217. The curtain 241 which has been withdrawn upward can close a specified rage of the rear window 12 when the engaging portion 241c engages with one of the engagement recess portions 18a of the support member 18.

As described above, according to the present embodiment, since the uppermost engagement recess portion 18a of the support member 18 is positioned on the outside of the outside edge portion of the top ceiling 32, when the engaging portion 241c of the curtain 241 engages with the engagement recess portion 18a, the position of the curtain 241, as shown in FIG. 43, can be kept on the outside of the outside edge portion of the top ceiling 32 as well. Accordingly, the downward inflation of the airbag 21 is not prevented by the curtain 241. Thus, as shown in FIG. 43, the airbag 21 inflates smoothly toward the vehicle compartment, thereby achieving the proper protection of the passenger. Further, according to the present embodiment, since the curtain 241 is stored inside the trim 35 which is provided below the rear window 12 in the open state of the rear window 12 without the curtain 241, the exterior appearance of the vehicle can improve. Moreover, since the slant portion 241b which extends obliquely downward and inward is provided at the upper end portion 241a of the curtain 241, the passenger may operate the curtain 241 easily by grasping the slant portion 241b. Further, since the curtain 241 is the roll type of curtain which can be wound up by the roll member 217, the curtain 241 can be stored inside the trim 35 compactly.

Embodiment 17

Figure 47:
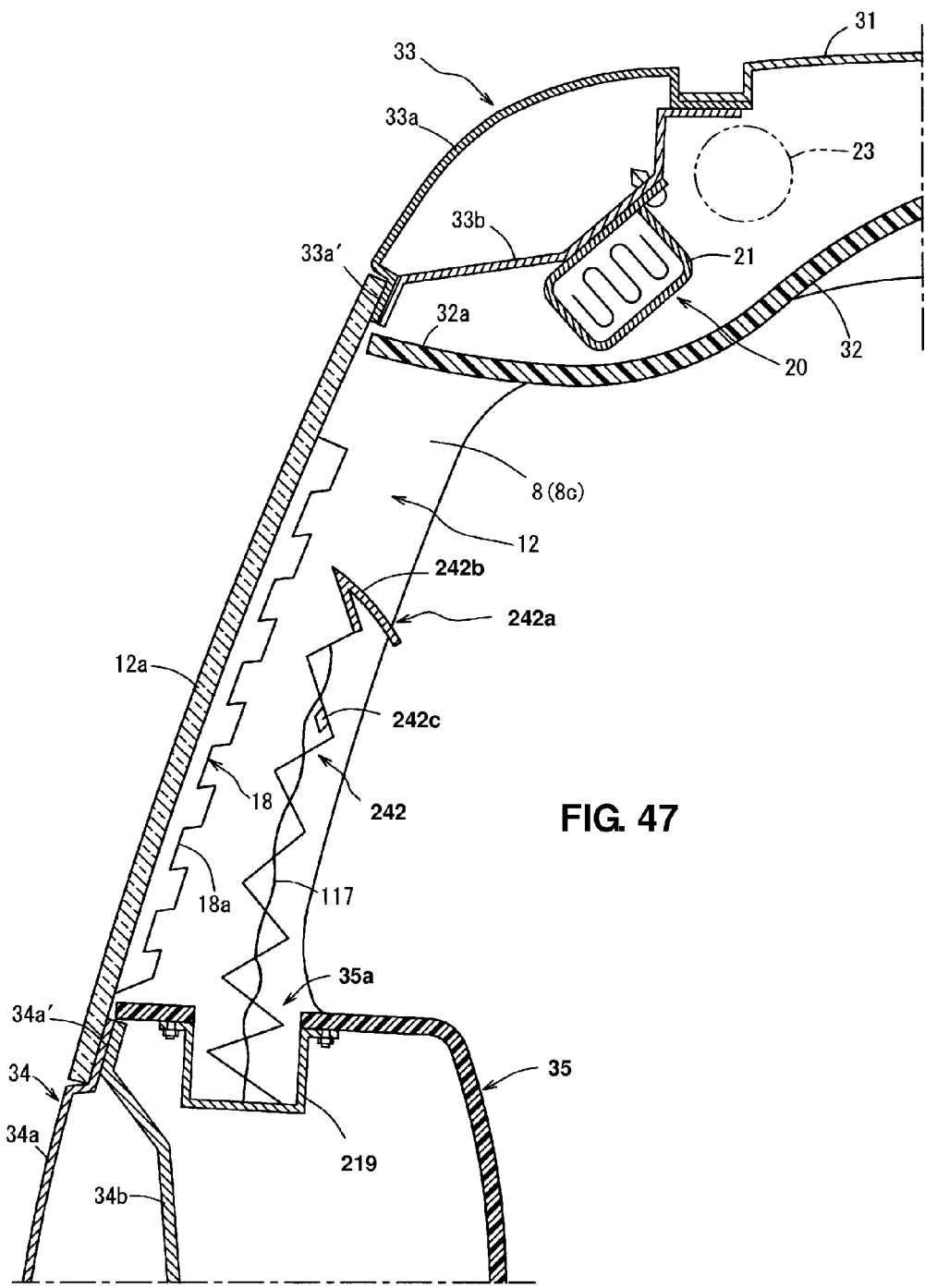
FIG. 47 is a sectional view of the rear window vehicle according to a seventeenth embodiment of the present invention, which corresponds to FIG. 43.
Figure 48:
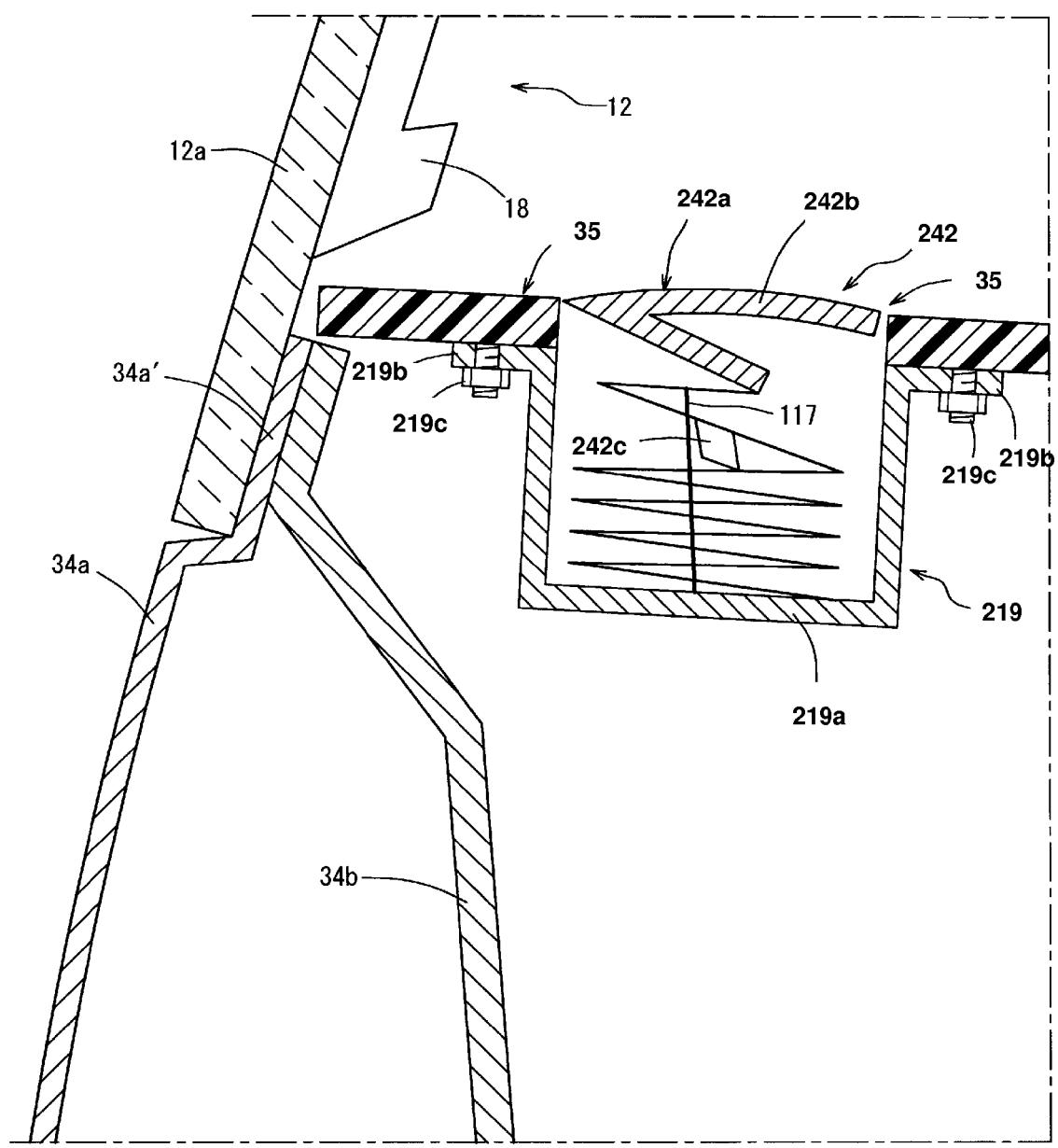
FIG. 48 is an enlarged sectional view of a major portion of an attaching structure of a curtain case member.

A seventeenth embodiment will be described referring to FIGS. 47 and 48. In the present embodiment, a curtain 242 is a bellows-shaped one which is vertically expandable along a horizontal folding line. When an upper end portion 242a of the curtain 242 is pulled upward while its lower end portion is fixed to the bottom face of the curtain case member 219, the curtain 242 can close the rear window 12. When the upper end portion 242a moves down, the curtain 242 contracts and opens the window 12.

At the curtain 242 are provided an engaging portion 242c, which corresponds to the engaging portion 241c of the curtain 241. Accordingly, when the curtain 242 is pulled upward from the curtain case member 219 and then the engaging portion 241c engages with one of the engagement recess portions 18a of the support member 18, the curtain 242 can close a specified area of the rear window 21. Herein, one end of a resilient band member 117 which extends vertically, the expansion/contraction direction of the curtain 242, is attached to the upper end portion 242a of the curtain 242. The other end of the resilient band member 117 is fixed to the bottom face of the curtain case member 219 together with the lower end portion of the curtain 242. The curtain 242 is biased by the resilient band member 117 so that the upper end portion 242a moves downward. When the upper end portion 242a is lowered by the resilient band member 117, the curtain 242 contracts as shown in FIG. 48 and then it is stored in the curtain case member 219 in its folding state. When the curtain 242 is stored in the curtain case member 219, a slant portion 242b of the curtain 242, which corresponds to the slant portion 241b of the curtain 241, is stored so as to form a face substantially continuous to the horizontal face portion of the trim 35 around the opening 35a as shown in FIG. 48. The curtain 242 is withdrawn from the opening 35a toward the rear window 12 when the upper end portion 242a is pulled upward against the biasing force of the resilient band member 117.

According to the present embodiment, like the above-described embodiment, since the uppermost engagement recess portion 18a of the support member 18 is positioned on the outside of the outside edge portion of the top ceiling 32, the position of the curtain 242 can be kept on the outside of the outside edge portion of the top ceiling 32. Accordingly, the downward inflation of the airbag 21 is not prevented by the curtain 242. Further, according to the present embodiment, since the curtain 242 is stored inside the trim 35 which is provided below the rear window 12 in the open state of the rear window 12 without the curtain 242 as well, the exterior appearance of the vehicle can improve. The present embodiment has other advantages similar to the above-described embodiment.

Embodiment 18

Figure 49:
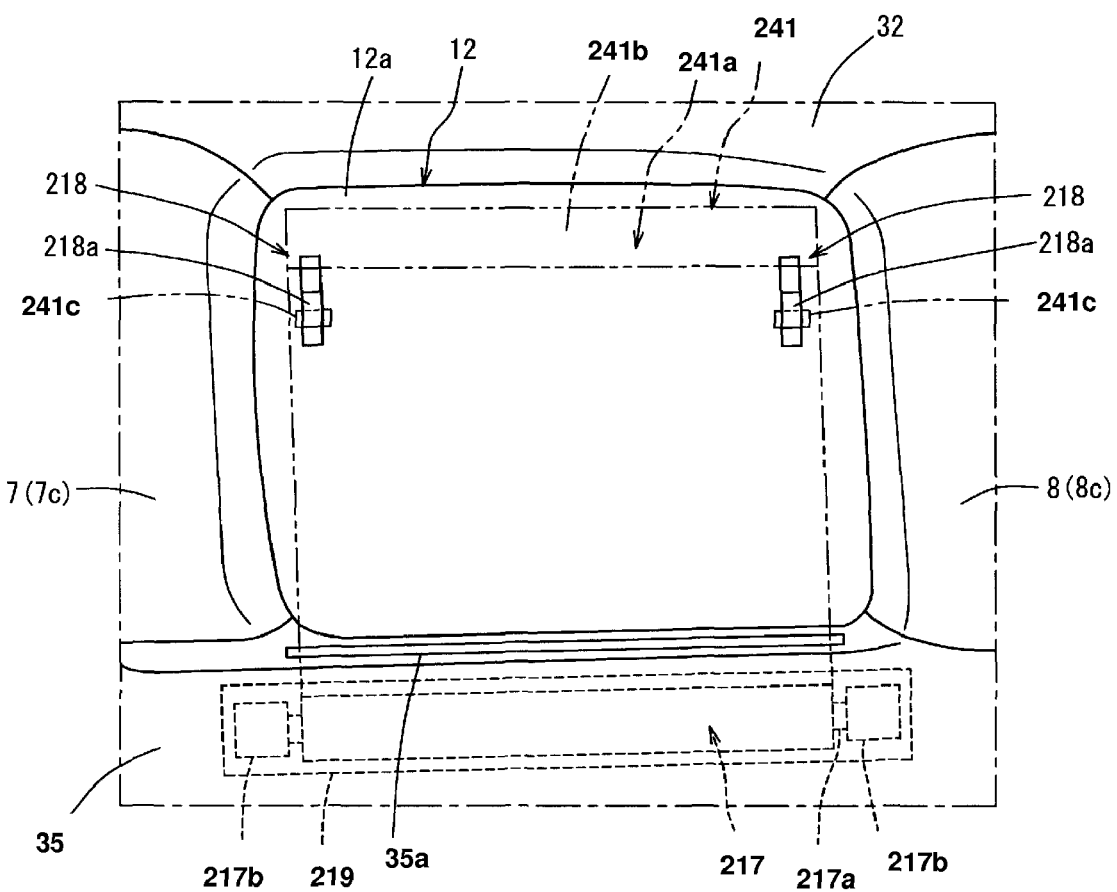
FIG. 49 is an elevation view of the rear window according to an eighteenth embodiment of the present invention.

In an eighteenth embodiment, a pair of support members 218 is disposed at positions near the upper edges and both sides of the rear window 12 as shown in FIG. 49. In this case, the curtain 241 takes a state in which the engaging portion 241c engages with engagement recess portion 218a so that the curtain 241 closes the rear window 12 almost fully and another state in which the engagement of the engaging portion 241c with the engagement recess portion 218a is released so that the rear window 12 is fully open without the curtain 241.

Embodiment 19

Figure 50:
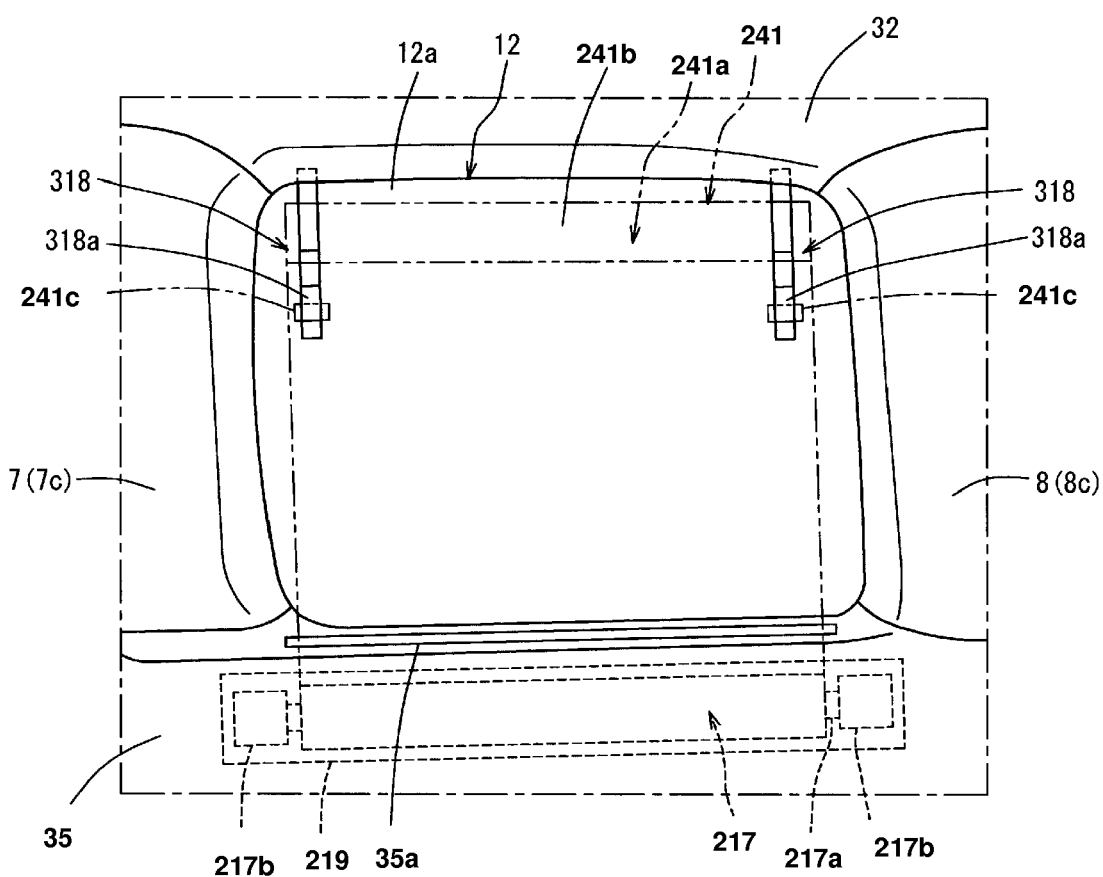
FIG. 50 is an elevation view of the rear window according to a nineteenth embodiment of the present invention.
Figure 51:
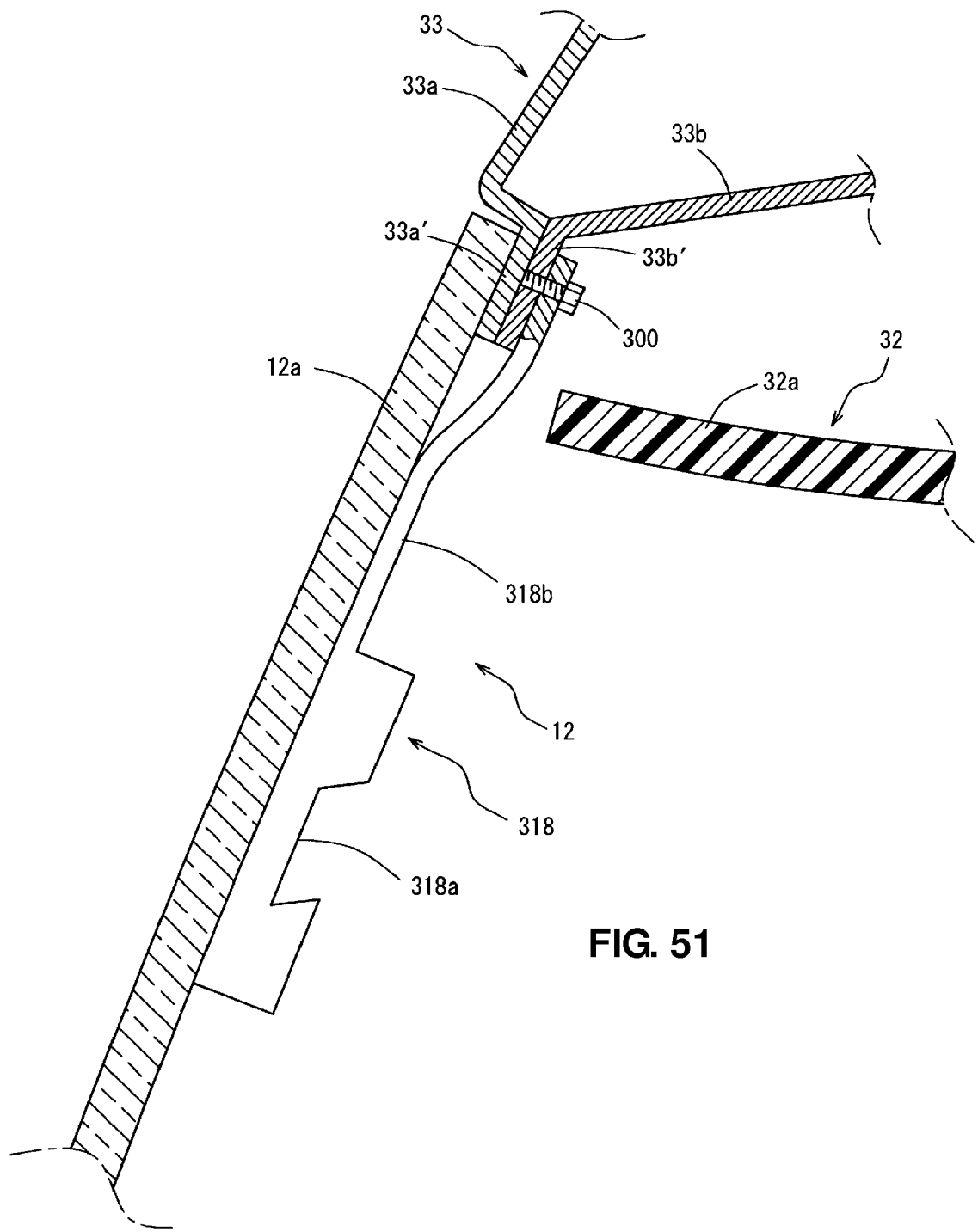
FIG. 51 is an enlarged sectional view of a major portion of an attaching structure of the cover member.

In a nineteenth embodiment, as shown in FIGS. 50 and 51, a pair of support members 318 has a connecting piece 318b at its upper portion along with an engagement recess portion 318a, respectively. Each connecting piece 318b is connected to the inner panel 33b as the vehicle body. In the present embodiment, the connecting piece 318b extends through a gap between the window glass 12a and the top ceiling 32 to a flange 33b' of the inner panel 33b, and its tip is connected to the flange 33b' via bolt and nut of a fixing member 300.

Embodiment 20

Figure 52:
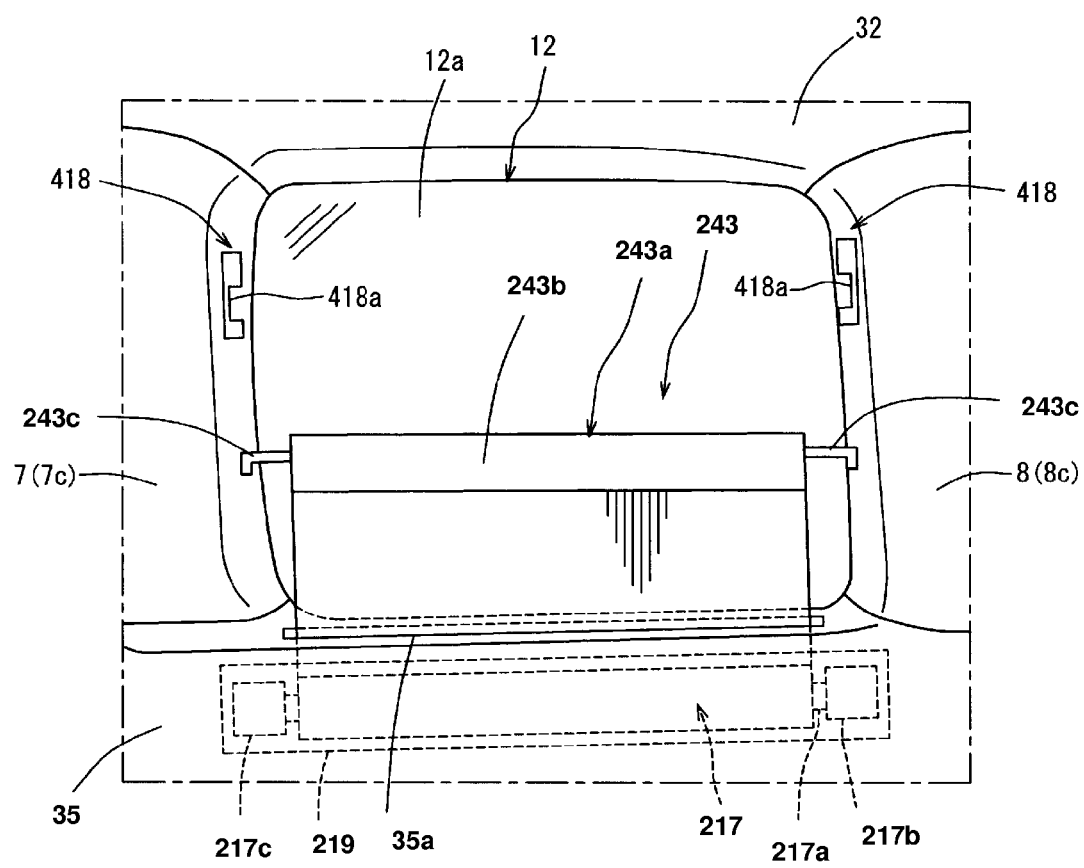
FIG. 52 is an elevation view of the rear window according to a twentieth embodiment of the present invention.

In a twentieth embodiment, as shown in FIG. 52, a pair of support members 418 is provided at the C pillar 7 and the D pillar 8 near the both sides of the rear window 12, respectively. An engagement recess portion 418a is formed to be recessed in the vehicle longitudinal direction as shown. Meanwhile, at an upper end portion 243a of a curtain 243 is provided a hook-shaped engaging portion 243c which projects in the vehicle longitudinal direction so as to correspond to the engagement recess portion 418a, in place of the engaging portion 241c. The engaging portion 243c engages with the engagement recess portion 418a. Herein, the curtain 243 can be supported at its closing state in which the window glass 12a is almost fully closed by the engagement of the engaging portion 243c with the engagement recess portion 418a. A slant portion 243b corresponds to the slant portion 241b of the upper end portion 241a of the previous embodiment.

Embodiment 21

Figure 53:
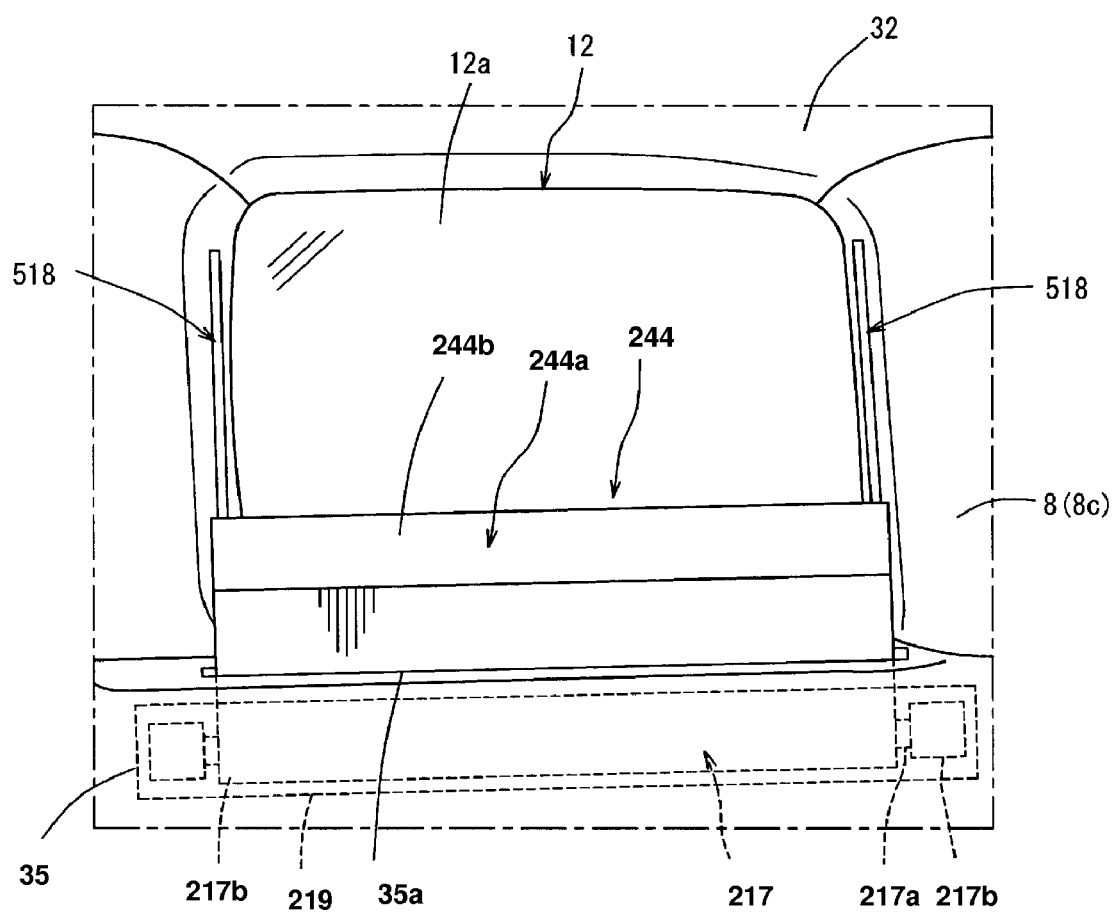
FIG. 53 is an elevation view of the rear window according to a twenty-first embodiment of the present invention.
Figure 54:
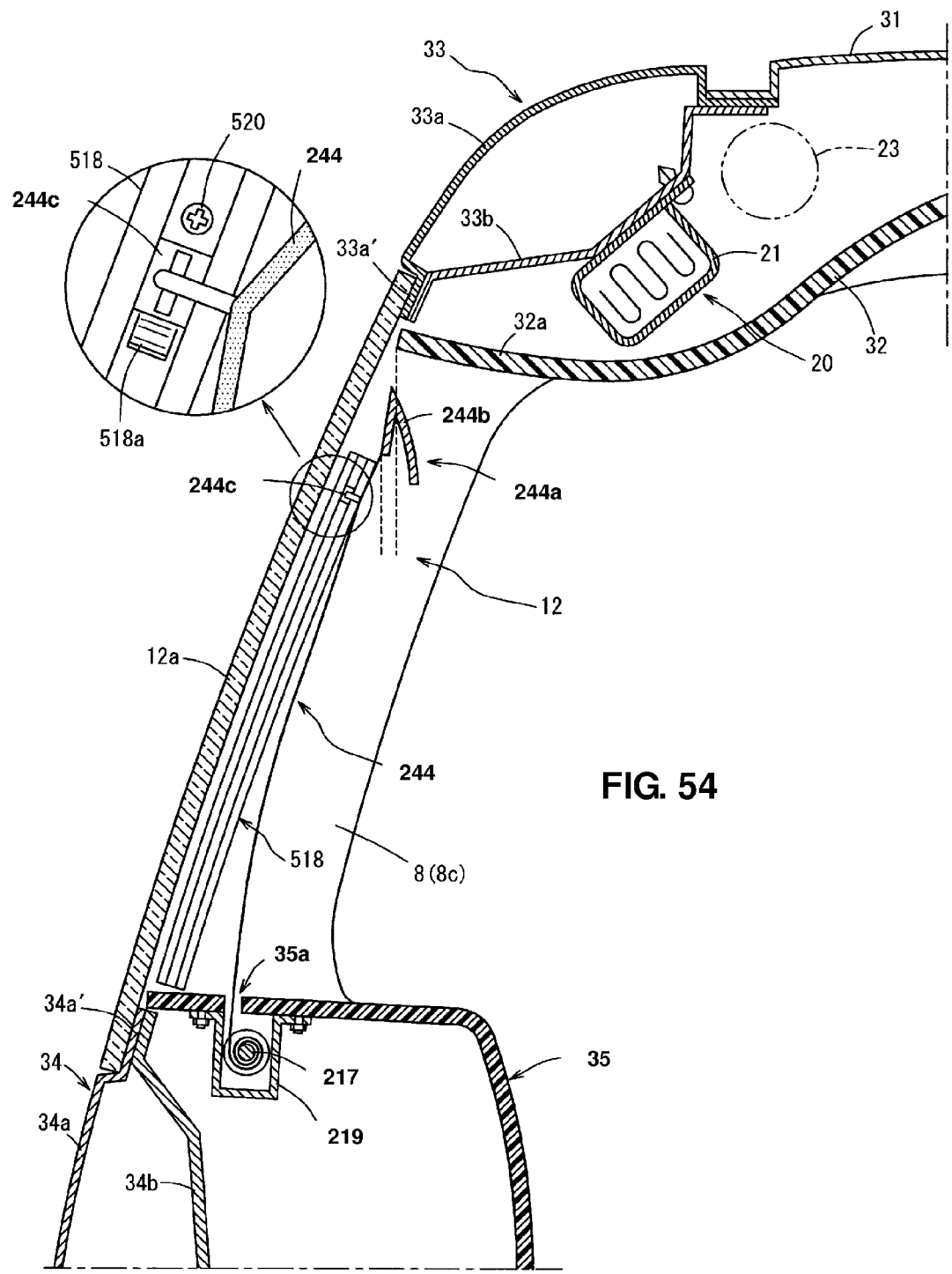
FIG. 54 is a sectional view of the rear window vehicle, which corresponds to FIG. 43.
Figure 55A:
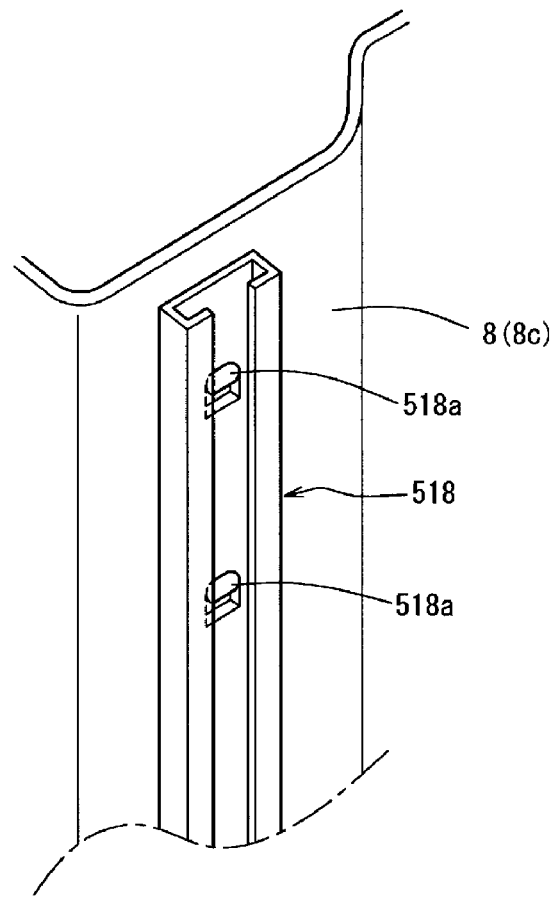
FIG. 55A is a perspective view of a rail member.
Figure 55B:
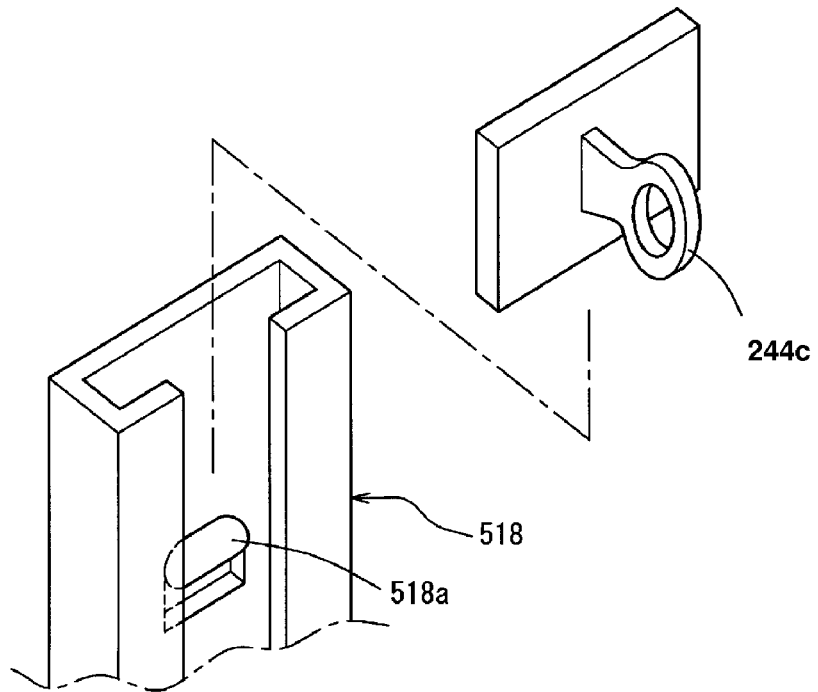
FIG. 55B is an exploded perspective view of an attaching structure of a curtain hook.

A twenty-first embodiment will be described referring to FIGS. 53 through 57. In the present embodiment, as shown in FIGS. 53 and 54, both-side end portions of a curtain 244 are supported by rail members 518, 518 which are attached to the C pillar 7 and the D pillar 8 near the side end potions of the rear window 12 so as to extend vertically. Specifically, a curtain hook 244c shown in FIG. 55B is guided by the rail member 518 shown in FIG. 55A so as to slide vertically. The curtain hooks 244c are attached to both side portions of an upper end portion 244a of the curtain 244. The rail member 518 of the present embodiment corresponds to the support member 18, and the curtain 244 is guided by the rail members 518, 518 so as to move vertically. The curtain 244 has an upper end portion 244a, which corresponds to the upper end portion 241a, and a slant portion 244b which extends obliquely downward and inward at the inside of the upper end portion 244a. The curtain 244 can be wound up by the roll member 217 so as to be stored inside the trim 35, and the curtain 244 moves vertically passing through the opening 35a which is formed at the trim 35 below the rear window 12.

Figure 56:
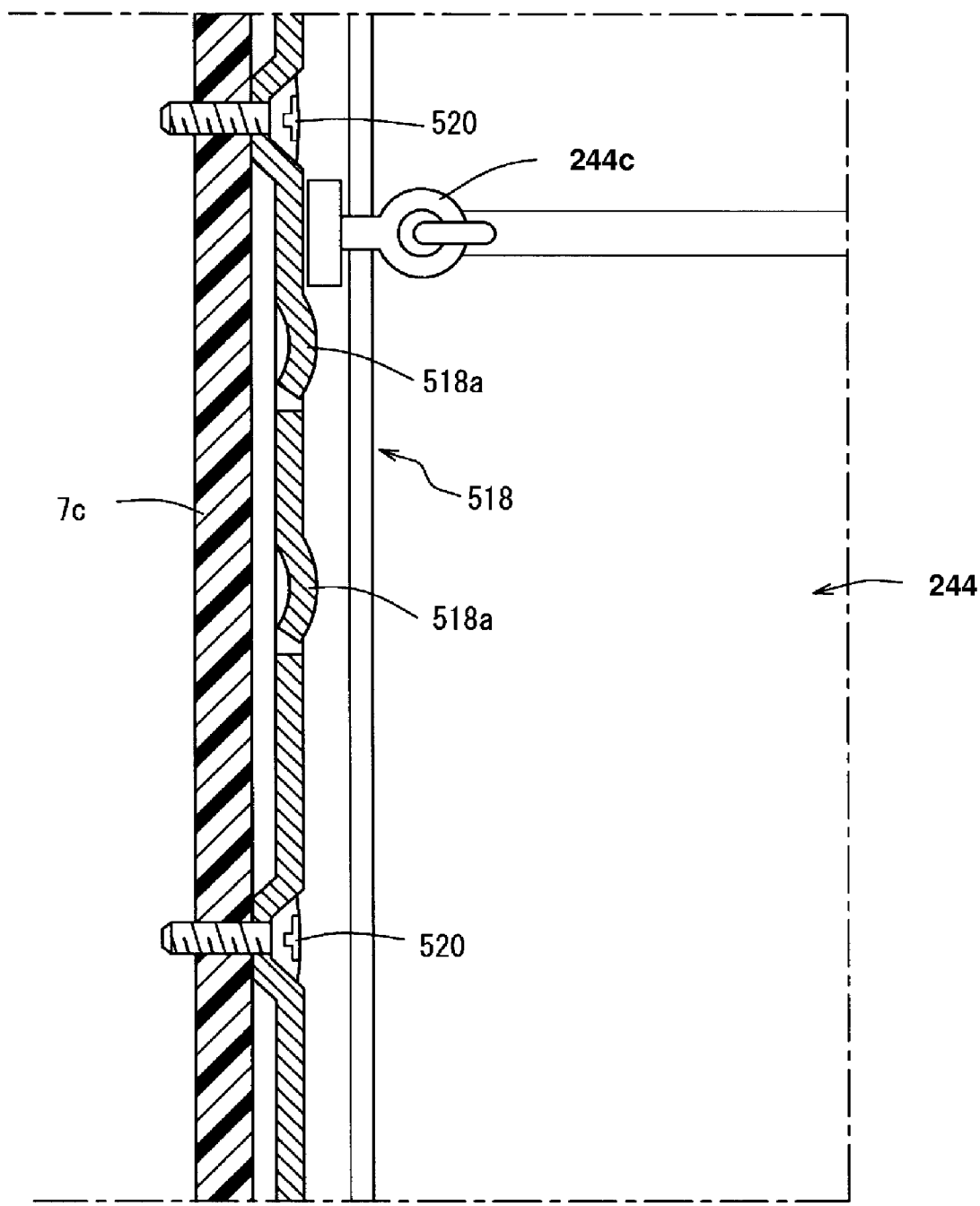
FIG. 56 is a sectional view of the attaching structure of the curtain hook.

Further, in the present embodiment, as shown in FIG. 56, the rail members 518 have a C-shaped cross section and are fixed to the pillar trims 7c, 8c via screws 520 . . . 520 at plural portions as shown in FIGS. 54 and 56. Plural holding portions 518a are formed by part of a bottom face of the rail member 518 which is formed so as to rise, so that the passing distance of the curtain hook 244c is made so narrow that the curtain hooks 244c can be held at this upper position thereof. This holding portion 518a functions as a spring in such a manner that when the passenger operates the curtain 244, the holding portion 518a bends down to allow the curtain hook 244c to pass over the holding portion 518a. After the curtain hook 244c has passed upward over the holding portion 518a, the holing portion 518a engages with the curtain hook 244c and prevents the curtain hook 244c from lowering due to its weight and the biasing force of the coil spring of the roll member 217.

Figure 57:
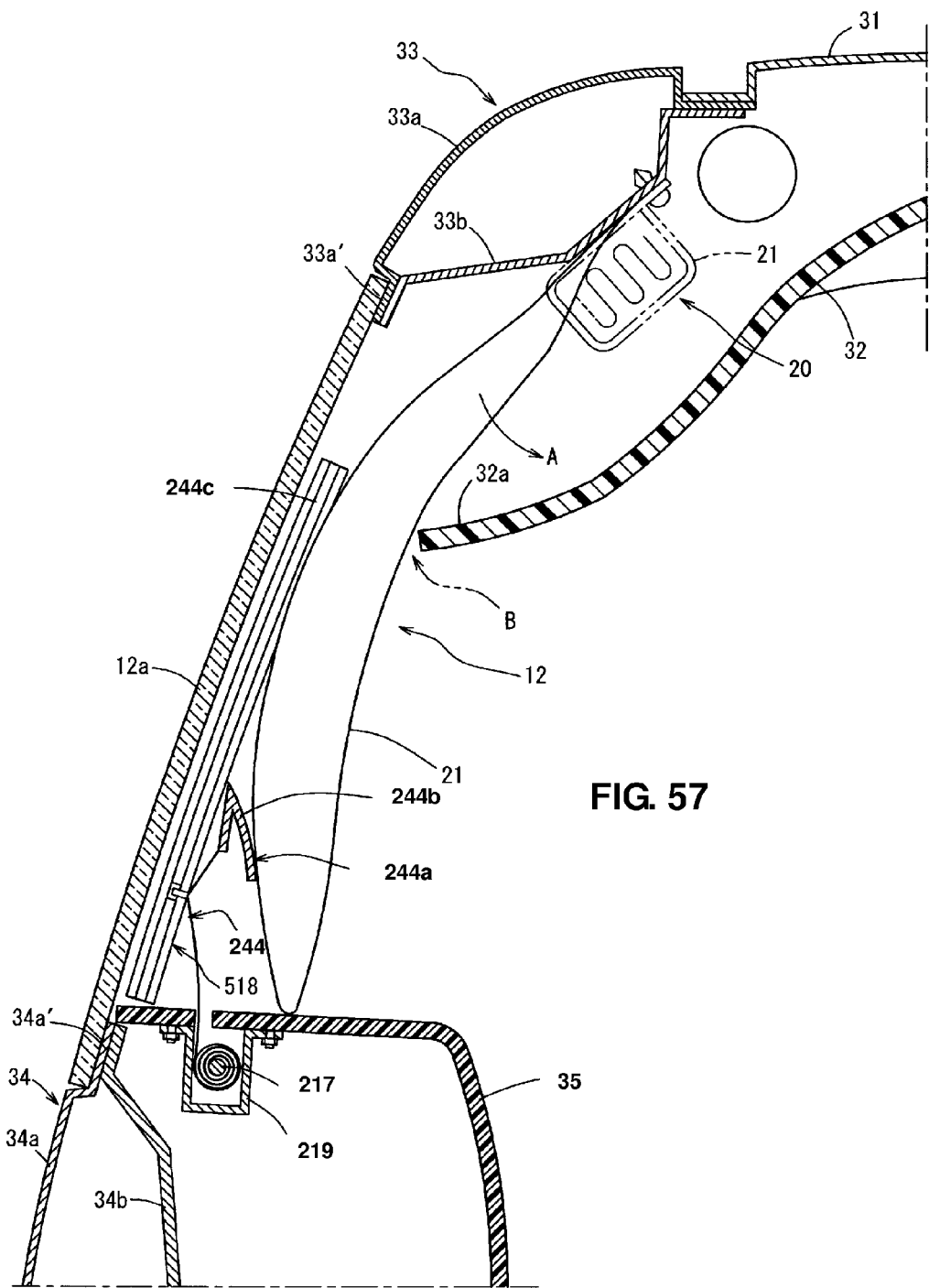
FIG. 57 is a sectional view of the inflating airbag, which corresponds to FIG 43.

Then, when the downward-inflating airbag 21 contacts the upper portion of the curtain 244 and this contact pressure acts on the curtain 244 from above while the curtain hook 244c is held by the holding portion 518a, the holding of the curtain hook 244c by the holding portion 518a is released, so that the curtain hooks 244c and the curtain 244 move down by the biasing force of the coil spring of the roll member 217. The rail member 518 is positioned on the outside of the outside edge portion of the top ceiling 32 as shown in FIG. 54. Accordingly, when the curtain hook 244c of the curtain 244 engages with the holding portion 518a, the position of the curtain 244 can be kept on the outside of the outside edge portion of the top ceiling 32. Accordingly, the downward inflation of the airbag 21 is not prevented by the curtain 241. Thus, when the airbag 21 inflates as shown in FIG. 57, the downward inflation of the airbag 21 is not prevented by the curtain 244, thereby achieving the proper protection of the passenger. Moreover, since the slant portion 244b which extends obliquely downward and inward is provided at the upper end portion 244a of the curtain 244, the airbag 21 which inflates from the gap B is guided by the surface of the slant portion 244b toward the vehicle compartment, thereby preventing interference of the airbag 21 with the rail member 518.

Embodiment 22

Figure 58:
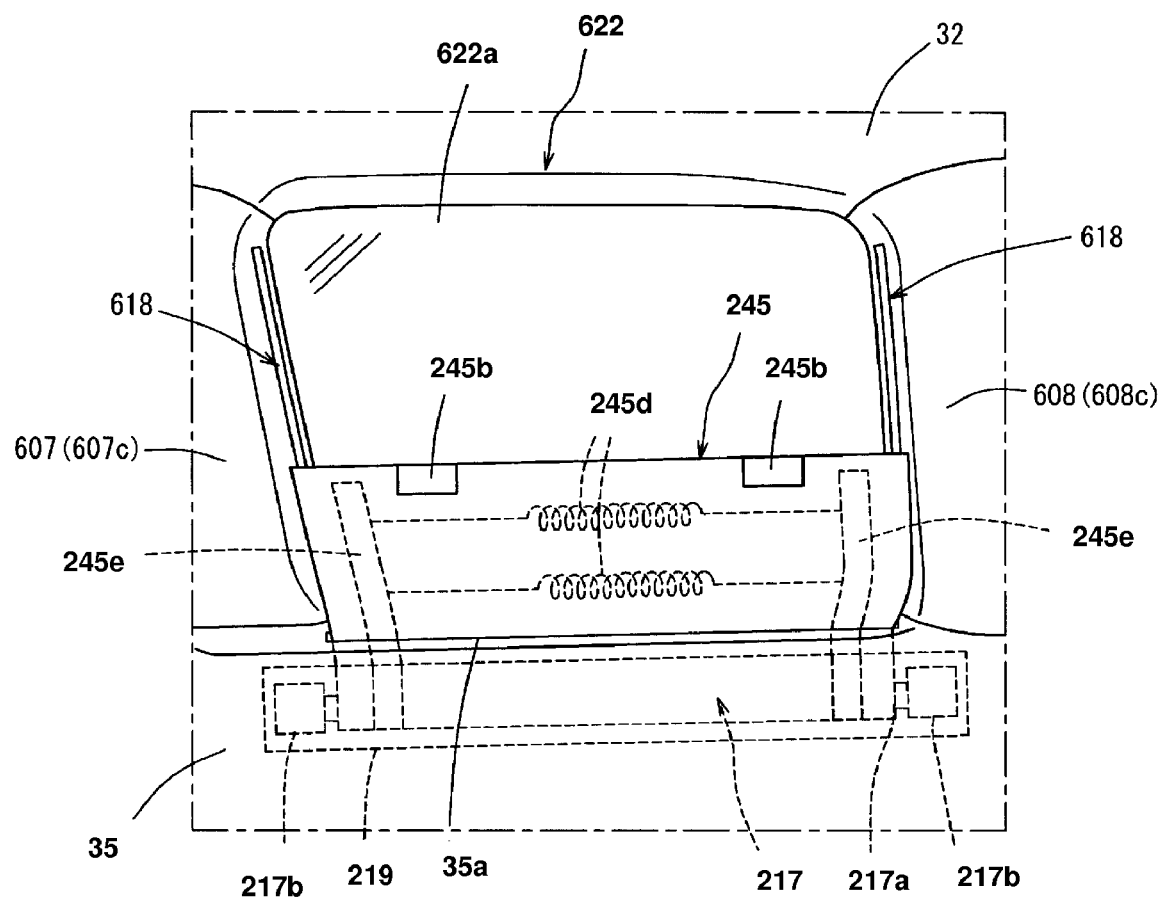
FIG. 58 is an elevation view of the rear window according to a twenty-second embodiment of the present invention.

In a twenty-second embodiment, a curtain 245 includes a spring 245d which is expandable in the vehicle longitudinal direction so that the longitudinal length of the curtain 245 is adjustable as shown in FIG. 58.

In the present embodiment, a rear window 622 (a window glass 622a) is not rectangular unlike the above-described rear widow 12 and the like, but it has different longitudinal lengths in the vertical direction as shown in FIG. 58. The curtain 245 is supported by rail members 618, 618 which are attached to a C pillar 607 (pillar trim 607c) and a D pillar (pillar trim 608c) near the side end portions of the rear window 622 so as to extend vertically. Curtain hooks 245c (see FIG. 59), which corresponds to the curtain hook 244c, are guided by the rail embers 618, 618 so as to slide vertically. The curtain hooks 245c are attached to the both sides of the upper end portion of the curtain 245. Thus, the curtain 245 can move vertically by the guidance of rail members 618, 618.

Herein, the rail member 618 is equipped with a holding portion 618a which corresponds to the holding member 518a of the rail member 518, and holds the curtain 245 in its closing state by engagement of the curtain hook 245c with the holding portion. The curtain 245 includes a plurality of springs 245d so that the longitudinal length of the curtain 245 can change according to the tension force of the springs. Further, a pair of frame members 245e which extends vertically is attached to the both-side end portions of the curtain 245. Respective both ends of the plural springs 245d are connected to the frame members 245e.

According to the present embodiment, as the curtain 245 moves vertically along the rail members 618, the distance between the rail members 618 changes according to the height position of the curtain 245, and the distance between the frame members 245e and the spring's length changes accordingly. Consequently, the longitudinal length of the curtain 245 changes, so that the whole part of the rear window 622 can be covered with the curtain 245 properly even if the curtain is not of the rectangular shape. Herein, when the holing of the holing portions 618a of the rail member 618 by the curtain hooks 245c of the curtain 245 is released, the curtain hooks 245c and the curtain 245 are lowered by the biasing force of the coil spring of the roll member 217, and the curtain 245 is wound up by the roll member 217. Herein, it may be preferable that the frame members 245e be so flexible that they can change its shape in the roll shape by the spring force of the roll member 217.

Figure 59:
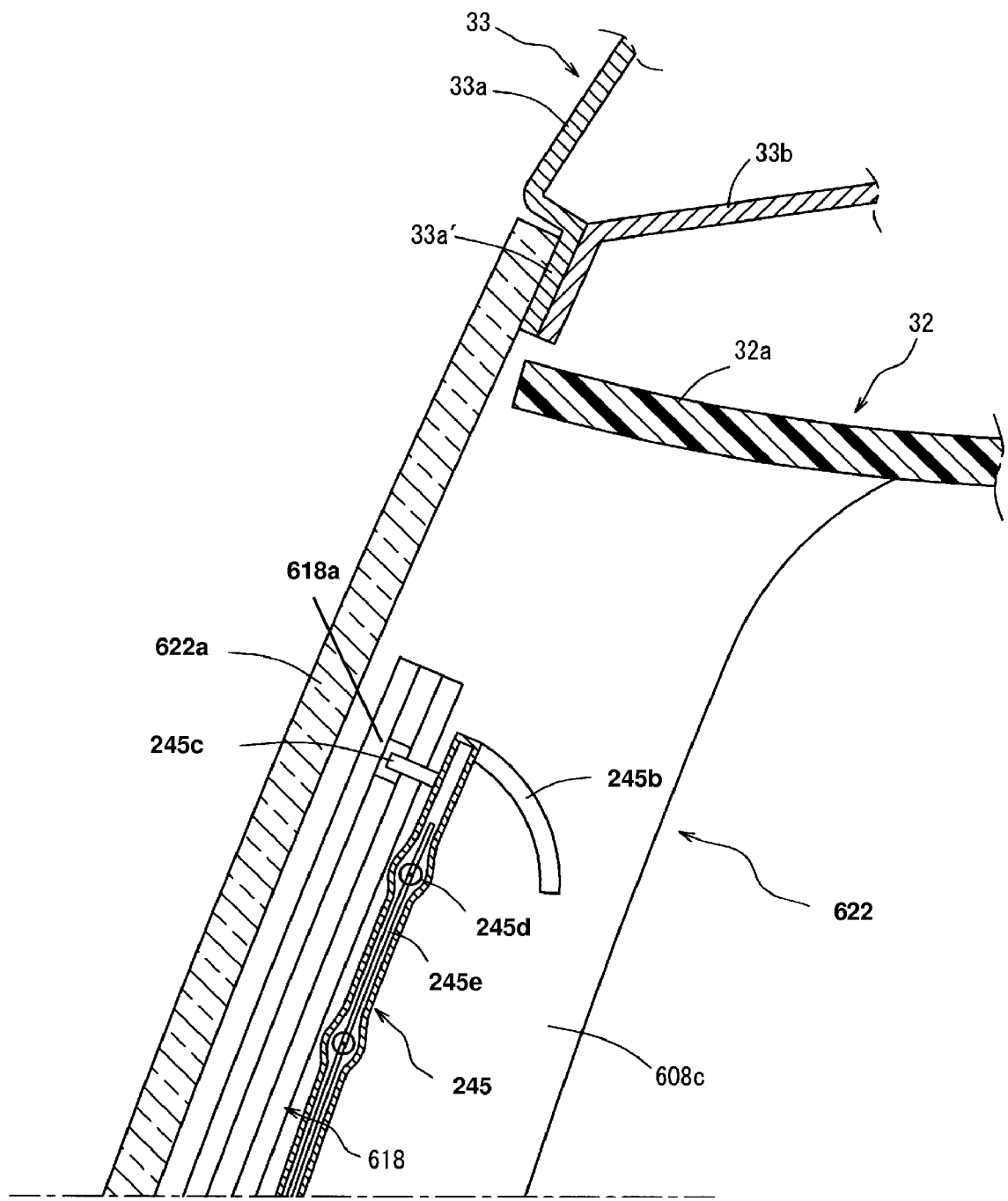
FIG. 59 is a sectional view of the upper portion of the rear window and surroundings of an upper end portion of a curtain, which corresponds to FIG. 43.

The curtain 245 of the present embodiment has operating portions 245b, 245b which are made of resin and attached to both ends thereof, instead of the upper end portion 241a. The operating portion 245b has a slant face which extends obliquely downward and inward like the slant portion 241b as shown in FIG. 59. The inflating airbag 21 can be guided toward the vehicle compartment along this slant portion, thereby preventing the interference of the airbag 21 with the rail members 618. Further, since the present embodiment has the rail members 618 which correspond to the rail members 518, the holding by the curtain hook 245c is released by the inflation of the airbag 21, and accordingly the airbag 21 can be allowed to inflate downward quickly by means of the inflation pressure like the above-described twenty-first embodiment. Thus, the smooth inflation of the airbag 21 is not prevented by the curtain 245.

Embodiment 23

Figure 60:
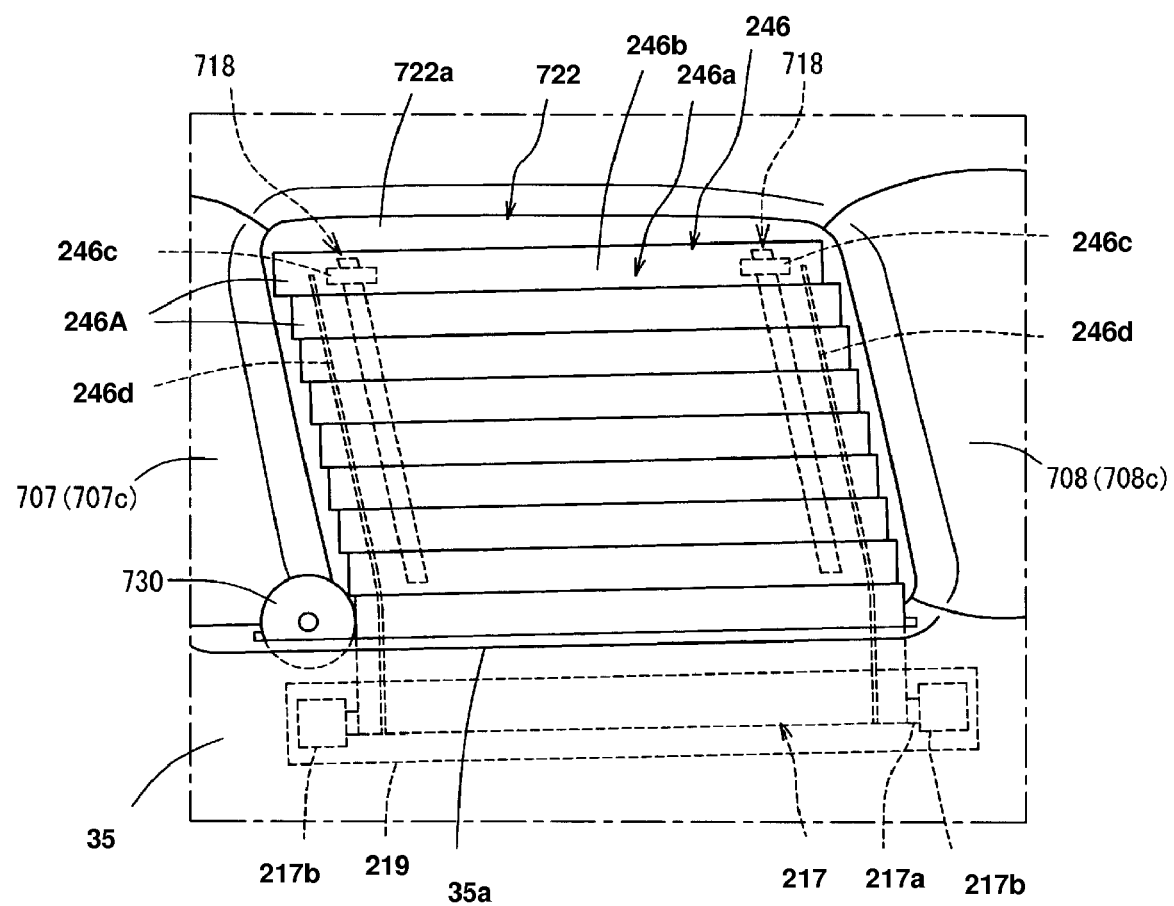
FIG. 60 is an elevation view of the rear window according to a twenty-third embodiment of the present invention.
Figure 61:
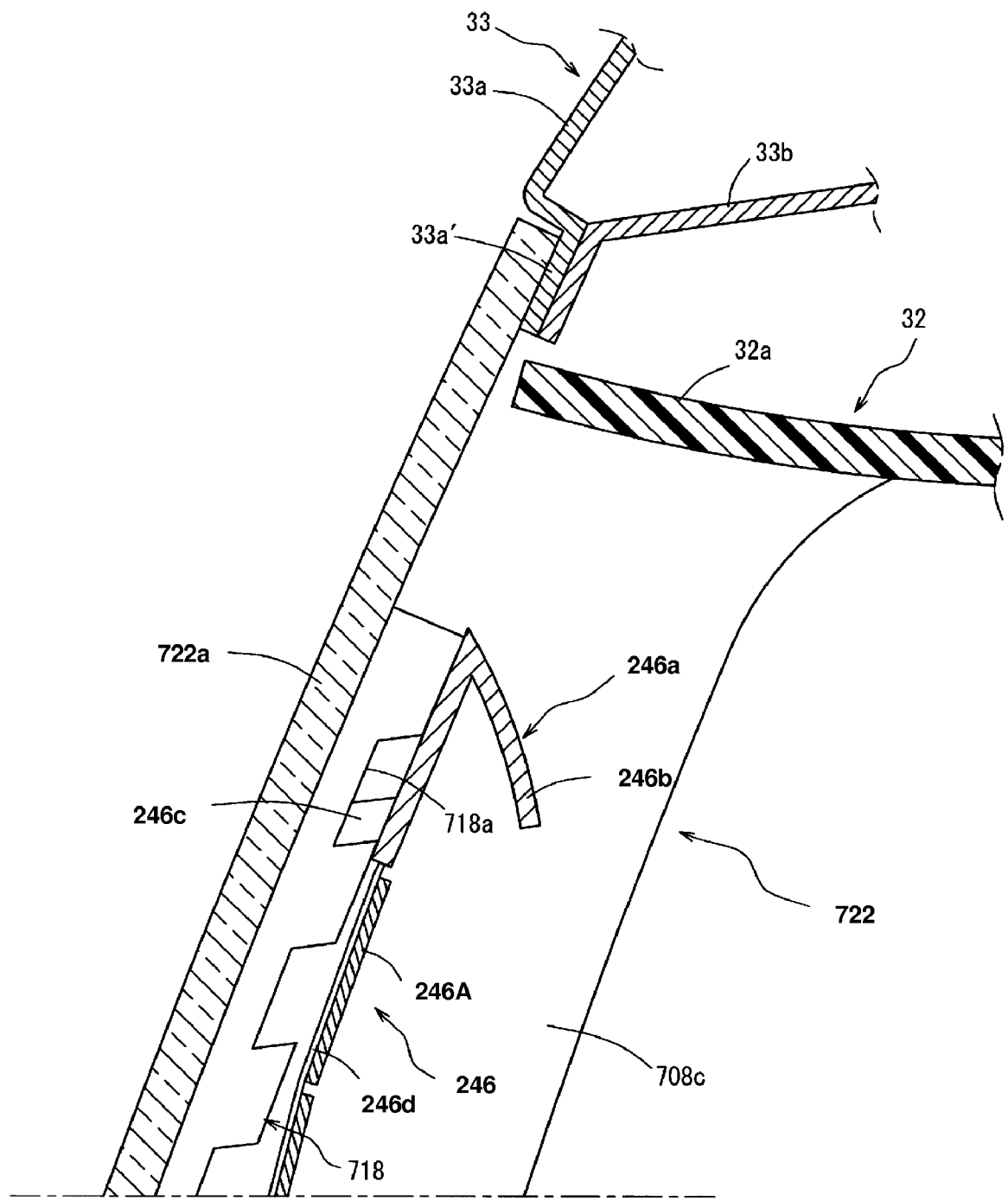
FIG. 61 is a sectional view of the upper portion of the rear window and surroundings of an upper end portion of a curtain, which corresponds to FIG. 43.

In a twenty-third embodiment, there is provided a blind 246 in place of the curtain 241 or the like, which is made of plural plates 246A which extend in the vehicle longitudinal direction and are connected to each other via connecting bands 246d as shown in FIGS. 60 and 61.

The plural plates 246A of the blind 246 are disposed side by side in the vertical direction, and they are connected via a pair of connecting bands 246d which extends vertically at their both-side end portions. Accordingly, when the passenger pulls an upper end portion 246a in the vehicle longitudinal direction, the adjacent plates 246A move longitudinally relatively like a step shape as shown, so that the blind 246 substantially forms a shape of parallelogram as shown. Thus, even in case a rear window 722 (window glass 722a) is formed to be of the parallelogram shape with slant pillars 707 (pillar trim 707c), 708 (pillar trim 708c), a whole of the rear window 722 can be covered with the blind 722. The blind 246 is wound up by the roll member 217 and then stored inside the trim 35 as shown in FIG. 60, like the curtain 241 and the like. The blind 246 can be made move up and down passing through the opening 35a, and it is configured to be always biased downward by the roll member 217.

Further, a pair of engaging portions 246c, which correspond to the engaging portion 241c of the curtain 241, is attached to positions which are near the upper end portion 246a of the blind 246. Meanwhile, near both-side portions of the rear window 722 is provided a pair of support members 718, 718 which have engagement recess portions 718a so as to correspond to the engaging portions 246c. A guide roller 730 is provided at one end of the opening 35a as shown in FIG. 60. In case the engagement of the engaging portions 246c of the blind 246 with the engagement recess portions 718a of the support member 718 is released, the blind 246 is forced to lower by the biasing force of the coil spring. Further, one-side ends of the plates 246A come to contact the guide roller 730, and thereby the guide roller 730 is driven. Accordingly, each of the plates 246A is guided to the opening 35a by the guide roller 730 properly, so that the blind 246 is wound up properly by the roll member 217.

Embodiment 24

Figure 62:
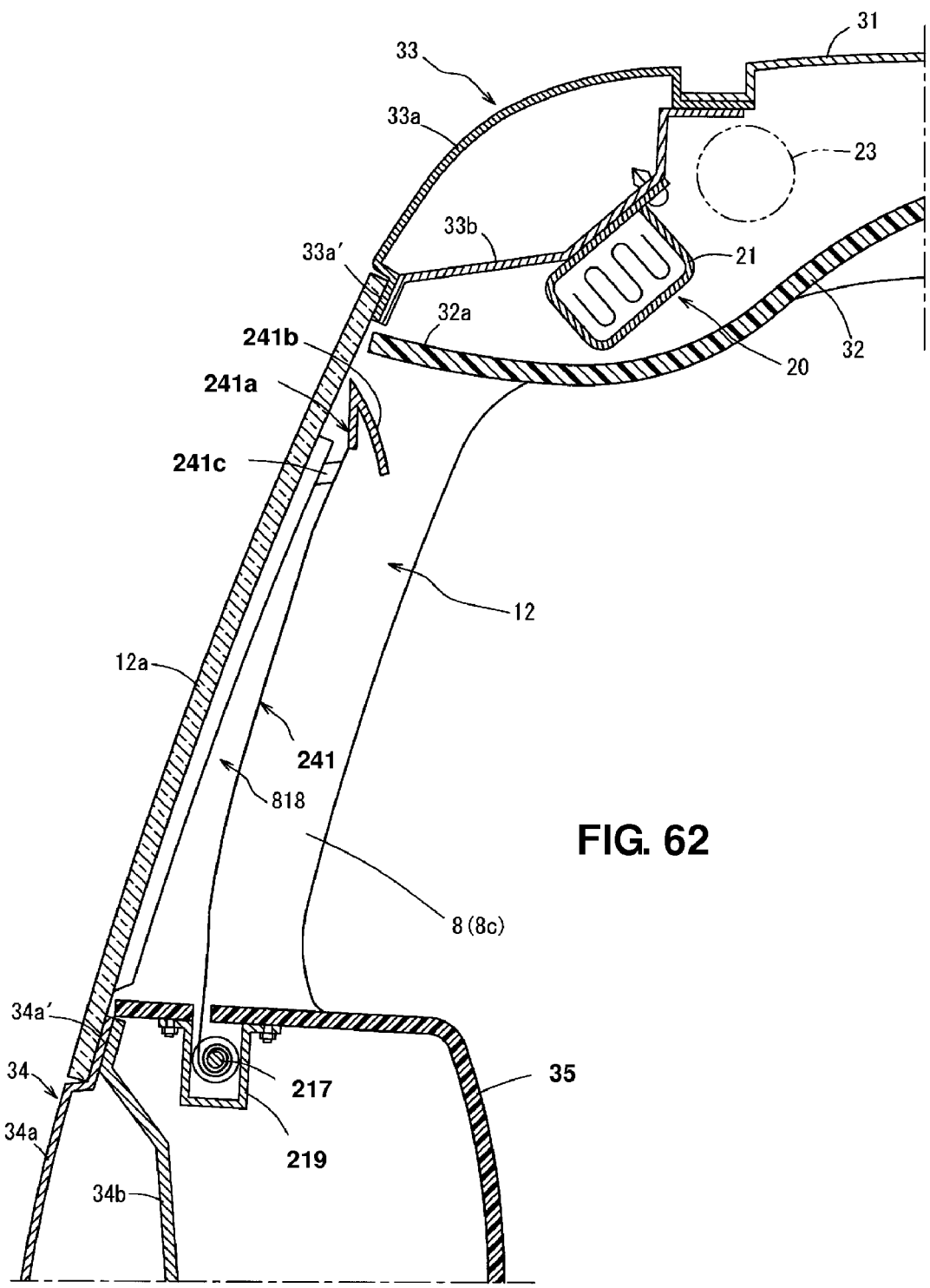
FIG. 62 is an elevation view of the rear window according to a twenty-fourth embodiment of the present invention.

In a twenty-fourth embodiment, a support member 818 is made from magnet as shown in FIG. 62, which has no engagement recess portion. Thereby, the covering area of the rear window 12 with the curtain 241 can be adjusted more properly. Further, since there is no need to form the engagement recess portion like the portions 18a of the support member 18 and the like of the above-described embodiments, forming the support member may be simple.

The present invention should not be limited to the above-described embodiments, and any other modifications and improvements may be applied to the cope of a sprit of the present invention.

What is claimed is:

1. An attachment structure of a curtain-shaped cover member of a vehicle, comprising:
  a soft top ceiling covering a roof panel from an inside of a vehicle compartment, a side end portion of which points to near an upper edge portion of a window glass of a window which is formed at a vehicle body;

a curtain-shaped cover member for shading provided on the inside of the widow glass of the window;

a curtain airbag device provided near an upper portion of the window, the curtain airbag device including an airbag which is stored along the upper edge portion of the window glass in a non-operation state of the curtain airbag device and inflates downward through a gap which is formed between the window glass and the side end portion of the top ceiling which is pressed down by the airbag receiving a gas pressure from an inflator; and a rail member to support the cover member for shading so that the cover member for shading moves in a vehicle longitudinal direction to cover at least an upper portion of the window glass from the inside of the vehicle compartment, the rail member being attached to the window glass and extending in the vehicle longitudinal direction at an upper portion of the window, wherein said rail member is positioned on a vehicle outside, in a vehicle width direction, relative to the side end portion of said top ceiling when said curtain airbag device is not operated.

2. The attachment structure of a curtain-shaped cover member of a vehicle of claim 1, wherein said support member supports said cover member so that the cover member can move in a vertical direction.

3. The attachment structure of a curtain-shaped cover member of a vehicle of claim 1, further comprising a rear pillar which is positioned behind the window and covered with a rear pillar trim, which is made from hard resin, from the inside of the vehicle compartment, wherein said curtain airbag device is fixed to the vehicle body along a specified portion of the rear pillar, said airbag inflates out of a space between the window and an outside end portion of the rear pillar trim so as to cover the window from the inside of the vehicle compartment, and there is provided a holding member to hold a rear end portion of the cover member at a position which is on an outside of the inflating airbag.

4. The attachment structure of a curtain-shaped cover member of a vehicle of claim 3, wherein said rear pillar comprises an inner panel and an outer panel, a holding bracket which extends forward is provided at the inner panel, and said holding member is provided at the holding bracket.

5. The attachment structure of a curtain-shaped cover member of a vehicle of claim 3, wherein said holding member is attached to the window.

6. The attachment structure of a curtain-shaped cover member of a vehicle of claim 3, wherein said cover member is biased forward, and engagement of said holding member with the cover member is released according to an inflation of the airbag.

7. The attachment structure of a curtain-shaped cover member of a vehicle of claim 1, wherein a trim is provided below the window, and said cover member is stored inside the trim in an open state thereof.

8. The attachment structure of a curtain-shaped cover member of a vehicle of claim 1, wherein said support member is positioned on an outside of the side end portion of the top ceiling when said curtain airbag device is in the non-operation state.

9. The attachment structure of a curtain-shaped cover member of a vehicle of claim 1, wherein a support position of said cover member is located on an outside of a moving locus of the side end portion of said top ceiling which is pressed down according to an inflation of the airbag.

10. The attachment structure of a curtain-shaped cover member of a vehicle of claim 1, wherein there is provided an interference preventing member to prevent interference of said support member with the inflating airbag at an upper portion of said support member.

11. The attachment structure of a curtain-shaped cover member of a vehicle of claim 1, wherein a middle pillar is provided in front of said window with the window glass and a rear pillar is provided in back of the window with the window glass.

12. The attachment structure of a curtain-shaped cover member of a vehicle of claim 1, wherein another rail member is attached to the window glass so as to extend in the vehicle longitudinal direction at a lower portion of the window, and said cover member for shading is supported by both the rail members so that the cover member for shading moves in the vehicle longitudinal direction.

13. The attachment structure of a curtain-shaped cover member of a vehicle of claim 1, wherein a middle pillar is provided in front of said window with the window glass and a rear pillar is provided in back of the window with the window glass, and said rail member has a fixing portion at least one of a front end and a rear end thereof, the fixing portion being fixed to the middle pillar and/or the rear pillar.

14. The attachment structure of a curtain-shaped cover member of a vehicle of claim 2, wherein a middle pillar is provided in front of said window with the window glass and a rear pillar is provided in back of the window with the window glass, and said support member is a pair of rail members which is attached to the pillars.

15. The attachment structure of a curtain-shaped cover member of a vehicle of claim 2, wherein a holding portion to hold said cover member is provided at an upper portion of said support member, and holding of the cover member by the holding portion is released when the airbag inflates and contacts an upper portion of the cover member.

16. The attachment structure of a curtain-shaped cover member of a vehicle of claim 2, wherein said cover member is biased downward.

17. The attachment structure of a curtain-shaped cover member of a vehicle of claim 10, wherein a treatment to prevent exposure of the support member to a vehicle outside is applied to a specified potion of the window glass where the support member is attached.

18. The attachment structure of a curtain-shaped cover member of a vehicle of claim 7, wherein a slant member which extends obliquely downward and inward is provided at an upper portion of said cover member.

19. The attachment structure of a curtain-shaped cover member of a vehicle of claim 7, wherein said cover member is a roll type of curtain member.

20. The attachment structure of a curtain-shaped cover member of a vehicle of claim 7, wherein said cover member includes a resilient member which is expandable in a vehicle longitudinal direction so that a longitudinal length thereof is adjustable.

* * * * *